US012002408B2

(12) United States Patent
Moon et al.

(10) Patent No.: US 12,002,408 B2
(45) Date of Patent: Jun. 4, 2024

(54) DISPLAY DEVICE IN WHICH REFERENCE POINT IS SHIFTED IN SHIFT AREA BASED ON ROUTE SHIFT SIGNAL

(71) Applicant: Samsung Display Co., Ltd., Yongin-si (KR)

(72) Inventors: Daye Moon, Seoul (KR); Bonggyun Kang, Suwon-si (KR); Kyoungho Lim, Hwaseong-si (KR); Heesook Park, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/863,854

(22) Filed: Jul. 13, 2022

(65) Prior Publication Data

US 2023/0162656 A1 May 25, 2023

(30) Foreign Application Priority Data

Nov. 19, 2021 (KR) ........................ 10-2021-0159994

(51) Int. Cl.
*G09G 3/20* (2006.01)

(52) U.S. Cl.
CPC ............ *G09G 3/2096* (2013.01); *G09G 3/20* (2013.01); *G09G 2300/0413* (2013.01); *G09G 2310/0275* (2013.01); *G09G 2320/0257* (2013.01); *G09G 2320/046* (2013.01); *G09G 2330/021* (2013.01)

(58) Field of Classification Search
CPC ......... G09G 3/2096; G09G 2300/0413; G09G 2310/0275; G09G 2320/0257; G09G 2320/046; G09G 2330/021; G09G 2340/0464; G09G 3/007; G09G 3/20; G09G 2300/0871; G09F 9/30
See application file for complete search history.

(56) References Cited

U.S. PATENT DOCUMENTS

| | | | | |
|---|---|---|---|---|
| 10,147,401 | B2 | 12/2018 | Lee et al. | |
| 10,529,267 | B2 * | 1/2020 | Lee | G09G 3/2085 |
| 10,854,123 | B2 | 12/2020 | Kim et al. | |
| 11,436,958 | B2 * | 9/2022 | Lee | G09G 3/2085 |
| 11,532,682 | B2 * | 12/2022 | Han | H10K 59/122 |
| 2018/0012530 | A1 * | 1/2018 | Lee | G09G 3/2085 |
| 2021/0104588 | A1 * | 4/2021 | Han | H01L 29/786 |

* cited by examiner

*Primary Examiner* — Vijay Shankar
(74) *Attorney, Agent, or Firm* — CANTOR COLBURN LLP

(57) ABSTRACT

A display device includes a display panel and a display image shift controller. The display panel includes a display area in which a display image is displayed and a shift area located within the display area. The display image shift controller generates a route shift signal, where a reference point of the display image is shifted in the shift area based on the route shift signal. The route shift signal includes first and second routes corresponding to a path through which the reference point of the display image is shifted. The first route includes a first sub-route and a second sub-route. The second route includes a third sub-route and a fourth sub-route. The first, second, third, and fourth sub-routes are different from each other.

32 Claims, 27 Drawing Sheets

DISPLAY DEVICE IN WHICH REFERENCE POINT IS SHIFTED IN SHIFT AREA BASED ON ROUTE SHIFT SIGNAL

This application claims priority to Korean Patent Application No. 10-2021-0159994, filed on Nov. 19, 2021, and all the benefits accruing therefrom under 35 U.S.C. § 119, the content of which in its entirety is herein incorporated by reference.

BACKGROUND

1. Field

Embodiments relate generally to a display device. More particularly, embodiments of the disclosure relate to a display device that displays a display image by using a display image shift scheme.

2. Description of the Related Art

Flat panel display devices are widely used as display devices in various fields due to lightweight and thin characteristics thereof. Such flat panel display devices may include a liquid crystal display device, an organic light emitting display device, a quantum dot display device, and the like, for example.

When a display device is driven for a long time, a pixel may deteriorate due to an increase in current stress, and an afterimage may occur in a portion where a fixed pattern or a logo of a display image is displayed. In such a display device, the display device may disperse stress applied to the pixel to reduce the afterimage by using a display image shift scheme (or a pixel shift scheme, an orbit driving scheme, etc.) for shifting an entire display image every preset time. For example, according to the display image shift scheme, the display image may be shifted in a predetermined direction, and black data may be displayed in an outer peripheral portion where the display image is not displayed due to the shift of the display image.

SUMMARY

In a conventional display device using a display image shift scheme, an origin of the display image (e.g., a center of the image) may be shifted in a clockwise or counterclockwise direction in the form of a rectangular helix. In such a display device, the origin of the display image may be shifted only in one direction as the origin of the display image moves from a center to an outer periphery of the rectangular helix, so that the stress may not be dispersed. In addition, a total amount of movements by which the display image is shifted may be relatively large so that there may be a difficulty in dispersing the stress.

Embodiments provide a display device.

According to embodiments of the disclosure, a display device includes a display panel and a display image shift controller. In such embodiments, the display panel includes a display area in which a display image is displayed and a shift area located within the display area. In such embodiments, the display image shift controller is configured to generate a route shift signal, where a reference point of the display image is shifted in the shift area based on the route shift signal. In such embodiments, the route shift signal includes first and second routes, each corresponding to a path through which the reference point of the display image is shifted. In such embodiments, the first route includes a first sub-route and a second sub-route. In such embodiments, the second route includes a third sub-route and a fourth sub-route. In such embodiments, the first, second, third, and fourth sub-routes are different from each other.

In embodiments, when the display image is continuously displayed on the display panel, the reference point may be shifted based on the first route or the second route after a preset time in a way such that the display image is entirely shifted.

In embodiments, the shift area may have a grid shape having 13 rows and 13 columns, in which 13 imaginary horizontal lines intersect 13 imaginary vertical lines, and 169 intersection points in which the imaginary horizontal lines intersect the imaginary vertical lines may be defined in the shift area. In such embodiments, the reference point may be located at one intersection point among the intersection points, and the reference point located at the one intersection point may be shifted to one of eight intersection points that are adjacent to the one intersection point after a preset time.

In embodiments, the reference point may be initially located at a center of the display image.

In embodiments, shift the reference point may be shifted based on the first sub-route in an order of a first direction, a second direction, a third direction, a fourth direction, the first direction, and the second direction, and the reference point may be shifted based on the second sub-route in an order of the first direction, the second direction, the third direction, the fourth direction, and the first direction.

In embodiments, the second sub-route may start after the first sub-route ends. In such embodiments, a start coordinate of the first sub-route and an end coordinate of the second sub-route may be different from each other, and a start coordinate of the second sub-route and the end coordinate of the second sub-route may be identical to each other.

In embodiments, a center of the shift area may be defined as a zeroth coordinate, and a start coordinate of the first sub-route may correspond to the zeroth coordinate.

In embodiments, each of the first and second sub-routes may have a rectangular shape rotated about the zeroth coordinate by a preset angle. In such embodiments, a first length of a minor axis of the first sub-route and a second length of a minor axis of the second sub-route may be equal to each other, and a first length of a major axis of the first sub-route and a second length of a major axis of the second sub-route may be equal to each other.

In embodiments, the reference point may be shifted based on the third sub-route in an order of a first direction, a second direction, a third direction, a fourth direction, the first direction, and the second direction, and the reference point may be shifted based on the fourth sub-route in an order of the first direction, the second direction, the third direction, the fourth direction, and the first direction.

In embodiments, the fourth sub-route may start after the third sub-route ends. In such embodiments, a start coordinate of the third sub-route and an end coordinate of the fourth sub-route may be different from each other, and a start coordinate of the fourth sub-route and the end coordinate of the fourth sub-route may be identical to each other.

In embodiments, a center of the shift area may be defined as a zeroth coordinate, and each of the third and fourth sub-routes may have a rectangular shape rotated about the zeroth coordinate by a preset angle. In such embodiments, a third length of a minor axis of the third sub-route and a fourth length of a minor axis of the fourth sub-route may be equal to each other, and a third length of a major axis of the third sub-route and a fourth length of a major axis of the fourth sub-route may be equal to each other.

In embodiments, the route shift signal may further include a third route. In such embodiments, the third route may include a fifth sub-route, and the first, second, third, fourth, and fifth sub-routes may be different from each other.

In embodiments, the reference point may be shifted based on the fifth sub-route in an order of a first direction, a second direction, a third direction, a fourth direction, and the first direction.

In embodiments, the fifth sub-route may start after the fourth sub-route ends. In such embodiments, a start coordinate of the fifth sub-route and an end coordinate of the fifth sub-route may be different from each other.

In embodiments, a center of the shift area may be defined as a zeroth coordinate. In such embodiments, the fifth sub-route may have a rectangular shape rotated about the zeroth coordinate by a preset angle, and a fifth length of a minor axis of the fifth sub-route and a fifth length of a major axis of the fifth sub-route may be equal to each other.

In embodiments, the route shift signal may further include a fourth route. In such embodiments, the fourth route may include a sixth sub-route and a seventh sub-route, and the first, second, third, fourth, fifth, sixth, and seventh sub-routes may be different from each other.

In embodiments, the reference point may be shifted based on the sixth sub-route in an order of a fifth direction, a second direction, a third direction, a fourth direction, a first direction, and the second direction, and the reference point may be shifted based on the seventh sub-route in an order of the first direction, the second direction, the third direction, the fourth direction, the first direction, and the second direction.

In embodiments, the seventh sub-route may start after the sixth sub-route ends. In such embodiments, a start coordinate of the sixth sub-route and an end coordinate of the seventh sub-route may be different from each other, and a start coordinate of the seventh sub-route and the end coordinate of the seventh sub-route may be different from each other.

In embodiments, a center of the shift area may be defined as a zeroth coordinate, and each of the sixth and seventh sub-routes may have a rectangular shape rotated about the zeroth coordinate by a preset angle. In such embodiments, a sixth length of a minor axis of the sixth sub-route and a seventh length of a minor axis of the seventh sub-route may be equal to each other, and a sixth length of a major axis of the sixth sub-route and a seventh length of a major axis of the seventh sub-route may be equal to each other.

In embodiments, the route shift signal may further include a fifth route. In such embodiments, the fifth route may include an eighth sub-route and a ninth sub-route, and the first, second, third, fourth, fifth, sixth, seventh, eighth, and ninth sub-routes may be different from each other.

In embodiments, the reference point may be shifted based on the eighth sub-route in an order of a second direction, a third direction, a fourth direction, a first direction, and the second direction, and the reference point may be shifted based on the ninth sub-route in an order of the first direction, the second direction, the third direction, the fourth direction, the first direction, and the second direction.

In embodiments, the ninth sub-route may start after the eighth sub-route ends. In such embodiments, a start coordinate of the eighth sub-route and an end coordinate of the ninth sub-route may be different from each other, and a start coordinate of the ninth sub-route and the end coordinate of the ninth sub-route may be different from each other.

In embodiments, a center of the shift area may be defined as a zeroth coordinate, and each of the eighth and ninth sub-routes may have a rectangular shape rotated about the zeroth coordinate by a preset angle. In such embodiments, an eighth length of a minor axis of the eighth sub-route and a ninth length of a minor axis of the ninth sub-route may be equal to each other, and an eighth length of a major axis of the eighth sub-route and a ninth length of a major axis of the ninth sub-route may be equal to each other.

In embodiments, the route shift signal may further include a sixth route. In such embodiments, the sixth route may include a $10^{th}$ sub-route and an $11^{th}$ sub-route, and the first, second, third, fourth, fifth, sixth, seventh, eighth, ninth, $10^{th}$, and $11^{th}$ sub-routes may be different from each other.

In embodiments, the reference point may be shifted based on the $10^{th}$ sub-route in an order of a second direction, a third direction, a fourth direction, a first direction, and the second direction, and the reference point may be shifted based on the $11^{th}$ sub-route in an order of the first direction, the second direction, the third direction, the fourth direction, the first direction, and a sixth direction.

In embodiments, the $11^{th}$ sub-route may start after the $10^{th}$ sub-route ends. In such embodiments, a start coordinate of the $10^{th}$ sub-route and an end coordinate of the $11^{th}$ sub-route may be different from each other, and a start coordinate of the $11^{th}$ sub-route and the end coordinate of the $11^{th}$ sub-route may be different from each other.

In embodiments, a center of the shift area may be defined as a zeroth coordinate, and each of the $10^{th}$ and $11^{th}$ sub-routes may have a rectangular shape rotated about the zeroth coordinate by a preset angle. In such embodiments, a $10^{th}$ length of a minor axis of the $10^{th}$ sub-route and an $11^{th}$ length of a minor axis of the $11^{th}$ sub-route may be equal to each other, and a $10^{th}$ length of a major axis of the $10^{th}$ sub-route and an $11^{th}$ length of a major axis of the $11^{th}$ sub-route may be equal to each other.

In embodiments, a start coordinate of the first sub-route and an end coordinate of the $11^{th}$ sub-route may be identical to each other, and each of the start coordinate of the first sub-route and the end coordinate of the $11^{th}$ sub-route may correspond to the zeroth coordinate.

In embodiments, the display device may further include a controller which receives the route shift signal from the display image shift controller, and generates input image data to which the route shift signal is applied, a data driver which selectively receives the input image data to which the route shift signal is applied to generate data voltages corresponding to the display image which is shifted, and provides the data voltages to the display panel, and a gate driver which generates a gate signal, and provides the gate signal to the display panel.

In embodiments, the shift area may have a grid shape having 13 rows and 13 columns, in which 13 imaginary horizontal lines intersect 13 imaginary vertical lines, and 169 intersection points in which the imaginary horizontal lines intersect the imaginary vertical lines may be defined in the shift area. In such embodiments, based on an imaginary horizontal line located in middle among the imaginary horizontal lines or an imaginary vertical line located in middle among the imaginary vertical lines, the first sub-route and the second sub-route may be symmetrical to each other, and the third sub-route and the fourth sub-route are symmetrical to each other.

In embodiments, the display panel may include a plurality of pixels disposed in the display area, and some of the pixels may be arranged to correspond to the intersection points.

According to embodiments of the disclosure, a display device includes a display panel and a display image shift controller. In such embodiments, the display panel includes a display area in which a display image is displayed and a shift area located within the display area. In such embodiments, the display image shift controller which generate a route shift signal, where a reference point of the display image is shifted in the shift area based on a preset route included in a route shift signal. In such embodiments, the preset route includes first to $n^{th}$ sub-routes, where n is an integer that is greater than or equal to 2, and the first to $n^{th}$ sub-routes are different from each other.

According to embodiments of the display device of the disclosure, the shift area may have a square shape corresponding to a matrix shape having 13 rows and 13 columns, first to $11^{th}$ sub-routes included in the first to sixth routes may have mutually different movement paths in the shift area, and the first to $11^{th}$ sub-routes may have mutually different shapes from each other. Accordingly, the reference point may be entirely shifted in the shift area so that the display device may effectively disperse stress applied to the pixel.

In such embodiments, each of the first to $11^{th}$ sub-routes may have a rectangular or square shape rotated by a preset angle, so that the first to $11^{th}$ sub-routes may shorten a time used to reach a maximum movement range through relatively few movement paths. Accordingly, the display device may disperse the stress applied to the pixel in a relatively rapid manner.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
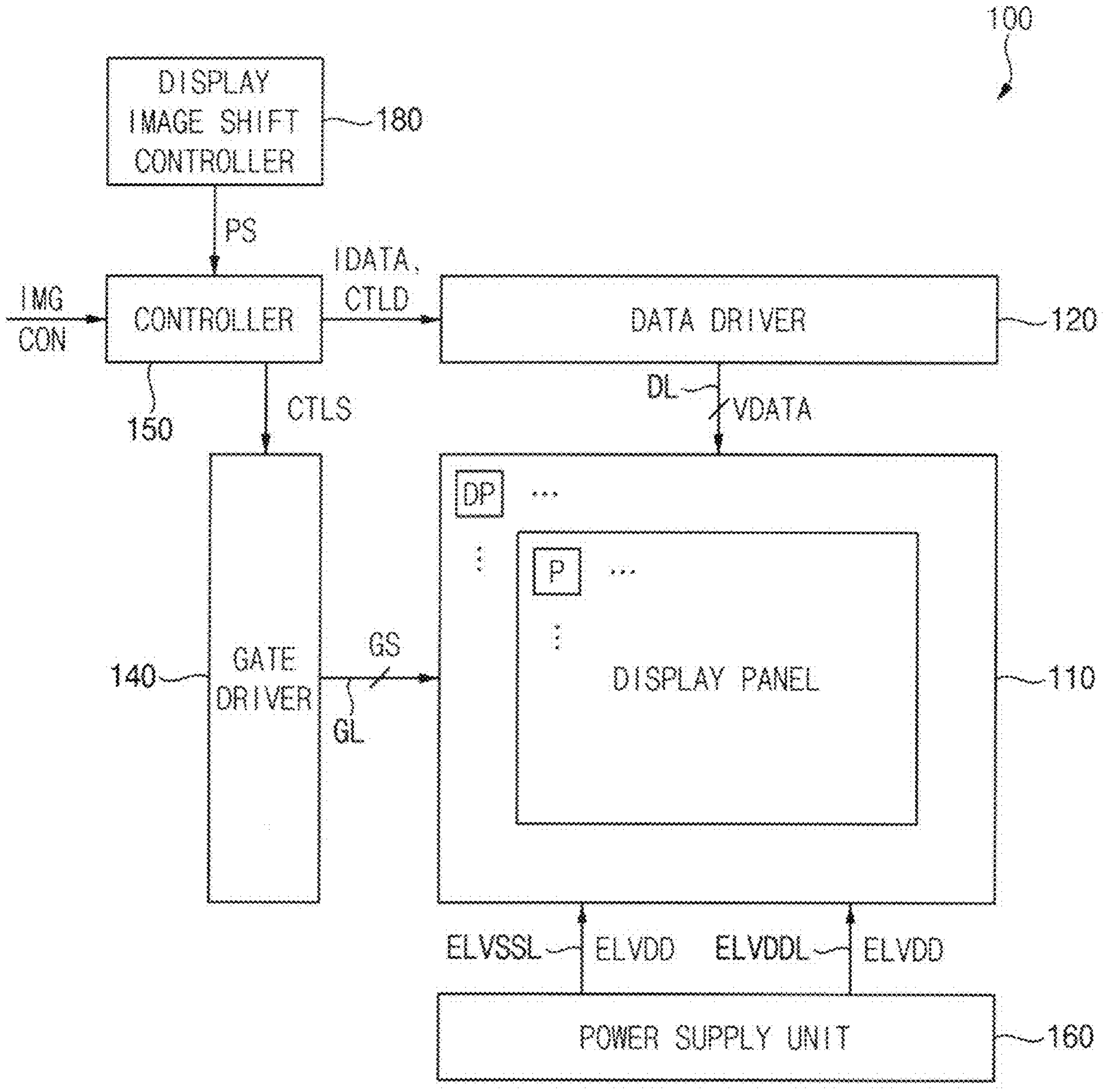
FIG. 1 is a block diagram showing a display device according to embodiments of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

FIG. 1 is a block diagram showing a display device according to embodiments of the disclosure.

Referring to FIG. 1, an embodiment of a display device 100 may include a display panel 110 including a plurality of pixels P and a plurality of dummy pixels DP, a controller 150, a data driver 120, a gate driver 140, a power supply unit 160, a display image shift controller 180, or the like.

The display panel 110 may include a plurality of data lines DL, a plurality of gate lines GL, a first power supply voltage line ELVDDL, a second power supply voltage line ELVSSL, and a plurality of pixels P and a plurality of dummy pixels DP, which are connected to the lines. In an embodiment, as shown in FIG. 1, the pixels P may be disposed at a center of the display panel 110, and the dummy pixels DP may surround the pixels P at an outer periphery of the display panel 110. According to an alternative embodiment, only the pixels P may be provided, and the dummy pixels DP may not be provided.

According to embodiments, each of the pixel P and the dummy pixel DP may include at least two transistors, at least one capacitor, and a light emitting element, and the display panel 110 may be a light emitting display panel. According to embodiments, the display panel 110 may be a display panel of an organic light emitting display ("OLED") device. According to alternative embodiments, the display panel 110 may include a display panel of an inorganic light emitting display ("ILED") device, a display panel of a quantum dot display ("QDD") device, a display panel of a liquid crystal display ("LCD") device, a display panel of a field emission display ("FED") device, a plasma display panel ("PDP"), or a display panel of an electrophoretic display ("EPD") device.

The controller 150 (e.g., a timing controller) may receive image data IMG and an input control signal CON from an external host processor (e.g., an application processor ("AP"), a graphic processing unit ("GPU"), or a graphic card). The image data IMG may be RGB image data (or RGB pixel data) including red image data (or red pixel data), green image data (or green pixel data), and blue image data (or blue pixel data). In addition, the image data IMG may include information on a driving frequency. The control signal CON may include a vertical synchronization signal, a horizontal synchronization signal, an input data enable signal, a master clock signal, and the like, but the embodiments are not limited thereto.

The controller 150 may convert the image data IMG into input image data IDATA by applying an algorithm (e.g., dynamic capacitance compensation ("DCC"), etc.) for correcting image quality to the image data IMG supplied from the external host processor. In some embodiments, where the controller 150 does not include an algorithm for improving image quality, the image data IMG may be output as the input image data IDATA. The controller 150 may supply the input image data IDATA to the data driver 120.

The controller 150 may generates a data control signal CTLD for controlling an operation of the data driver 120 and a gate control signal CTLS for controlling an operation of the gate driver 140 based on the input control signal CON. In an embodiment, for example, the gate control signal CTLS may include a vertical start signal, gate clock signals, and the like, and the data control signal CTLD may include a horizontal start signal, a data clock signal, and the like.

According to embodiments, when the display image is output from (or displayed on) the display panel 110 for a preset time (e.g., 60 seconds), the controller 150 may receive a route shift signal PS from the display image shift controller 180. When the controller 150 receives the route shift signal PS, the controller 150 may supply the input image data IDATA to which the route shift signal PS is applied to the data driver 120 so that the display image is entirely shifted.

The gate driver 140 may generate gate signals GS based on the gate control signal CTLS received from the controller 150. The gate driver 140 may output the gate signals GS to the pixels P and the dummy pixels DP, which are connected to the gate lines GL, respectively.

The power supply unit 160 may generate a first power supply voltage ELVDD and a second power supply voltage ELVSS, and may provide the first power supply voltage ELVDD and the second power supply voltage ELVSS to the pixels P and the dummy pixels DP through the first power supply voltage line ELVDDL and the second power supply voltage line ELVSSL.

The data driver 120 may receive the data control signal CTLD and the input image data IDATA (or the input image data IDATA to which the route shift signal PS is applied) from the controller 150. In addition, the data driver 120 may receive a gamma reference voltage from a gamma reference voltage generator. The data driver 120 may convert digital input image data IDATA into an analog data voltage by using the gamma reference voltage. Herein, the analog data voltage obtained by the conversion will also be referred to as a data voltage VDATA. The data driver 120 may output data voltages VDATA to the pixels P and the dummy pixels DP, which are connected to the data lines DL, based on the data control signal CTLD. In an embodiment, for example, the data driver 120 may include a shift register, a data sampling latch, a data holding latch, a level shifter, a digital-to-analog converter, a buffer, and the like. According to embodiments, the display panel 110 may initially output the display image only through the pixels P without outputting the display image through the dummy pixels DP. In such embodiments, the data driver 120 may receive the input image data IDATA from the controller 150. In embodiments, when the display image is output from (or displayed on) the display panel 110 for the preset time (e.g., 60 seconds), the data driver 120 may receive the input image data IDATA to which the route shift signal PS is applied from the controller 150. In such embodiments, the display image may be entirely shifted in the display panel 110, and the display image may be output through some of the dummy pixels DP.

In some embodiments, the data driver 120 and the controller 150 may be implemented as a single integrated circuit, and such an integrated circuit may be referred to as a timing controller-embedded data driver ("TED").

The display image shift controller 180 may generate the route shift signal PS, and may supply the route shift signal PS to the controller 150. The route shift signal PS may include information on a path through which the display image is shifted. In some embodiments, the display image shift controller 180 and the controller 150 may be implemented as a single integrated circuit.

Figure 2:
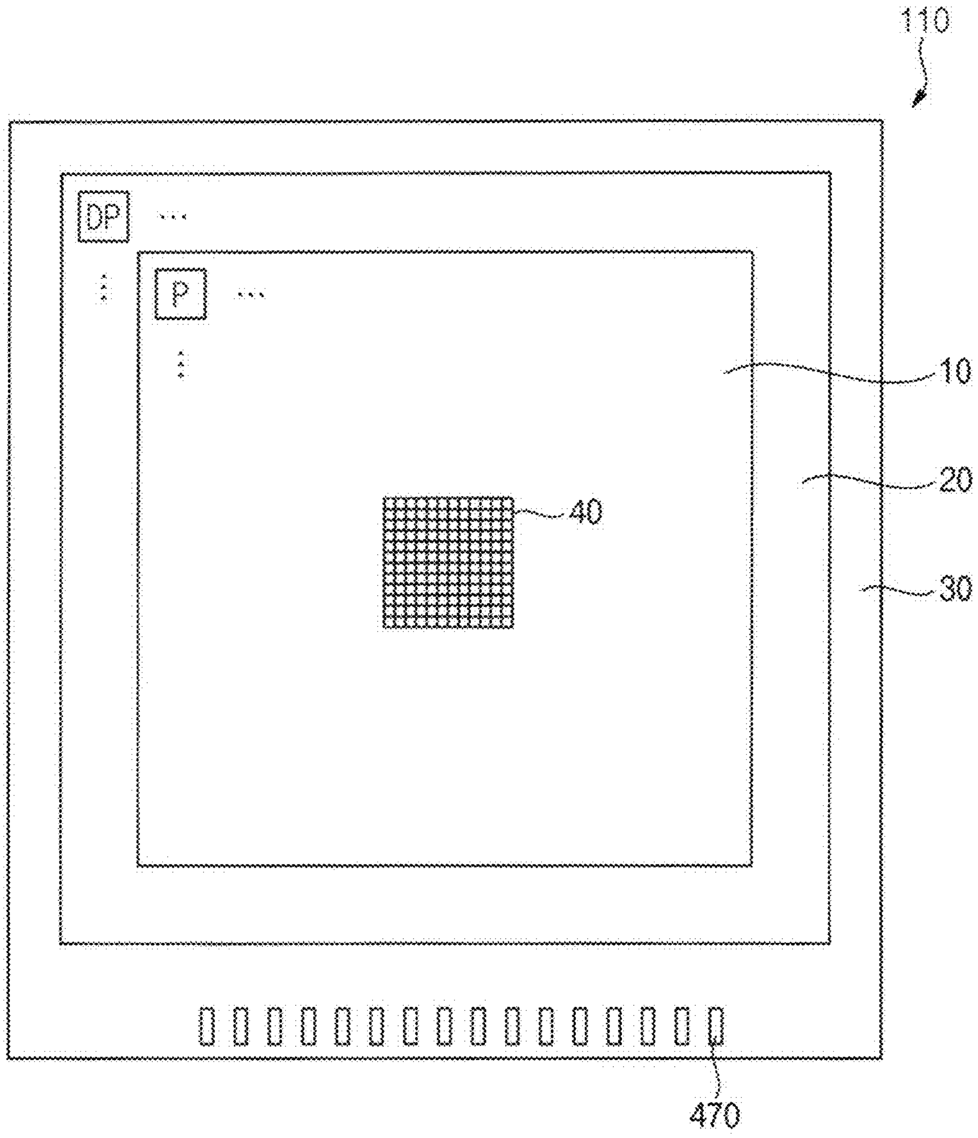
FIG. 2 is a plan view showing a display panel included in the display device of FIG. 1.
Figure 3A:
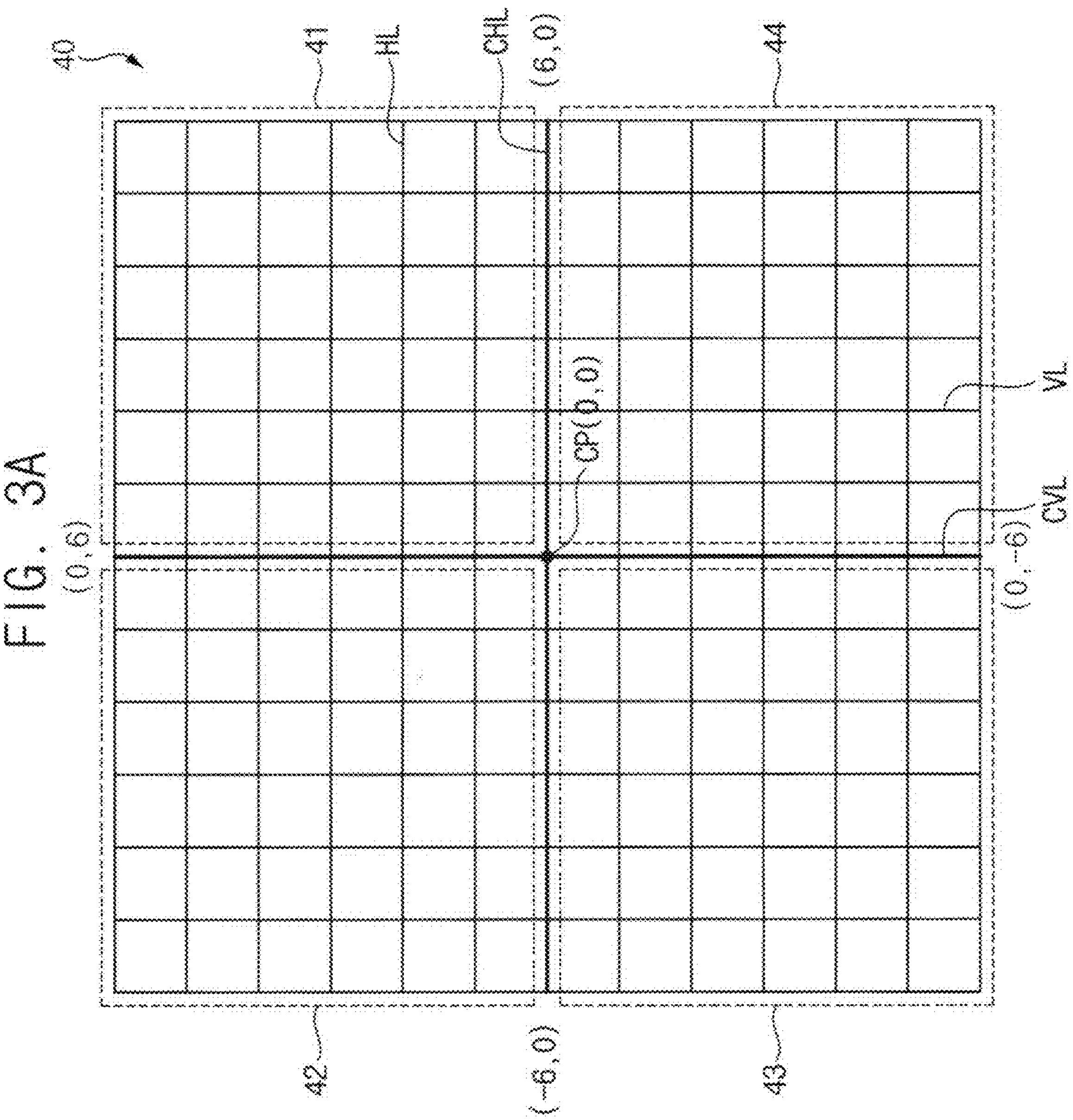
FIG. 3A is a plan view showing a shift area included in the display panel of FIG. 1.
Figure 3B:
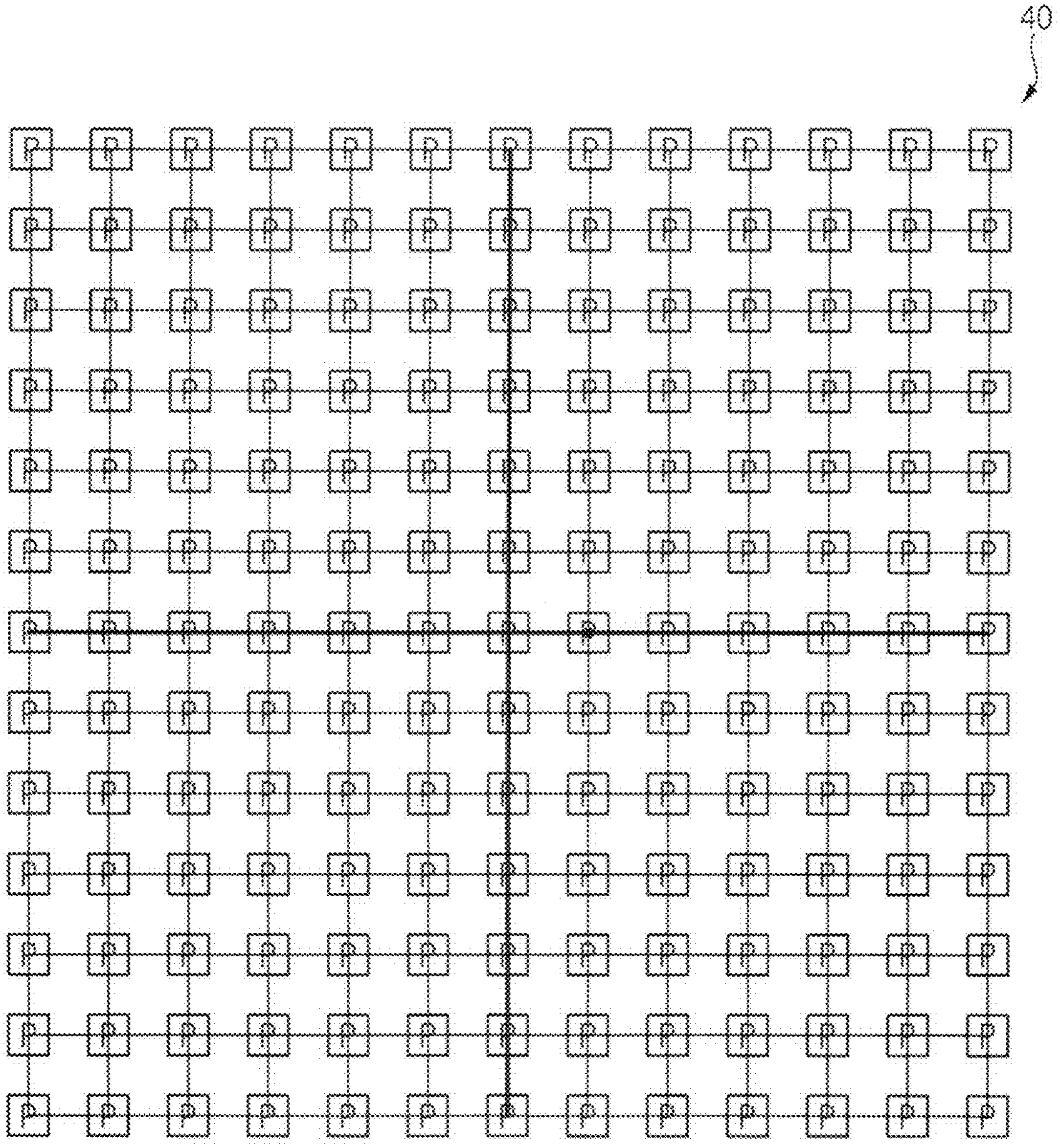
FIG. 3B is a plan view showing pixels disposed in the shift area of FIG. 3A.

FIG. 2 is a plan view showing a display panel included in the display device of FIG. 1, FIG. 3A is a plan view showing a shift area included in the display panel of FIG. 1, and FIG. 3B is a plan view showing pixels disposed in the shift area of FIG. 3A.

Referring to FIGS. 2, 3A, and 3B, the display panel 110 may include a pixel area 10, a dummy pixel area 20, a peripheral area 30, and a shift area 40 (or a route region). The pixels P may be disposed in the pixel area 10. The dummy pixels DP may be disposed in the dummy pixel area 20. Wires and pad electrodes 470 electrically connected to an external device may be disposed in the peripheral area 30. In some embodiments, the controller 150, the power supply unit 160, the data driver 120, and/or the gate driver 140 may be disposed in the peripheral area 30. The shift area 40 may be located within the pixel area 10.

The shift area 40 may include imaginary horizontal lines HL and imaginary vertical lines VL, an imaginary horizontal line HL located in the middle among the imaginary horizontal lines HL will be defined as an imaginary central horizontal line CHL, and an imaginary vertical line VL located in the middle among the imaginary vertical lines VL will be defined as an imaginary central vertical line CVL. Herein, although coordinates of the shift area 40 may be defined based on the imaginary horizontal lines HL and the imaginary vertical lines VL in the shift area 40 for convenience of description, the imaginary horizontal lines HL and the imaginary vertical lines VL are imaginary lines, and substantial components are not additionally provided to the display panel 110.

According to embodiments, the number of the imaginary horizontal lines HL may be 13, and the number of the imaginary vertical lines VL may also be 13. In such embodiments, the shift area 40 may have a square shape. The pixels P may be disposed at intersection points in which 13 imaginary horizontal lines HL intersect 13 imaginary vertical lines VL. In such embodiments, as shown in FIG. 3B, the imaginary horizontal lines HL may correspond to pixel rows of the pixels P, and the imaginary vertical lines VL may correspond to pixel columns of the pixels P. In an embodiment, for example, coordinates of the intersection points may be formed to define an intersection point coordinate in which the imaginary central horizontal line CHL intersects the imaginary central vertical line CVL as (0, 0). In such embodiments, a coordinate located at a right end of the imaginary central horizontal line CHL may correspond to (6, 0), and a coordinate located at a left end of the imaginary central horizontal line CHL may correspond to (−6, 0). In such embodiments, a coordinate located at an upper end of the imaginary central vertical line (CVL) may correspond to (0, 6), and a coordinate located at a lower end of the imaginary central vertical line CVL may correspond to (0, −6). In such embodiments, the intersection points may be arranged in a matrix shape (or a grid shape) having 13 rows and 13 columns, and 169 pixels P may be arranged in the shift area 40 to correspond to the intersection points (see FIG. 3B). In an embodiment, for example, each of the pixels P may include at least two sub-pixels.

The shift area 40 may include first, second, third, and fourth areas 41, 42, 43, and 44. In the first area 41, all numerical values of the coordinates may be positive values. In the second area 42, a numerical value corresponding to the imaginary central horizontal line CHL may be a negative value, and a numerical value corresponding to the imaginary central vertical line CVL may be a positive value. In the third area 43, a numerical value corresponding to the imaginary central horizontal line CHL may be a negative value, and a numerical value corresponding to the imaginary central vertical line CVL may be a negative value. In the fourth area 44, a numerical value corresponding to the imaginary central horizontal line CHL may be a positive value, and a numerical value corresponding to the imaginary central vertical line CVL may be a negative value.

The display panel 110 may initially display the display image only in the pixel area 10, and a center of the display image will be defined as a reference point CP. The reference point CP may initially correspond to (0, 0) in the shift area 40. In some embodiments, the reference point CP may be located at a preset position of the display image.

When the display image is output from the display panel 110 for the preset time, the data driver 120 may receive the input image data IDATA, to which the route shift signal PS is applied, from the controller 150 such that the reference point CP may be shifted within the shift area 40. When the reference point CP is shifted, the display image may be entirely shifted, and the display image may also be output through some of the dummy pixels DP. In such embodiments, the controller 150 may provide the input image data IDATA to which the route shift signal PS is applied to the data driver 120 to output the shifted display image, and the data driver 120 may provide data voltages VDATA corresponding to the shifted display image to the display panel 110 based on the input image data IDATA to which the route shift signal PS is applied. In some embodiments, the display panel 110 may not include the dummy pixels DP, and when the reference point CP is shifted in the shift area 40, a portion of the display image may not be displayed on the display panel 110. In an embodiment, for example, the shift area 40 may have a grid shape having 13 rows and 13 columns, in which 13 imaginary horizontal lines HL intersect 13 imaginary vertical lines VL, 169 intersection points in which the imaginary horizontal lines HL intersect the imaginary vertical lines VL may be generated in the shift area 40, the reference point CP may be located at one intersection point among the intersection points, and the reference point CP located at the one intersection point may be shifted to one of eight intersection points that are adjacent to the one intersection point after the preset time.

In embodiments, as described above, each of the numbers of the imaginary horizontal lines HL and the imaginary vertical lines VL may be 13, but the configuration of embodiments of the disclosure is not limited thereto. In an alternative embodiment, for example, each of the numbers of the imaginary horizontal lines HL and the imaginary vertical lines VL may be less than or equal to 12, or greater than or equal to 14.

In embodiments, as described above, the shift area 40 may have a square shape, but the shape of the shift area 40 is not limited thereto. In an alternative embodiment, for example, the shift area 40 may have a rectangular shape.

In embodiments, as described above, one pixel P may be disposed at the intersection point in which the imaginary horizontal line HL intersects the imaginary vertical line VL, as shown in FIG. 3B, but the configuration of embodiments of the disclosure is not limited thereto. In an embodiment, for example, one sub-pixel may be disposed at the intersection point.

Figure 4:
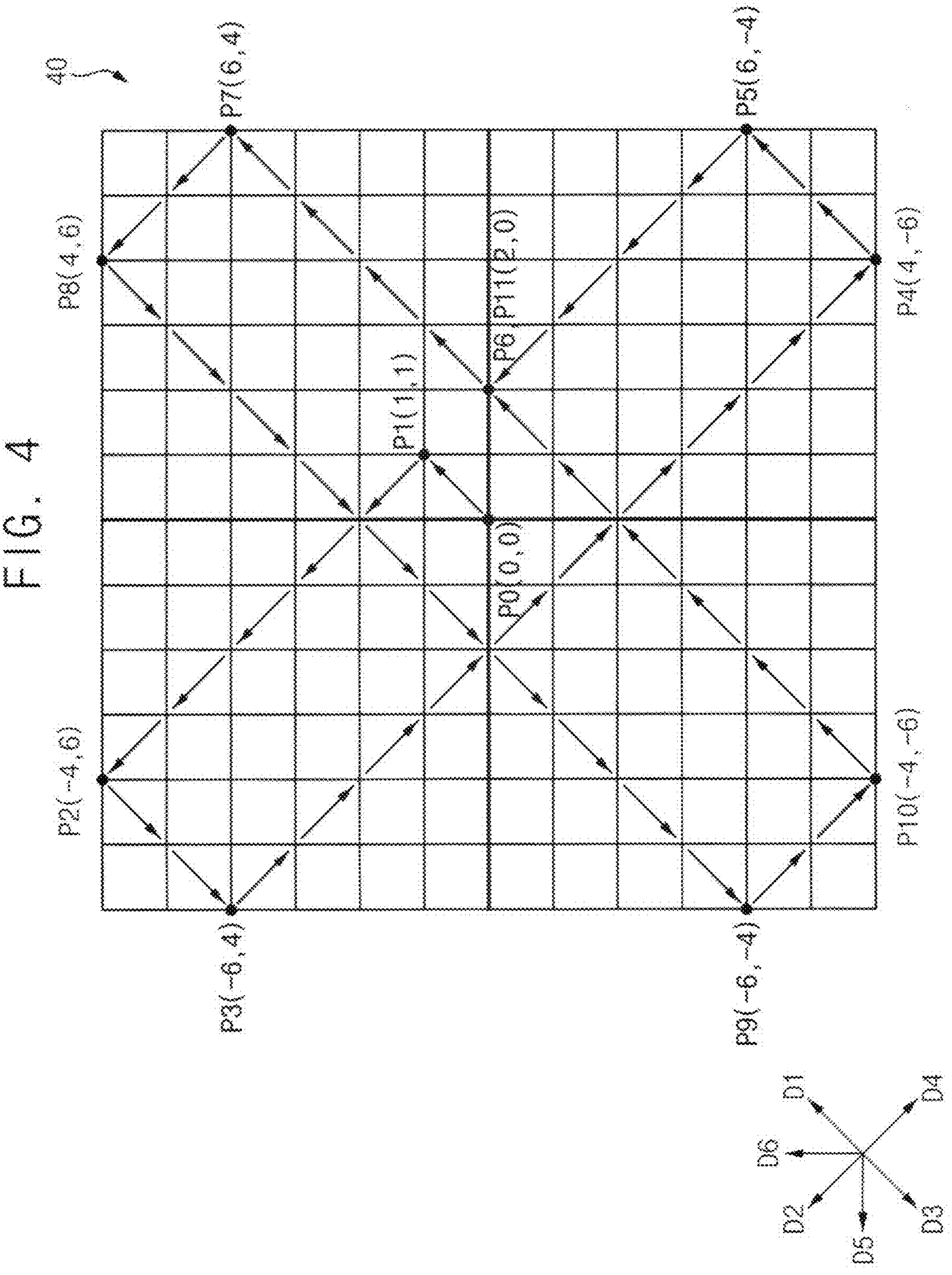
FIGS. 4 and 5 are plan views showing a first route in the shift area of FIG. 3A.
Figure 5:
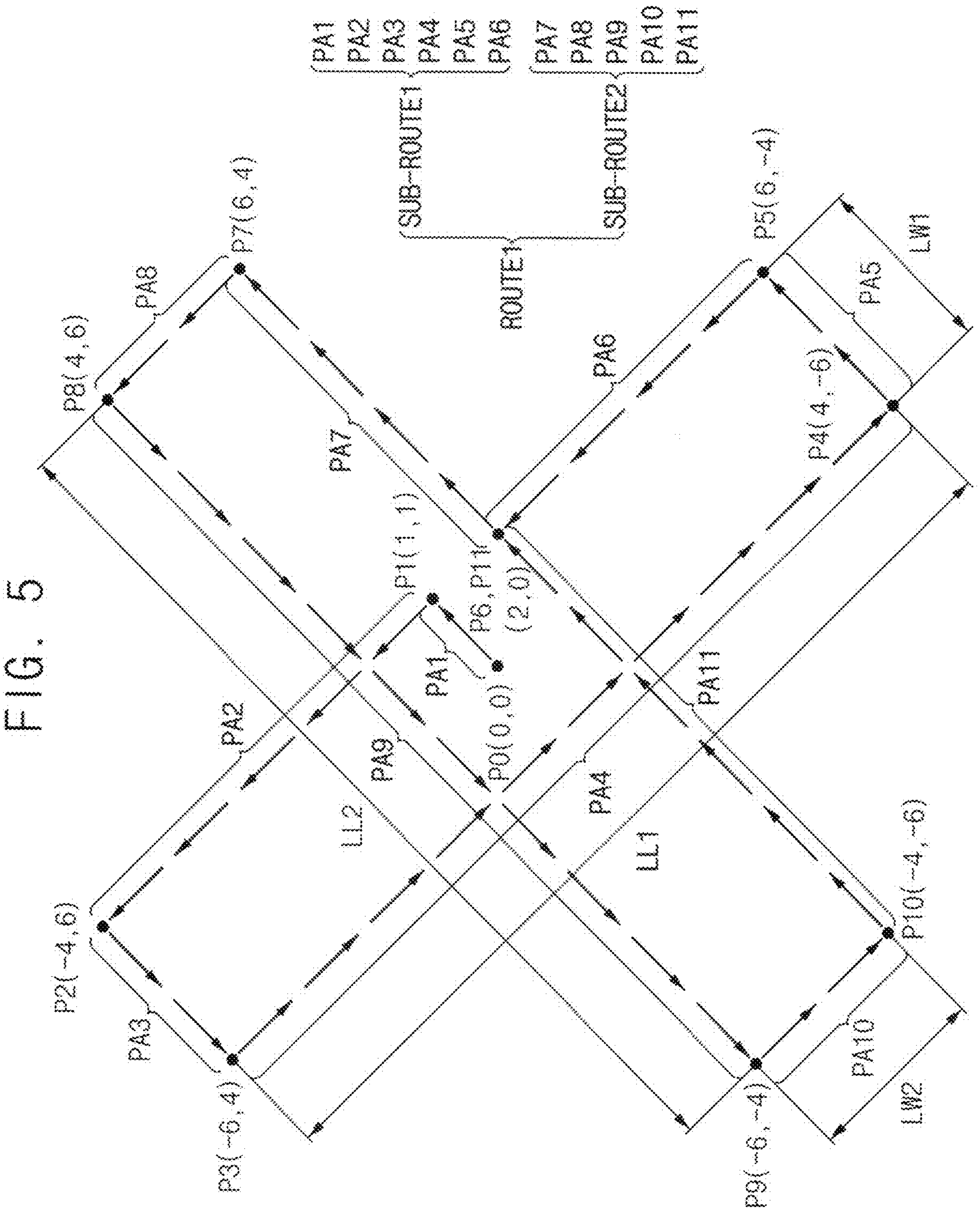
Figure 6:
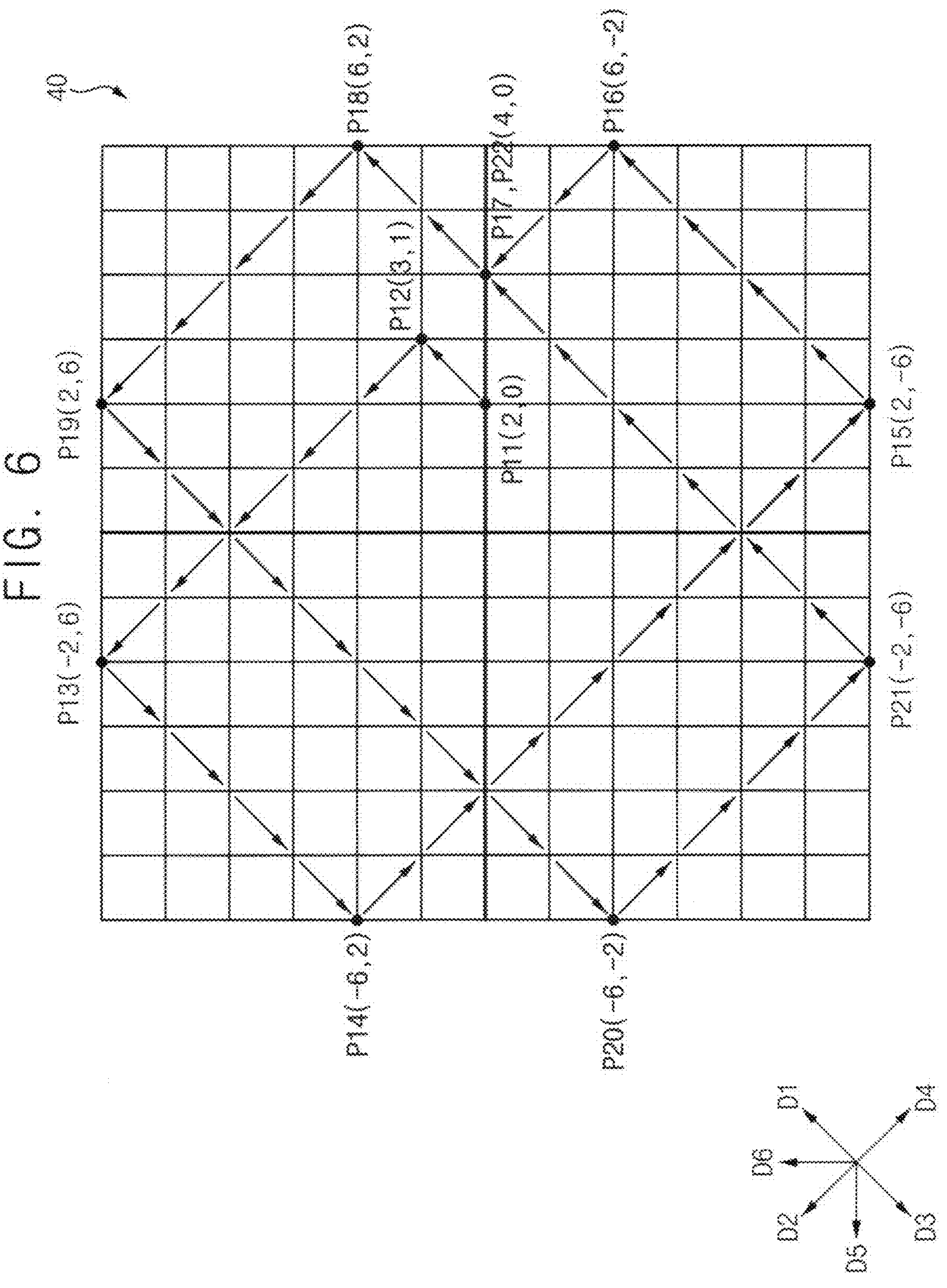
FIGS. 6 and 7 are plan views showing a second route in the shift area of FIG. 3A.
Figure 7:
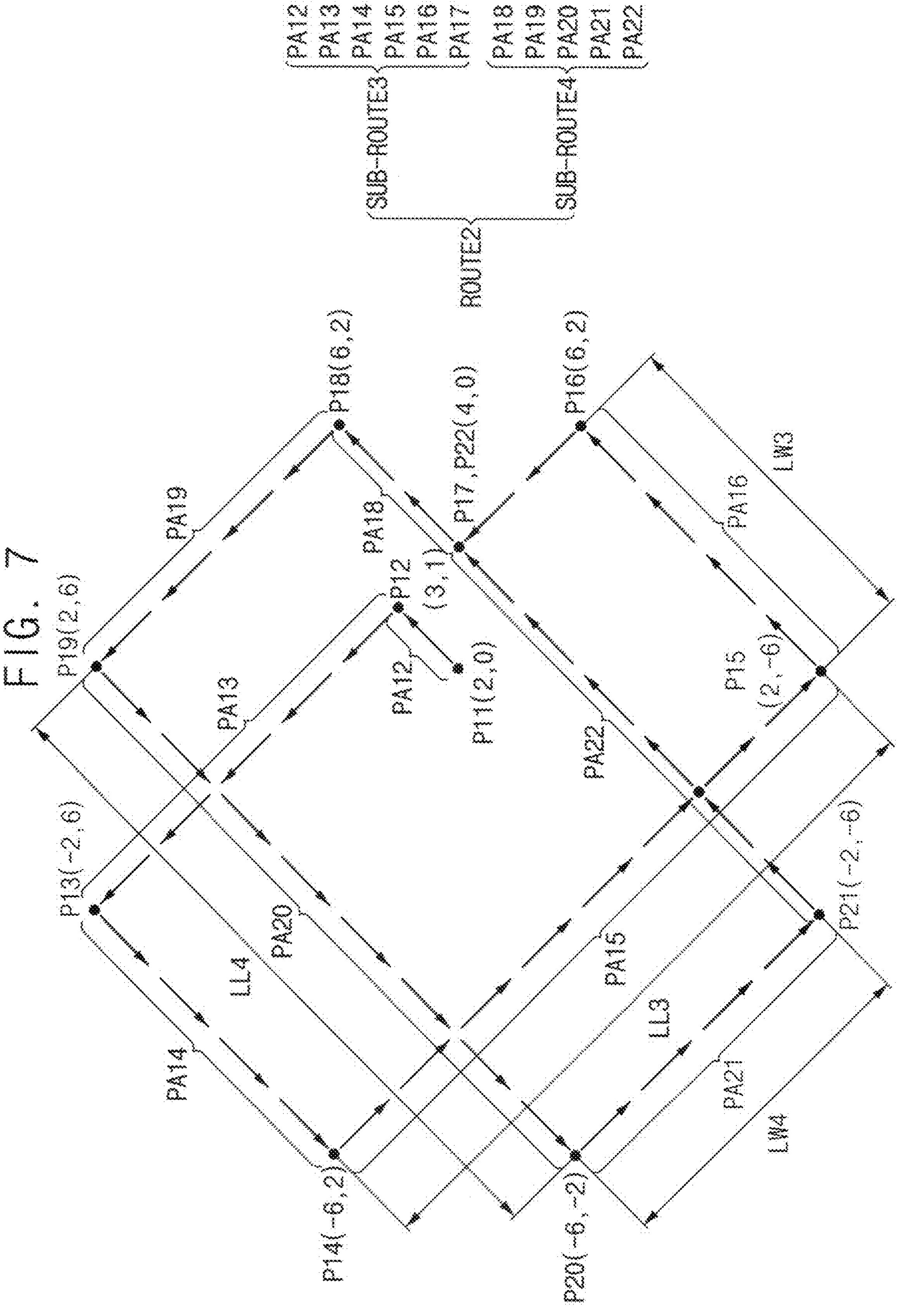
Figure 8:
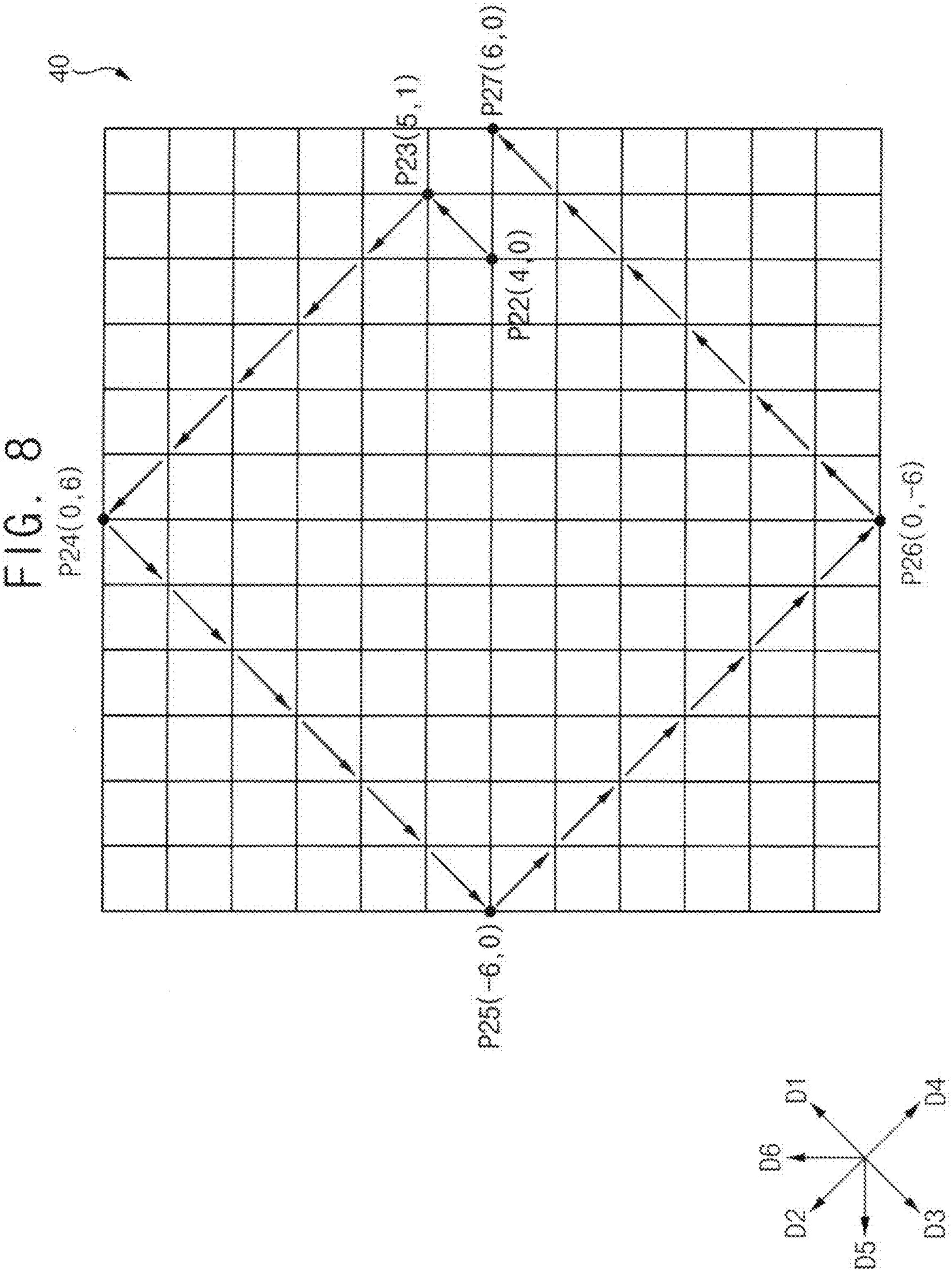
FIGS. 8 and 9 are plan views showing a third route in the shift area of FIG. 3A.
Figure 9:
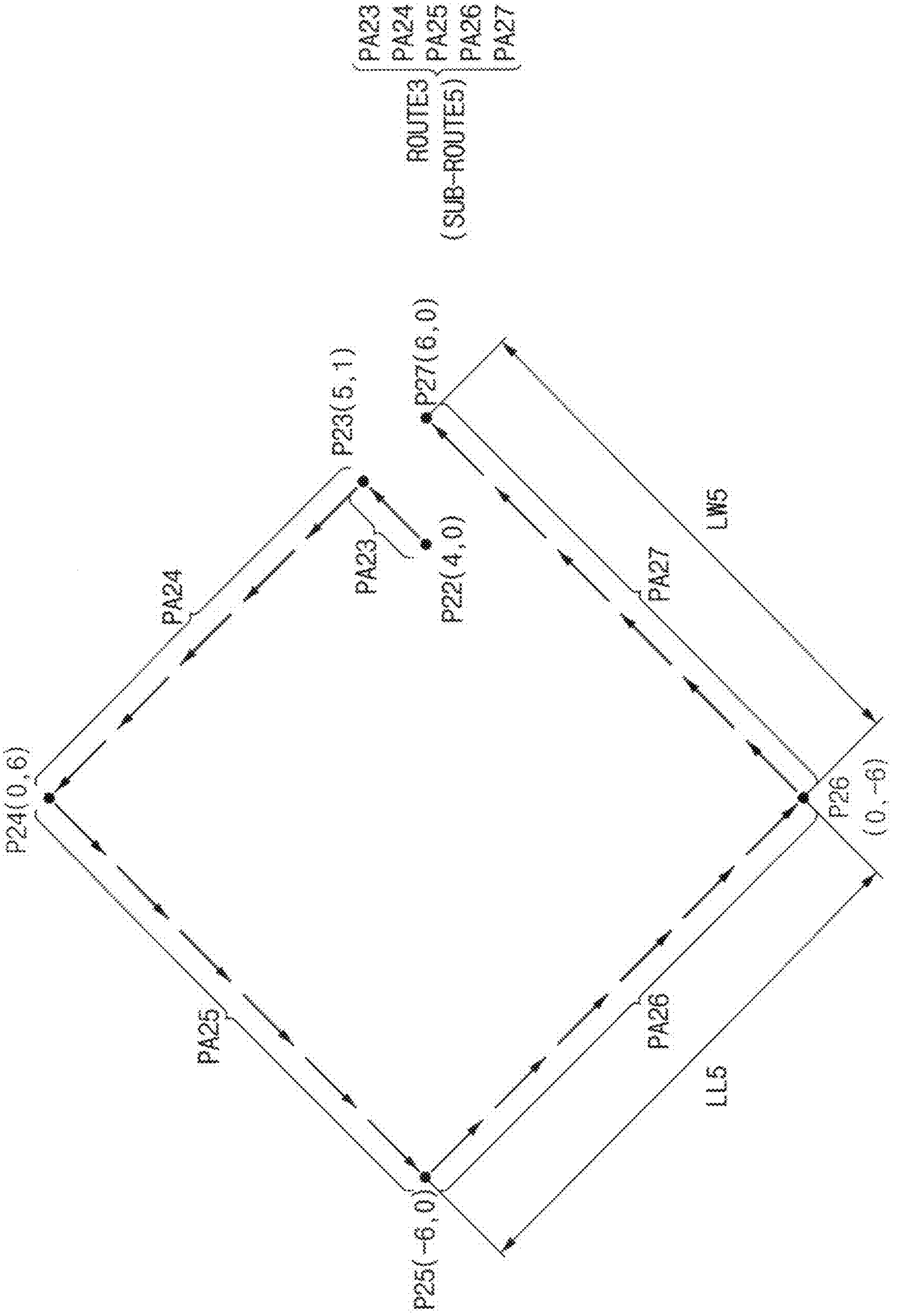
Figure 10:
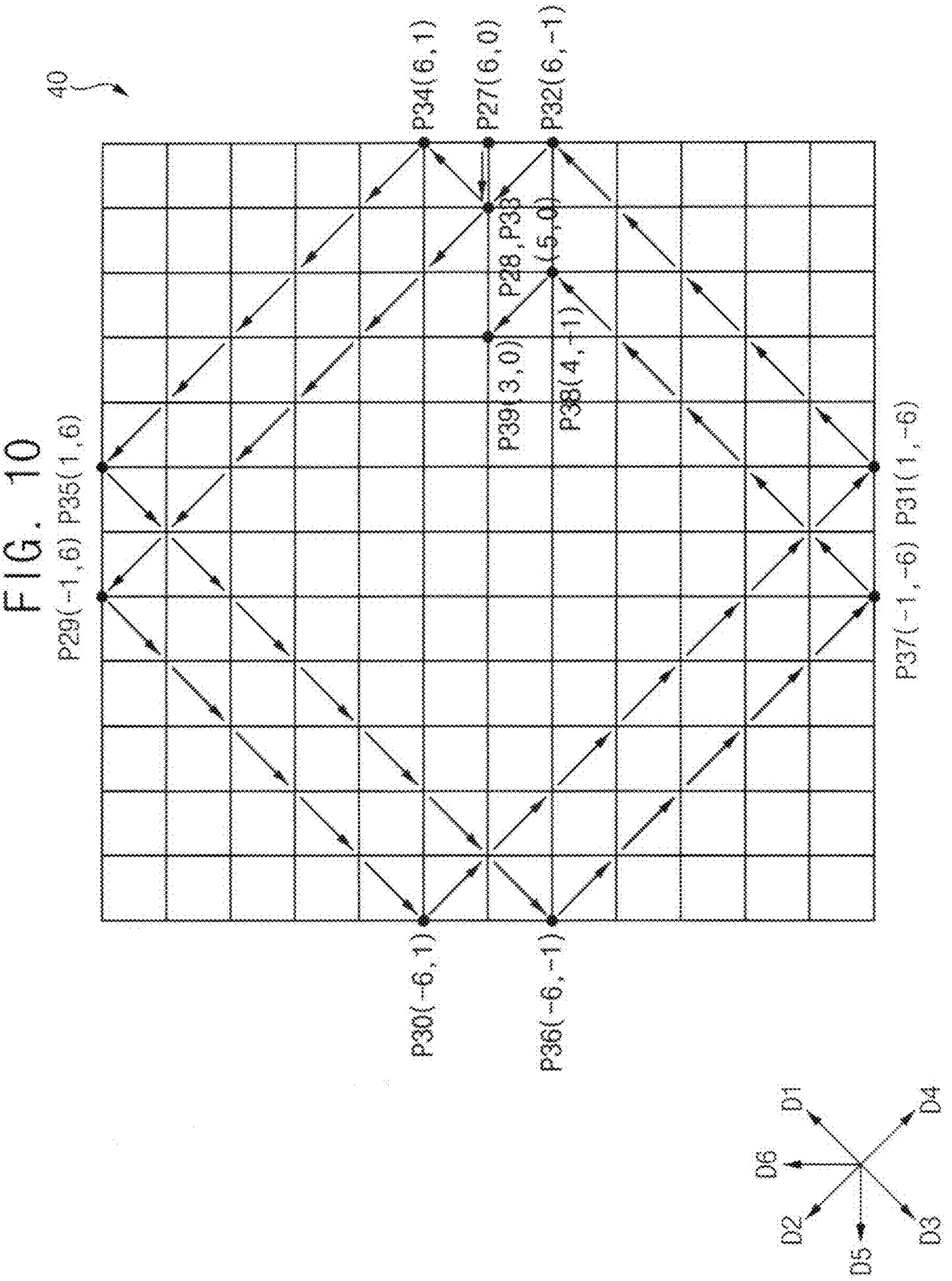
FIGS. 10 and 11 are plan views showing a fourth route in the shift area of FIG. 3A.
Figure 11:
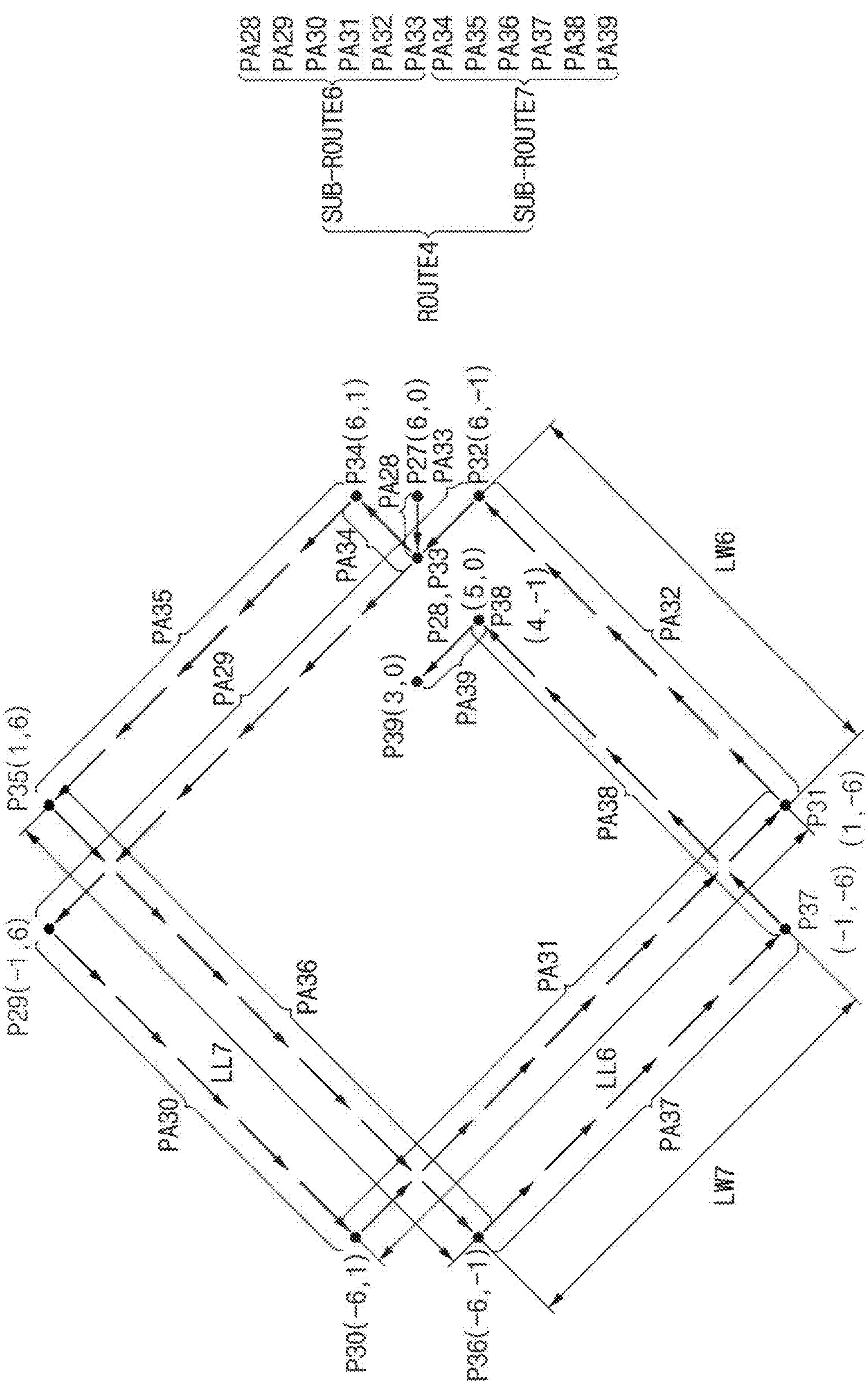
Figure 12:
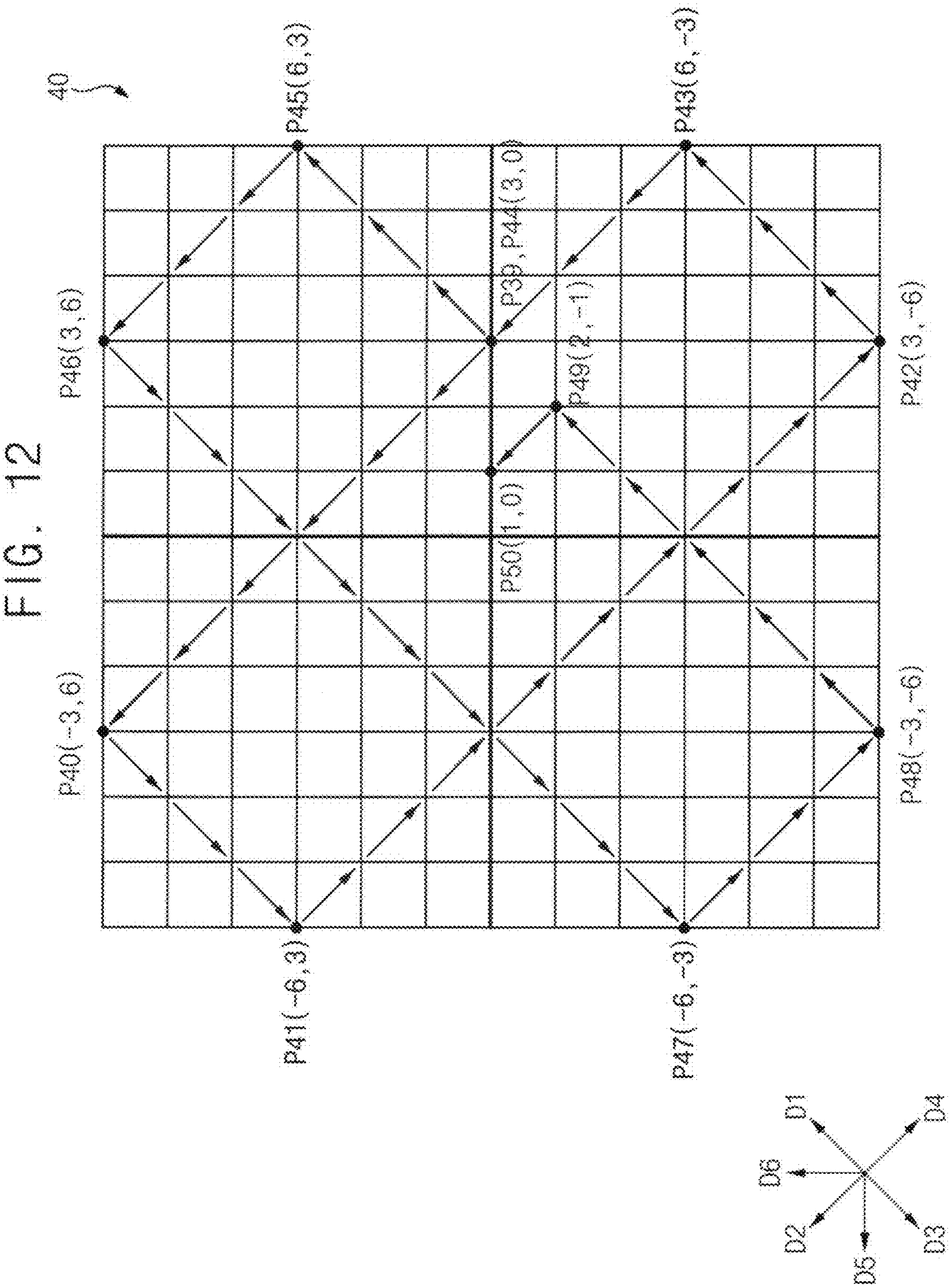
FIGS. 12 and 13 are plan views showing a fifth route in the shift area of FIG. 3A.
Figure 13:
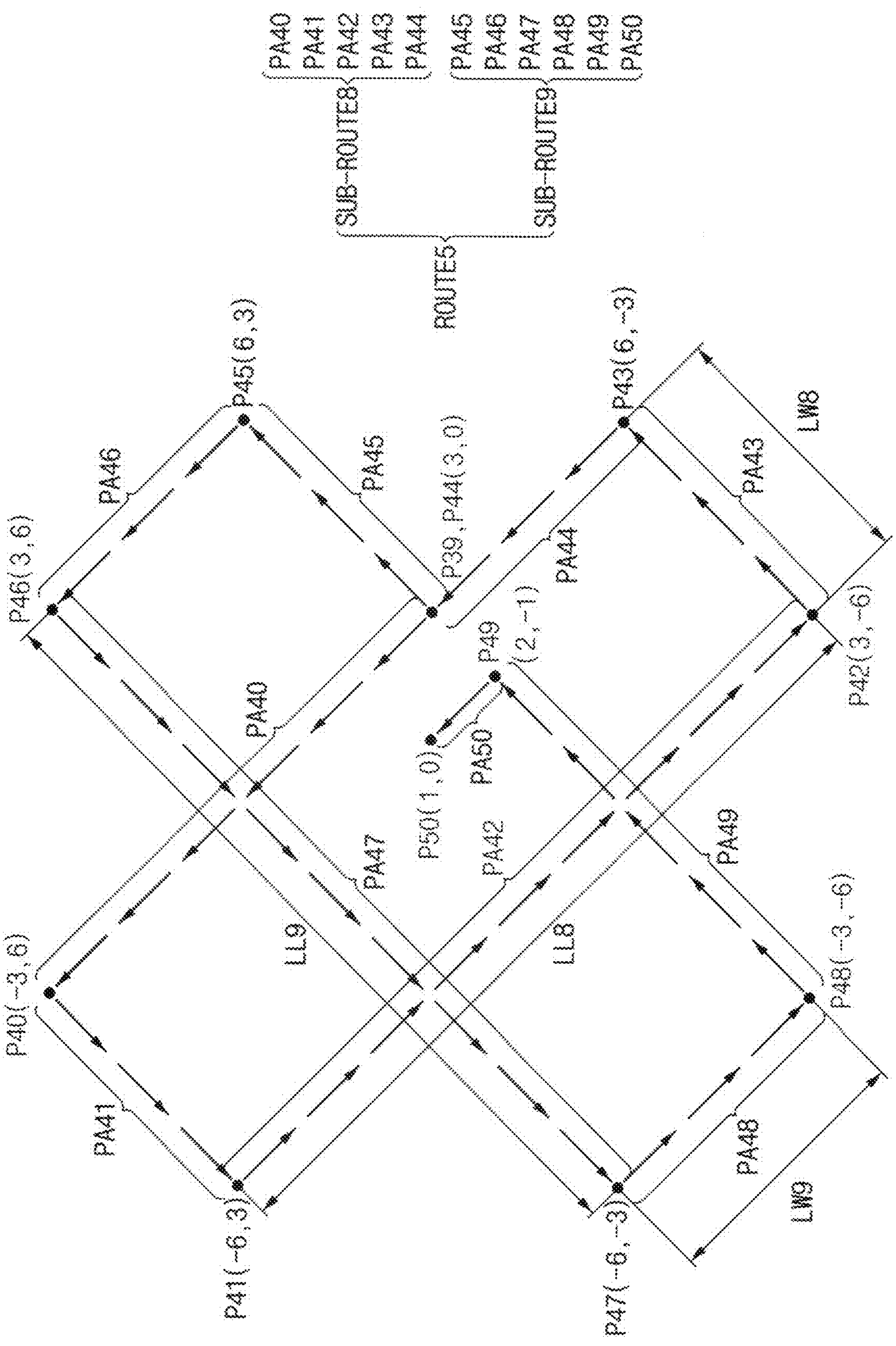
Figure 14:
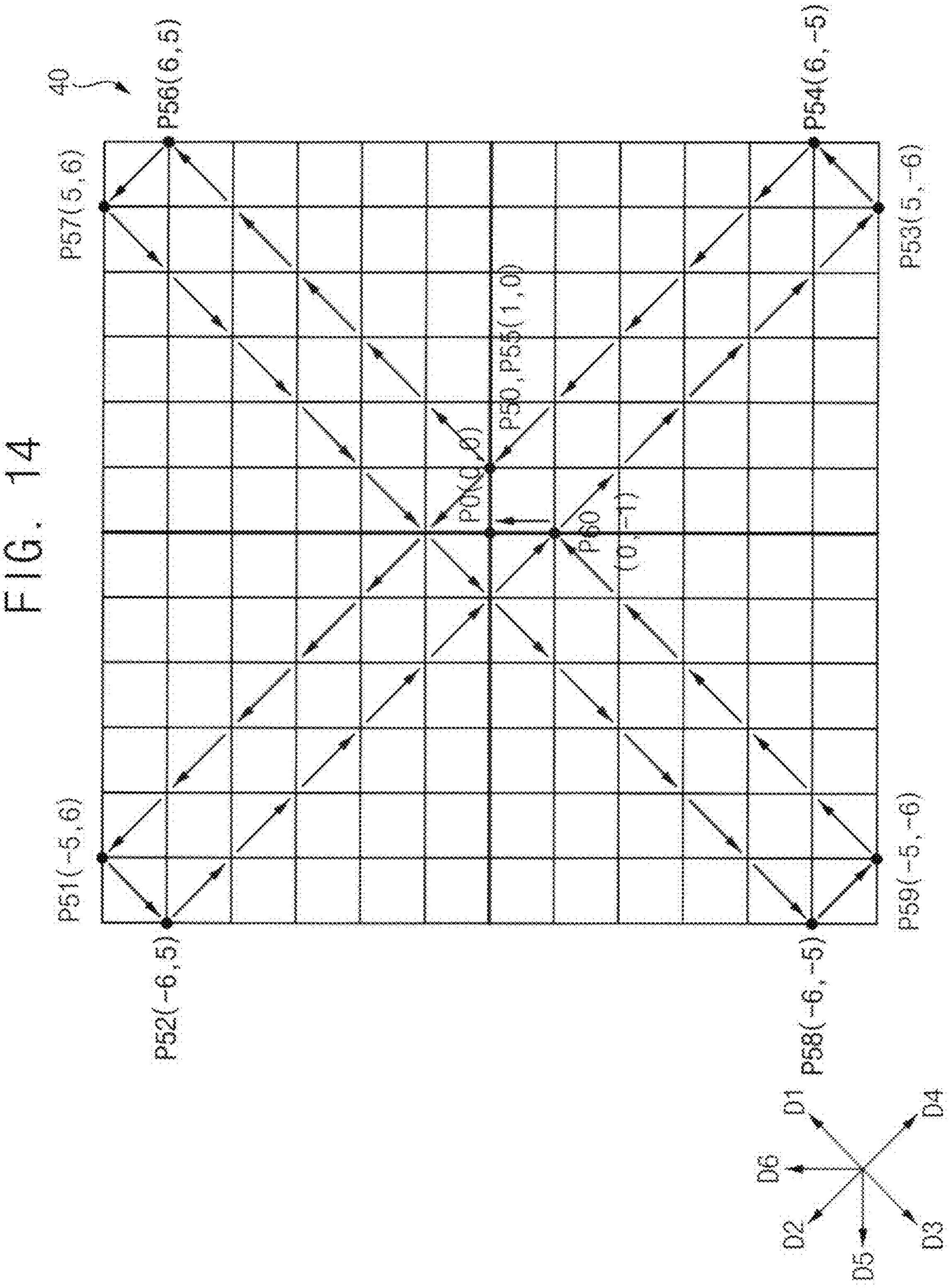
FIGS. 14 and 15 are plan views showing a sixth route in the shift area of FIG. 3A.
Figure 15:
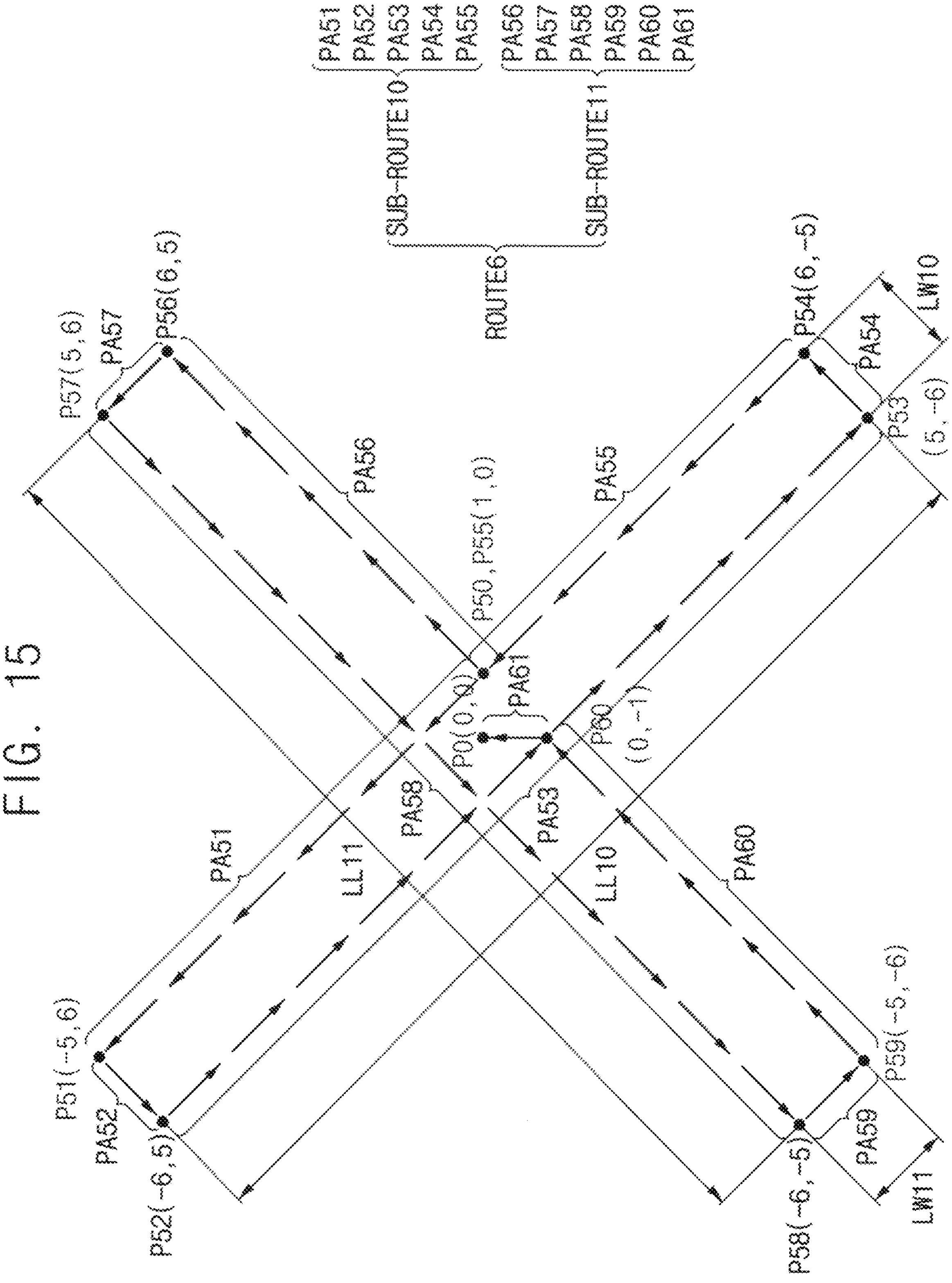

FIGS. 4 and 5 are plan views showing a first route in the shift area of FIG. 3A, FIGS. 6 and 7 are plan views showing a second route in the shift area of FIG. 3A, FIGS. 8 and 9 are plan views showing a third route in the shift area of FIG. 3A, FIGS. 10 and 11 are plan views showing a fourth route in the shift area of FIG. 3A, FIGS. 12 and 13 are plan views showing a fifth route in the shift area of FIG. 3A, and FIGS. 14 and 15 are plan views showing a sixth route in the shift area of FIG. 3A.

Referring to FIGS. 1, and 4 to 16, in embodiments, the route shift signal PS generated by the display image shift controller 180 may include information on first, second, third, fourth, fifth, and sixth routes ROUTE1, ROUTE2, ROUTE3, ROUTE4, ROUTE5, and ROUTE6. The first to sixth routes ROUTE1, ROUTE2, ROUTE3, ROUTE4, ROUTE5, and ROUTE6 may correspond to paths through which the reference point CP is shifted. In such embodiments, the reference point CP may be shifted along the first, second, third, fourth, fifth, and sixth routes ROUTE1, ROUTE2, ROUTE3, ROUTE4, ROUTE5, and ROUTE6, so that the data voltage VDATA to be provided to the pixel P corresponding to the reference point CP may also be provided to the pixel P shifted along the first, second, third, fourth, fifth, and sixth routes ROUTE1, ROUTE2, ROUTE3, ROUTE4, ROUTE5, and ROUTE6. In such embodiments, the data voltages VDATA to be provided to the pixels P corresponding to the display image may be provided to some of the pixels P and some of the dummy pixels DP as the display image is entirely shifted.

Referring to FIGS. 4 and 5, the display panel 110 may initially display the display image only in the pixel area 10, the reference point CP may be initially located at (0, 0) in the shift area 40, and a position corresponding to (0, 0) will be defined as a zeroth coordinate P0. In other words, the reference point CP may be located at the center of the display image. When the display image is consistently (or continuously) output from (or displayed on) the display panel 110, after a preset time, the data driver 120 may receive the input image data IDATA, to which the route shift signal PS is applied, from the controller 150. The data driver 120 may provide the data voltages VDATA corresponding to the shifted display image to the display panel 110 based on the input image data IDATA to which the route shift signal PS is applied. In such embodiments, the controller 150 may shift the reference point CP to (1, 1) in the shift area 40 based on the first route ROUTE1, and (1, 1) that is a position to which the reference point CP is shifted will be defined as a first coordinate P1. In this case, since the reference point CP is shifted from the zeroth coordinate P0 to the first coordinate P1, the display image may be entirely shifted in an upper right direction (e.g., a first direction D1). As shown in FIG. 5, a path from the zeroth coordinate P0 to the first coordinate P1 will be defined as a first path PA1.

When the display image is consistently output from the display panel 110 after the reference point CP is shifted from the zeroth coordinate P0 to the first coordinate P1, the controller 150 may shift the reference point CP in an upper left direction (e.g., a second direction D2) of the display panel 110 in the shift area 40 based on the first route ROUTE1 every preset time. In an embodiment, for example, the controller 150 may shift the reference point CP from the zeroth coordinate P0 to (0, 2), (−1, 3), (−2, 4), (−3, 5), and (−4, 6) in the shift area 40 every preset time, and (−4, 6) that is a position to which the reference point CP is shifted will be defined as a second coordinate P2. In this case, since the reference point CP is shifted from the first coordinate P1 to the second coordinate P2, the entire display image may be gradually shifted in the upper left direction. As shown in FIG. 5, a path from the first coordinate P1 to the second coordinate P2 will be defined as a second path PA2.

When the display image is consistently output from the display panel 110 after the reference point CP is shifted to the second coordinate P2, the controller 150 may shift the reference point CP in a lower left direction (e.g., a third direction D3) in the shift area 40 based on the first route ROUTE1 every preset time. In an embodiment, for example, the controller 150 may shift the reference point CP from the second coordinate P2 to (−5, 5) and (−6, 4) in the shift area 40 every preset time, and (−6, 4) that is a position to which the reference point CP is shifted will be defined as a third coordinate P3. In this case, since the reference point CP is shifted from the second coordinate P2 to the third coordinate P3, the entire display image may be gradually shifted in the lower left direction. As shown in FIG. 5, a path from the second coordinate P2 to the third coordinate P3 will be defined as a third path PA3.

When the display image is consistently output from the display panel 110 after the reference point CP is shifted to the third coordinate P3, the controller 150 may shift the reference point CP in a lower right direction (e.g., a fourth direction D4) in the shift area 40 based on the first route ROUTE1 every preset time. In an embodiment, for example, the controller 150 may shift the reference point CP from the third coordinate P3 to (−5, 3), (−4, 2), (−3, 1), (−2, 0), (−1, −1), (0, −2), (1, −3), (2, −4), (3, −5), and (4, −6) in the shift area 40 every preset time, and (4, −6) that is a position to which the reference point CP is shifted will be defined as a fourth coordinate P4. In this case, since the reference point CP is shifted from the third coordinate P3 to the fourth coordinate P4, the entire display image may be gradually shifted in the lower right direction. As shown in FIG. 5, a path from the third coordinate P3 to the fourth coordinate P4 will be defined as a fourth path PA4.

When the display image is consistently output from the display panel 110 after the reference point CP is shifted to the fourth coordinate P4, the controller 150 may shift the reference point CP in the upper right direction in the shift area 40 based on the first route ROUTE1 every preset time. In an embodiment, for example, the controller 150 may shift the reference point CP from the fourth coordinate P4 to (5, −5) and (6, −4) in the shift area 40 every preset time, and (6, −4) that is a position to which the reference point CP is shifted will be defined as a fifth coordinate P5. In this case, since the reference point CP is shifted from the fourth coordinate P4 to the fifth coordinate P5, the entire display image may be gradually shifted in the upper right direction. As shown in FIG. 5, a path from the fourth coordinate P4 to the fifth coordinate P5 will be defined as a fifth path PA5.

When the display image is consistently output from the display panel 110 after the reference point CP is shifted to the fifth coordinate P5, the controller 150 may shift the reference point CP in the upper left direction in the shift area 40 based on the first route ROUTE1 every preset time. In an embodiment, for example, the controller 150 may shift the reference point CP from the fifth coordinate P5 to (5, −3), (4, −2), (3, −1), and (2, 0) in the shift area 40 every preset time, and (2, 0) that is a position to which the reference point CP is shifted will be defined as a sixth coordinate P6. In this case, since the reference point CP is shifted from the fifth coordinate P5 to the sixth coordinate P6, the entire display image may be gradually shifted in the upper left direction. As shown in FIG. 5, a path from the fifth coordinate P5 to the sixth coordinate P6 will be defined as a sixth path PA6, and the first path PA1, the second path PA2, the third path PA3, the fourth path PA4, the fifth path PA5, and the sixth path PA6 will be defined as a first sub-route SUB-ROUTE1.

When the display image is consistently output from the display panel 110 after the reference point CP is shifted to the sixth coordinate P6, the controller 150 may shift the reference point CP in the upper right direction in the shift area 40 based on the first route ROUTE1 every preset time. In an embodiment, for example, the controller 150 may shift the reference point CP from the sixth coordinate P6 to (3, 1), (4, 2), (5, 3), and (6, 4) in the shift area 40 every preset time, and (6, 4) that is a position to which the reference point CP is shifted will be defined as a seventh coordinate P7. In this case, since the reference point CP is shifted from the sixth coordinate P6 to the seventh coordinate P6, the entire display image may be gradually shifted in the upper right direction. As shown in FIG. 5, a path from the sixth coordinate P6 to the seventh coordinate P7 will be defined as a seventh path PA7.

When the display image is consistently output from the display panel 110 after the reference point CP is shifted to the seventh coordinate P7, the controller 150 may shift the reference point CP in the upper left direction in the shift area 40 based on the first route ROUTE1 every preset time. In an embodiment, for example, the controller 150 may shift the reference point CP from the seventh coordinate P7 to (5, 5) and (4, 6) in the shift area 40 every preset time, and (4, 6) that is a position to which the reference point CP is shifted will be defined as an eighth coordinate P8. In this case, since the reference point CP is shifted from the seventh coordinate P7 to the eighth coordinate P8, the entire display image may be gradually shifted in the upper left direction. As shown in FIG. 5, a path from the seventh coordinate P7 to the eighth coordinate P8 will be defined as an eighth path PA8.

When the display image is consistently output from the display panel 110 after the reference point CP is shifted to the eighth coordinate P8, the controller 150 may shift the reference point CP in the lower left direction in the shift area 40 based on the first route ROUTE1 every preset time. In an embodiment, for example, the controller 150 may shift the reference point CP from the eighth coordinate P8 to (3, 5), (2, 4), (1, 3), (0, 2), (−1, 1), (−2, 0), (−3, −1), (−4, −2), (−5, −3), and (−6, −4) in the shift area 40 every preset time, and (−6, −4) that is a position to which the reference point CP is shifted will be defined as a ninth coordinate P9. In this case, since the reference point CP is shifted from the eighth coordinate P8 to the ninth coordinate P9, the entire display image may be gradually shifted in the lower left direction. As shown in FIG. 5, a path from the eighth coordinate P8 to the ninth coordinate P9 will be defined as a ninth path PA9.

When the display image is consistently output from the display panel 110 after the reference point CP is shifted to the ninth coordinate P9, the controller 150 may shift the reference point CP in the lower right direction in the shift area 40 based on the first route ROUTE1 every preset time. In an embodiment, for example, the controller 150 may shift the reference point CP from the ninth coordinate P9 to (−5, −5) and (−4, −6) in the shift area 40 every preset time, and (−4, −6) that is a position to which the reference point CP is shifted will be defined as a $10^{th}$ coordinate P10. In this case, since the reference point CP is shifted from the ninth coordinate P9 to the $10^{th}$ coordinate P10, the entire display image may be gradually shifted in the lower right direction. As shown in FIG. 5, a path from the ninth coordinate P9 to the $10^{th}$ coordinate P10 will be defined as a $10^{th}$ path PA10.

When the display image is consistently output from the display panel 110 after the reference point CP is shifted to the $10^{th}$ coordinate P10, the controller 150 may shift the reference point CP in the upper right direction in the shift area 40 based on the first route ROUTE1 every preset time. In an embodiment, for example, the controller 150 may shift the reference point CP the $10^{th}$ coordinate P10 to (−3, −5), (−2, −4), (−1, −3), (0, −2), (1, −1), and (2, 0) in the shift area 40 every preset time, (2, 0) that is a position to which the reference point CP is shifted will be defined as an $11^{th}$ coordinate P11, and the sixth coordinate P6 and the $11^{th}$ coordinate P11 may be a same position as each other. In this case, since the reference point CP is shifted from the $10^{th}$ coordinate P10 to the $11^{th}$ coordinate P11, the entire display image may be gradually shifted in the upper right direction. As shown in FIG. 5, a path from the $10^{th}$ coordinate P10 to the $11^{th}$ coordinate P11 will be defined as an $11^{th}$ path PA11, the seventh path PA7, the eighth path PA8, the ninth path PA9, the $10^{th}$ path PA10, and the $11^{th}$ path PA11 will be defined as a second sub-route SUB-ROUTE2, and the first route ROUTE1 may include the first sub-route SUB-ROUTE1 and the second sub-route SUB-ROUTE2.

Referring again to FIG. 5, according to embodiments, a start coordinate (i.e., the zeroth coordinate P0) of the first sub-route SUB-ROUTE1 and an end coordinate (i.e., the $11^{th}$ coordinate P11) of the second sub-route SUB-ROUTE2 may be different from each other, and a start coordinate (i.e., the sixth coordinate P6) of the second sub-route SUB-ROUTE2 and the end coordinate (i.e., the $11^{th}$ coordinate P11) of the second sub-route SUB-ROUTE2 may be identical to each other. In such embodiments, each of the first and second sub-routes SUB-ROUTE1 and SUB-ROUTE2 may have a substantially rectangular shape rotated about the zeroth coordinate P0 by a preset angle. In an embodiment, for example, a minor axis (e.g., corresponding to the third path PA3 or the fifth path PA5) of the first sub-route SUB-ROUTE1 having the rectangular shape will be defined as a first width LW1, a major axis (e.g., corresponding to the fourth path PA4) of the first sub-route SUB-ROUTE1 having the rectangular shape will be defined as a first length LL1, a minor axis (e.g., corresponding to the eighth path PA8 or the $10^{th}$ path PA10) of the second sub-route SUB-ROUTE2 having the rectangular shape will be defined as a second width LW2, and a major axis (e.g., corresponding to the ninth path PA9, or the seventh and $11^{th}$ paths PA7 and PA11) of the second sub-route SUB-ROUTE2 having the rectangular shape will be defined as a second length LL2. In such embodiments, the first width LW1 and the second width LW2 may be substantially equal to each other, and the first length LL1 and the second length LL2 may be substantially equal to each other. In such embodiments, the first sub-route SUB-ROUTE1 and the second sub-route SUB-ROUTE2 may be substantially symmetrical to each other based on the imaginary central vertical line CVL (or the imaginary central horizontal line CHL). In an embodiment, for example, an angle formed by each of the major axes of the first and second sub-routes SUB-ROUTE1 and SUB-ROUTE2 and the imaginary central vertical line CVL (or the imaginary central horizontal line CHL) passing through the zeroth coordinate P0 may be about 45 degrees (or about 135 degrees). In such embodiments, total numbers of movements (i.e., 12 times) by which the reference point CP is shifted in the first to fourth areas 41, 42, 43, and 44 may be equal to each other.

In embodiments, as described above, (1, 1) may be defined as the first coordinate P1 in the shift area 40, but the configuration of embodiments of the disclosure is not limited thereto. In an alternative embodiment, for example, (1, −1), (−1, −1), or (−1, 1) may be defined as the first coordinate P1 in the shift area 40. In such an embodiment where the first coordinate P1 is changed as described above, the shape of each of the first and second sub-routes SUB-ROUTE1 and SUB-ROUTE2 may be partially changed, whereas an $11^{th}$ coordinate P11 may be identical to the $11^{th}$ coordinate P11 (e.g., (2, 0) in the shift area 40) shown in FIGS. 4 and 5.

Referring to FIGS. 6 and 7, when the display image is consistently output from the display panel 110 after the reference point CP is shifted to the $11^{th}$ coordinate P11, the controller 150 may shift the reference point CP from the $11^{th}$ coordinate P11 to (3, 1) in the shift area 40 based on the second route ROUTE2 after a preset time, and (3, 1) that is a position to which the reference point CP is shifted will be defined as a $12^{th}$ coordinate P12. In this case, since the reference point CP is shifted from the $11^{th}$ coordinate P11 to the $12^{th}$ coordinate P12, the display image may be entirely shifted in the upper right direction. As shown in FIG. 7, a path from the $11^{th}$ coordinate P11 to the $12^{th}$ coordinate P12 will be defined as a $12^{th}$ path PA12.

When the display image is consistently output from the display panel 110 after the reference point CP is shifted to the $12^{th}$ coordinate P12, the controller 150 may shift the reference point CP in the upper left direction of the display panel 110 in the shift area 40 based on the second route ROUTE2 every preset time. In an embodiment, for example, the controller may shift the reference point CP from the $12^{th}$ coordinate P12 to (2, 2), (1, 3), (0, 4), (−1, 5), and (−2, 6) in the shift area 40 every preset time, and (−2, 6) that is a position to which the reference point CP is shifted will be defined as a $13^{th}$ coordinate P13. In this case, since the reference point CP is shifted from the $12^{th}$ coordinate P12 to the $13^{th}$ coordinate P13, the entire display image may be gradually shifted in the upper left direction. As shown in FIG. 7, a path from the $12^{th}$ coordinate P12 to the $13^{th}$ coordinate P13 will be defined as a $13^{th}$ path PA13.

When the display image is consistently output from the display panel 110 after the reference point CP is shifted to the $13^{th}$ coordinate P13, the controller 150 may shift the reference point CP in the lower left direction in the shift area 40 based on the second route ROUTE2 every preset time. In an embodiment, for example, the controller 150 may shift the reference point CP from the $13^{th}$ coordinate P13 to (−3, 5), (−4, 4), (−5, 3), and (−6, 2) in the shift area 40 every preset time, and (−6, 2) that is a position to which the reference point CP is shifted will be defined as a $14^{th}$ coordinate P14. In this case, since the reference point CP is shifted from the $13^{th}$ coordinate P13 to the $14^{th}$ coordinate P14, the entire display image may be gradually shifted in the lower left direction. As shown in FIG. 7, a path from the $13^{th}$ coordinate P13 to the $14^{th}$ coordinate P14 will be defined as a $14^{th}$ path PA14.

When the display image is consistently output from the display panel 110 after the reference point CP is shifted to the $14^{th}$ coordinate P14, the controller 150 may shift the reference point CP in the lower right direction in the shift area 40 based on the second route ROUTE2 every preset time. In an embodiment, for example, the controller 150 may shift the reference point CP from the $14^{th}$ coordinate P14 to (−5, 1), (−4, 0), (−3, −1), (−2, −2), (−1, −3), (0, −4), (1, −5), and (2, −6) in the shift area 40 every preset time, and (2, −6) that is a position to which the reference point CP is shifted will be defined as a $15^{th}$ coordinate P15. In this case, since the reference point CP is shifted from the $14^{th}$ coordinate P14 to the $15^{th}$ coordinate P15, the entire display image may be gradually shifted in the lower right direction. As shown in FIG. 7, a path from the $14^{th}$ coordinate P14 to the $15^{th}$ coordinate P15 will be defined as a $15^{th}$ path PA15.

When the display image is consistently output from the display panel 110 after the reference point CP is shifted to the $15^{th}$ coordinate P15, the controller 150 may shift the reference point CP in the upper right direction in the shift area 40 based on the second route ROUTE2 every preset time. In an embodiment, for example, the controller 150 may shift the reference point CP from the $15^{th}$ coordinate P15 to (3, −5), (4, −4), (5, −3), and (6, −2) in the shift area 40 every preset time, and (6, −2) that is a position to which the reference point CP is shifted will be defined as a $16^{th}$ coordinate P16. In this case, since the reference point CP is shifted from the $15^{th}$ coordinate P15 to the $16^{th}$ coordinate P16, the entire display image may be gradually shifted in the upper right direction. As shown in FIG. 7, a path from the $15^{th}$ coordinate P15 to the $16^{th}$ coordinate P16 will be defined as a $16^{th}$ path PA16.

When the display image is consistently output from the display panel 110 after the reference point CP is shifted to the $16^{th}$ coordinate P16, the controller 150 may shift the reference point CP in the upper left direction in the shift area 40 based on the second route ROUTE2 every preset time. In an embodiment, for example, the controller 150 may shift the reference point CP from the $16^{th}$ coordinate P16 to (5, −1) and (4, 0) in the shift area 40 every preset time, and (4, 0) that is a position to which the reference point CP is shifted will be defined as a $17^{th}$ coordinate P17. In this case, since the reference point CP is shifted from the $16^{th}$ coordinate P16 to the $17^{th}$ coordinate P17, the entire display image may be gradually shifted in the upper left direction. As shown in FIG. 7, a path from the $16^{th}$ coordinate P16 to the $17^{th}$ coordinate P17 will be defined as a $17^{th}$ path PA17, and the $12^{th}$ path PA12, the $13^{th}$ path PA13, the $14^{th}$ path PA14, the fifteenth path PA15, the $16^{th}$ path PA16, and the $17^{th}$ path PA17 will be defined as a third sub-route SUB-ROUTE3.

When the display image is consistently output from the display panel 110 after the reference point CP is shifted to the $17^{th}$ coordinate P17, the controller 150 may shift the reference point CP in the upper right direction in the shift area 40 based on the second route ROUTE2 every preset time. In an embodiment, for example, the controller 150 may shift the reference point CP from the $17^{th}$ coordinate P17 to (5, 1) and (6, 2) in the shift area 40 every preset time, and (6, 2) that is a position to which the reference point CP is shifted will be defined as an $18^{th}$ coordinate P18. In this case, since the reference point CP is shifted from the $17^{th}$ coordinate P17 to the $18^{th}$ coordinate P18, the entire display image may be gradually shifted in the upper right direction.

As shown in FIG. 7, a path from the $17^{th}$ coordinate P17 to the $18^{th}$ coordinate P18 will be defined as an $18^{th}$ path PA18.

When the display image is consistently output from the display panel 110 after the reference point CP is shifted to the $18^{th}$ coordinate P18, the controller 150 may shift the reference point CP in the upper left direction in the shift area 40 based on the second route ROUTE2 every preset time. In an embodiment, for example, the controller 150 may shift the reference point CP from the $18^{th}$ coordinate P18 to (5, 3), (4, 4), (3, 5), and (2, 6) in the shift area 40 every preset time, and (2, 6) that is a position to which the reference point CP is shifted will be defined as a $19^{th}$ coordinate P19. In this case, since the reference point CP is shifted from the $18^{th}$ coordinate P18 to the $19^{th}$ coordinate P19, the entire display image may be gradually shifted in the upper left direction. As shown in FIG. 7, a path from the $18^{th}$ coordinate P18 to the $19^{th}$ coordinate P19 will be defined as a $19^{th}$ path PA19.

When the display image is consistently output from the display panel 110 after the reference point CP is shifted to the $19^{th}$ coordinate P19, the controller 150 may shift the reference point CP in the lower left direction in the shift area 40 based on the second route ROUTE2 every preset time. In an embodiment, for example, the controller 150 may shift the reference point CP from the $19^{th}$ coordinate P19 to (1, 5), (0, 4), (−1, 3), (−2, 2), (−3, 1), (−4, 0), (−5, −1), and (−6, −2) in the shift area 40 every preset time, and (−6, −2) that is a position to which the reference point CP is shifted will be defined as a $20^{th}$ coordinate P20. In this case, since the reference point CP is shifted from the $19^{th}$ coordinate P19 to the $20^{th}$ coordinate P20, the entire display image may be gradually shifted in the lower left direction. As shown in FIG. 7, a path from the $19^{th}$ coordinate P19 to the $20^{th}$ coordinate P20 will be defined as a $20^{th}$ path PA20.

When the display image is consistently output from the display panel 110 after the reference point CP is shifted to the $20^{th}$ coordinate P20, the controller 150 may shift the reference point CP in the lower right direction in the shift area 40 based on the second route ROUTE2 every preset time. In an embodiment, for example, the controller 150 may shift the reference point CP from the $20^{th}$ coordinate P20 to (−5, −3), (−4, −4), (−3, −5), and (−2, −6) in the shift area 40 every preset time, and (−2, −6) that is a position to which the reference point CP is shifted will be defined as a $21^{st}$ coordinate P21. In this case, since the reference point CP is shifted from the $20^{th}$ coordinate P20 to the $21^{st}$ coordinate P21, the entire display image may be gradually shifted in the lower right direction. As shown in FIG. 7, a path from the $20^{th}$ coordinate P20 to the $21^{st}$ coordinate P21 will be defined as a $21^{st}$ path PA21.

When the display image is consistently output from the display panel 110 after the reference point CP is shifted to the $21^{st}$ coordinate P21, the controller 150 may shift the reference point CP in the upper right direction in the shift area 40 based on the second route ROUTE2 every preset time. In an embodiment, for example, the controller 150 may shift the reference point CP from the $21^{st}$ coordinate P21 to (−1, −5), (0, −4), (1, −3), (2, −2), (3, −1), and (4, 0) in the shift area 40 every preset time, (4, 0) that is a position to which the reference point CP is shifted will be defined as a $22^{nd}$ coordinate P22, and the $17^{th}$ coordinate P17 and the $22^{nd}$ coordinate P22 may be a same position as each other. In this case, since the reference point CP is shifted from the $21^{st}$ coordinate P21 to the $22^{nd}$ coordinate P22, the entire display image may be gradually shifted in the upper right direction. As shown in FIG. 7, a path from the $21^{st}$ coordinate P21 to the $22^{nd}$ coordinate P22 will be defined as a $22^{nd}$ path PA22, the $18^{th}$ path PA18, the $19^{th}$ path PA19, the $20^{th}$ path PA20, the $21^{st}$ path PA21, and the $22^{nd}$ path PA22 will be defined as a fourth sub-route SUB-ROUTE4, and the second route ROUTE2 may include the third sub-route SUB-ROUTE3 and the fourth sub-route SUB-ROUTE4.

Referring to FIG. 7, according to embodiments, a start coordinate (i.e., the $11^{th}$ coordinate P11) of the third sub-route SUB-ROUTE3 and an end coordinate (i.e., the $22^{nd}$ coordinate P22) of the fourth sub-route SUB-ROUTE4 may be different from each other, and a start coordinate (i.e., the $17^{th}$ coordinate P17) of the fourth sub-route SUB-ROUTE4 and the end coordinate (i.e., the $22^{nd}$ coordinate P22) of the fourth sub-route SUB-ROUTE4 may be identical to each other. In such embodiments, each of the third and fourth sub-routes SUB-ROUTE3 and SUB-ROUTE4 may have a substantially rectangular shape rotated about the zeroth coordinate P0 by a preset angle. In an embodiment, for example, a minor axis (e.g., corresponding to the $14^{th}$ path PA14 or the $16^{th}$ path PA16) of the third sub-route SUB-ROUTE3 having the rectangular shape will be defined as a third width LW3, a major axis (e.g., corresponding to the $15^{th}$ path PA15) of the third sub-route SUB-ROUTE3 having the rectangular shape will be defined as a third length LL3, a minor axis (e.g., corresponding to the $19^{th}$ path PA19 or the $21^{st}$ path PA21) of the fourth sub-route SUB-ROUTE4 having the rectangular shape will be defined as a fourth width LW4, and a major axis (e.g., corresponding to the $20^{th}$ path PA20, or the $18^{th}$ and $22^{nd}$ paths PA18 and PA22) of the fourth sub-route SUB-ROUTE4 having the rectangular shape will be defined as a fourth length LL4. In such embodiments, the third width LW3 and the fourth width LW4 may be substantially equal to each other, and the third length LL3 and the fourth length LL4 may be substantially equal to each other. In such embodiments, the third sub-route SUB-ROUTE3 and the fourth sub-route SUB-ROUTE4 may be substantially symmetrical to each other based on the imaginary central vertical line CVL (or the imaginary central horizontal line CHL). In an embodiment, for example, an angle formed by each of the major axes of the third and fourth sub-routes SUB-ROUTE3 and SUB-ROUTE4 and the imaginary central vertical line CVL (or the imaginary central horizontal line CHL) passing through the zeroth coordinate P0 may be about 45 degrees (or about 135 degrees). Furthermore, total numbers of movements (i.e., times) by which the reference point CP is shifted in the first to fourth areas 41, 42, 43, and 44 may be equal to each other.

In embodiments, as described above, (3, 1) may be defined as the $12^{th}$ coordinate P12 in the shift area 40, but the configuration of embodiments of the disclosure is not limited thereto. In an alternative embodiment, for example, (3, −1) may be defined as the $12^{th}$ coordinate P12 in the shift area 40. In such an embodiment where the $12^{th}$ coordinate P12 is changed as described above, the shape of each of the third and fourth sub-routes SUB-ROUTE3 and SUB-ROUTE4 may be partially changed, whereas a $22^{nd}$ coordinate P22 may be identical to the $22^{nd}$ coordinate P22 (e.g., (4, 0) in the shift area 40) shown in FIGS. 7 and 8.

Referring to FIGS. 8 and 9, when the display image is consistently output from the display panel 110 after the reference point CP is shifted to the $22^{nd}$ coordinate P22, the controller 150 may shift the reference point CP from the $22^{nd}$ coordinate P22 to (5, 1) in the shift area 40 based on the third route ROUTE3 after a preset time, and (5, 1) that is a position to which the reference point CP is shifted will be defined as a $23^{rd}$ coordinate P23. In this case, since the reference point CP is shifted from the $22^{nd}$ coordinate P22 to the $23^{rd}$ coordinate P23, the display image may be entirely shifted in the upper right direction. As shown in FIG. 9, a path from the 22$^{nd}$ coordinate P22 to the 23$^{rd}$ coordinate P23 will be defined as a 23$^{rd}$ path PA23.

When the display image is consistently output from the display panel 110 after the reference point CP is shifted to the 23$^{rd}$ coordinate P23, the controller 150 may shift the reference point CP in the upper left direction of the display panel 110 in the shift area 40 based on the third route ROUTE3 every preset time. In an embodiment, for example, the controller 150 may shift the reference point CP from the 23$^{rd}$ coordinate P23 to (4, 2), (3, 3), (2, 4), (1, 5), and (0, 6) in the shift area 40 every preset time, and (0, 6) that is a position to which the reference point CP is shifted will be defined as a 24$^{th}$ coordinate P24. In this case, since the reference point CP is shifted from the 23$^{rd}$ coordinate P23 to the 24$^{th}$ coordinate P24, the entire display image may be gradually shifted in the upper left direction. As shown in FIG. 9, a path from the 23$^{rd}$ coordinate P23 to the 24$^{th}$ coordinate P24 will be defined as a 24$^{th}$ path PA24.

When the display image is consistently output from the display panel 110 after the reference point CP is shifted to the 24$^{th}$ coordinate P24, the controller 150 may shift the reference point CP in the lower left direction of the display panel 110 in the shift area 40 based on the third route ROUTE3 every preset time. In an embodiment, for example, the controller 150 may shift the reference point CP from the 24$^{th}$ coordinate P24 to (−1, 5), (−2, 4), (−3, 3), (−4, 2), (−5, 1), and (−6, 0) in the shift area 40 every preset time, and (−6, 0) that is a position to which the reference point CP is shifted will be defined as a 25$^{th}$ coordinate P25. In this case, since the reference point CP is shifted from the 24$^{th}$ coordinate P24 to the 25$^{th}$ coordinate P25, the entire display image may be gradually shifted in the lower left direction. As shown in FIG. 9, a path from the 24$^{th}$ coordinate P24 to the 25$^{th}$ coordinate P25 will be defined as a 25$^{th}$ path PA25.

When the display image is consistently output from the display panel 110 after the reference point CP is shifted to the 25$^{th}$ coordinate P25, the controller 150 may shift the reference point CP in the lower right direction of the display panel 110 in the shift area 40 based on the third route ROUTE3 every preset time. In an embodiment, for example, the controller 150 may shift the reference point CP to from the 25$^{th}$ coordinate P25 (−5, −1), (−4, −2), (−3, −3), (−2, −4), (−1, −5), and (0, −6) in the shift area 40 every preset time, and (0, −6) that is a position to which the reference point CP is shifted will be defined as a 26$^{th}$ coordinate P26. In this case, since the reference point CP is shifted from the 25$^{th}$ coordinate P25 to the 26$^{th}$ coordinate P26, the entire display image may be gradually shifted in the lower right direction. As shown in FIG. 9, a path from the 25$^{th}$ coordinate P25 to the 26$^{th}$ coordinate P26 will be defined as a 26$^{th}$ path PA26.

When the display image is consistently output from the display panel 110 after the reference point CP is shifted to the 26$^{th}$ coordinate P26, the controller 150 may shift the reference point CP in the upper right direction of the display panel 110 in the shift area 40 based on the third route ROUTE3 every preset time. In an embodiment, for example, the controller 150 may shift the reference point CP from the 26$^{th}$ coordinate P26 to (1, −5), (2, −4), (3, −3), (4, −2), (5, −1), and (6, 0) in the shift area 40 every preset time, and (6, 0) that is a position to which the reference point CP is shifted will be defined as a 27$^{th}$ coordinate P27. In this case, since the reference point CP is shifted from the 26$^{th}$ coordinate P26 to the 27$^{th}$ coordinate P27, the entire display image may be gradually shifted in the upper right direction. As shown in FIG. 9, a path from the 26$^{th}$ coordinate P26 to the 27$^{th}$ coordinate P27 will be defined as a 27$^{th}$ path PA27, the 23$^{rd}$ path PA23, the 24$^{th}$ path PA24, the 25$^{th}$ path PA25, the 26$^{th}$ path PA26, and the 27$^{th}$ path PA27 will be defined as a fifth sub-route SUB-ROUTE5, and the third route ROUTE3 may include the fifth sub-route SUB-ROUTE5.

Referring to FIG. 9, according to embodiments, a start coordinate (i.e., the 22$^{nd}$ coordinate P22) of the fifth sub-route SUB-ROUTE5 and an end coordinate (i.e., the 27$^{th}$ coordinate P27) of the fifth sub-route SUB-ROUTE5 may be different from each other. In addition, the fifth sub-route SUB-ROUTE5 may have a substantially square shape rotated about the zeroth coordinate P0 by a preset angle. In an embodiment, for example, a minor axis (e.g., corresponding to the 25$^{th}$ path PA25 or the 27$^{th}$ path PA27) of the fifth sub-route SUB-ROUTE5 having the square shape will be defined as a fifth width LW5, and a major axis (e.g., corresponding to the 26$^{th}$ path PA26) of the fifth sub-route SUB-ROUTE5 having the square shape will be defined as a sixth length LL6. In this case, the fifth width LW5 and the fifth length LL5 may be substantially equal to each other. In an embodiment, for example, an angle formed by the fifth sub-route SUB-ROUTE5 and the imaginary central vertical line CVL (or the imaginary central horizontal line CHL) passing through the zeroth coordinate P0 may be about 45 degrees (or about 135 degrees). In such embodiments, total numbers of movements (i.e., 6 times) by which the reference point CP is shifted in the first to fourth areas 41, 42, 43, and 44 may be equal to each other.

In embodiments, as described above, (5, 1) may be defined as the 23$^{rd}$ coordinate P23 in the shift area 40, but the configuration of embodiments of the disclosure is not limited thereto. In an alternative embodiment, for example, (5, −1) may be defined as the 23$^{rd}$ coordinate P23 in the shift area 40. In such an embodiment where the 23$^{rd}$ coordinate P23 is changed as described above, the shape of the fifth sub-route SUB-ROUTE5 may be partially changed, whereas a 27$^{th}$ coordinate P27 may be identical to the 27$^{th}$ coordinate P27 (e.g., (6, 0) in the shift area 40) shown in FIGS. 8 and 9.

Referring to FIGS. 10 and 11, when the display image is consistently output from the display panel 110 after the reference point CP is shifted to the 27$^{th}$ coordinate P27, the controller 150 may shift the reference point CP from the 27$^{th}$ coordinate P27 to (5, 0) in the shift area 40 based on the fourth route ROUTE4 after a preset time, and (5, 0) that is a position to which the reference point CP is shifted will be defined as a 28$^{th}$ coordinate P28. In this case, since the reference point CP is shifted from the 27$^{th}$ coordinate P27 to the 28$^{th}$ coordinate P28, the display image may be entirely shifted in a left direction (e.g., a fifth direction D5). As shown in FIG. 11, a path from the 27$^{th}$ coordinate P27 to the 28$^{th}$ coordinate P28 will be defined as a 28$^{th}$ path PA28.

When the display image is consistently output from the display panel 110 after the reference point CP is shifted to the 28$^{th}$ coordinate P28, the controller 150 may shift the reference point CP in the upper left direction of the display panel 110 in the shift area 40 based on the fourth route ROUTE4 every preset time. In an embodiment, for example, the controller 150 may shift the reference point CP from the 28$^{th}$ coordinate P28 to (4, 1), (3, 2), (2, 3), (1, 4), (0, 5), and (−1, 6) in the shift area 40 every preset time, and (−1, 6) that is a position to which the reference point CP is shifted will be defined as a 29$^{th}$ coordinate P29. In this case, since the reference point CP is shifted from the 28$^{th}$ coordinate P28 to the 29$^{th}$ coordinate P29, the entire display image may be gradually shifted in the upper left direction. As shown in FIG. 11, a path from the 28$^{th}$ coordinate P28 to the 29$^{th}$ coordinate P29 will be defined as a 29$^{th}$ path PA29.

When the display image is consistently output from the display panel 110 after the reference point CP is shifted to the $29^{th}$ coordinate P29, the controller 150 may shift the reference point CP in the lower left direction of the display panel 110 in the shift area 40 based on the fourth route ROUTE4 every preset time. In an embodiment, for example, the controller 150 may shift the reference point CP from the $29^{th}$ coordinate P29 to (−2, 5), (−3, 4), (−4, 3), (−5, 2), and (−6, 1) in the shift area 40 every preset time, and (−6, 1) that is a position to which the reference point CP is shifted will be defined as a $30^{th}$ coordinate P30. In this case, since the reference point CP is shifted from the $29^{th}$ coordinate P29 to the $30^{th}$ coordinate P30, the entire display image may be gradually shifted in the lower left direction. As shown in FIG. 11, a path from the $29^{th}$ coordinate P29 to the $30^{th}$ coordinate P30 will be defined as a $30^{th}$ path PA30.

When the display image is consistently output from the display panel 110 after the reference point CP is shifted to the $30^{th}$ coordinate P30, the controller 150 may shift the reference point CP in the lower right direction of the display panel 110 in the shift area 40 based on the fourth route ROUTE4 every preset time. In an embodiment, for example, the controller 150 may shift the reference point CP from the $30^{th}$ coordinate P30 to (−5, 0), (−4, −1), (−3, −2), (−2, −3), (−1, −4), (0, −5), and (1, −6) in the shift area 40 every preset time, and (1, −6) that is a position to which the reference point CP is shifted will be defined as a $31^{st}$ coordinate P31. In this case, since the reference point CP is shifted from the $30^{th}$ coordinate P30 to the $31^{st}$ coordinate P31, the entire display image may be gradually shifted in the lower right direction. As shown in FIG. 11, a path from the $30^{th}$ coordinate P30 to the $31^{st}$ coordinate P31 will be defined as a $31^{st}$ path PA31.

When the display image is consistently output from the display panel 110 after the reference point CP is shifted to the $31^{st}$ coordinate P31, the controller 150 may shift the reference point CP in the upper right direction of the display panel 110 in the shift area 40 based on the fourth route ROUTE4 every preset time. In an embodiment, for example, the controller 150 may shift the reference point CP from the $31^{st}$ coordinate P31 to (2, −5), (3, −4), (4, −3), (5, −2), and (6, −1) in the shift area 40 every preset time, and (6, −1) that is a position to which the reference point CP is shifted will be defined as a $32^{nd}$ coordinate P32. In this case, since the reference point CP is shifted from the $31^{st}$ coordinate P31 to the $32^{nd}$ coordinate P32, the entire display image may be gradually shifted in the upper right direction. As shown in FIG. 11, a path from the $31^{st}$ coordinate P31 to the $32^{nd}$ coordinate P32 will be defined as a $32^{nd}$ path PA32.

When the display image is consistently output from the display panel 110 after the reference point CP is shifted to the $32^{nd}$ coordinate P32, the controller 150 may shift the reference point CP from the $32^{nd}$ coordinate P32 to (5, 0) in the shift area 40 based on the fourth route ROUTE4 after a preset time, (5, 0) that is a position to which the reference point CP is shifted will be defined as a $33^{rd}$ coordinate P33, and the $28^{th}$ coordinate P28 and the $33^{rd}$ coordinate P33 may be a same position as each other. In this case, since the reference point CP is shifted from the $32^{nd}$ coordinate P32 to the $33^{rd}$ coordinate P33, the display image may be entirely shifted in the upper left direction. As shown in FIG. 11, a path from the $32^{nd}$ coordinate P32 to the $33^{rd}$ coordinate P33 will be defined as a $33^{rd}$ path PA33, and the $28^{th}$ path PA28, the $29^{th}$ path PA29, the $30^{th}$ path PA30, the $31^{st}$ path PA31, the $32^{nd}$ path PA32, and the $33^{rd}$ path PA33 will be defined as a sixth sub-route SUB-ROUTE6.

When the display image is consistently output from the display panel 110 after the reference point CP is shifted to the $33^{rd}$ coordinate P33, the controller 150 may shift the reference point CP from the $33^{rd}$ coordinate P33 to (6, 1) in the shift area 40 based on the fourth route ROUTE4 after a preset time, and (6, 1) that is a position to which the reference point CP is shifted will be defined as a $34^{th}$ coordinate P34. In this case, since the reference point CP is shifted from the $33^{rd}$ coordinate P33 to the $34^{th}$ coordinate P34, the display image may be entirely shifted in the upper right direction. As shown in FIG. 11, a path from the $33^{rd}$ coordinate P33 to the $34^{th}$ coordinate P34 will be defined as a $34^{th}$ path PA34.

When the display image is consistently output from the display panel 110 after the reference point CP is shifted to the $34^{th}$ coordinate P34, the controller 150 may shift the reference point CP in the upper left direction of the display panel 110 in the shift area 40 based on the fourth route ROUTE4 every preset time. In an embodiment, for example, the controller 150 may shift the reference point CP from the $34^{th}$ coordinate P34 to (5, 2), (4, 3), (3, 4), (2, 5), and (1, 6) in the shift area 40 every preset time, and (1, 6) that is a position to which the reference point CP is shifted will be defined as a $35^{th}$ coordinate P35. In this case, since the reference point CP is shifted from the $34^{th}$ coordinate P34 to the $35^{th}$ coordinate P35, the entire display image may be gradually shifted in the upper left direction. As shown in FIG. 11, a path from the $34^{th}$ coordinate P34 to the $35^{th}$ coordinate P35 will be defined as a $35^{th}$ path PA35.

When the display image is consistently output from the display panel 110 after the reference point CP is shifted to the $35^{th}$ coordinate P35, the controller 150 may shift the reference point CP in the lower left direction of the display panel 110 in the shift area 40 based on the fourth route ROUTE4 every preset time. In an embodiment, for example, the controller 150 may shift the reference point CP from the $35^{th}$ coordinate P35 to (0, 5), (−1, 4), (−2, 3), (−3, 2), (−4, 1), (−5, 0), and (−6, −1) in the shift area 40 every preset time, and (−6, −1) that is a position to which the reference point CP is shifted will be defined as a $36^{th}$ coordinate P36. In this case, since the reference point CP is shifted from the $35^{th}$ coordinate P35 to the $36^{th}$ coordinate P36, the entire display image may be gradually shifted in the lower left direction. As shown in FIG. 11, a path from the $35^{th}$ coordinate P35 to the $36^{th}$ coordinate P36 will be defined as a $36^{th}$ path PA36.

When the display image is consistently output from the display panel 110 after the reference point CP is shifted to the $36^{th}$ coordinate P36, the controller 150 may shift the reference point CP in the lower right direction of the display panel 110 in the shift area 40 based on the fourth route ROUTE4 every preset time. In an embodiment, for example, the controller 150 may shift the reference point CP from the $36^{th}$ coordinate P36 to (−5, −2), (−4, −3), (−3, −4), (−2, −5), and (−1, −6) in the shift area 40 every preset time, and (−1, −6) that is a position to which the reference point CP is shifted will be defined as a $37^{th}$ coordinate P37. In this case, since the reference point CP is shifted from the $36^{th}$ coordinate P36 to the $37^{th}$ coordinate P37, the entire display image may be gradually shifted in the lower right direction. As shown in FIG. 11, a path from the $36^{th}$ coordinate P36 to the $37^{th}$ coordinate P37 will be defined as a $37^{th}$ path PA37.

When the display image is consistently output from the display panel 110 after the reference point CP is shifted to the $37^{th}$ coordinate P37, the controller 150 may shift the reference point CP in the upper right direction of the display panel 110 in the shift area 40 based on the fourth route ROUTE4 every preset time. In an embodiment, for example, the controller 150 may shift the reference point CP from the $37^{th}$ coordinate P37 to (0, −5), (1, −4), (2, −3), (3, −2), and (4, −1) in the shift area 40 every preset time, and (4, −1) that is a position to which the reference point CP is shifted will be defined as a $38^{th}$ coordinate P38. In this case, since the reference point CP is shifted from the $37^{th}$ coordinate P37 to the $38^{th}$ coordinate P38, the entire display image may be gradually shifted in the upper right direction. As shown in FIG. 11, a path from the $37^{th}$ coordinate P37 to the $38^{th}$ coordinate P38 will be defined as a $38^{th}$ path PA38.

When the display image is consistently output from the display panel 110 after the reference point CP is shifted to the $38^{th}$ coordinate P38, the controller 150 may shift the reference point CP from the $38^{th}$ coordinate P38 to (3, 0) in the shift area 40 based on the fourth route ROUTE4 after a preset time, and (3, 0) that is a position to which the reference point CP is shifted will be defined as a $39^{th}$ coordinate P39. In this case, since the reference point CP is shifted from the $38^{th}$ coordinate P38 to the $39^{th}$ coordinate P39, the display image may be entirely shifted in the upper left direction. As shown in FIG. 11, a path from the $38^{th}$ coordinate P38 to the $39^{th}$ coordinate P39 will be defined as a $39^{th}$ path PA39, the $34^{th}$ path PA34, the $35^{th}$ path PA35, the $36^{th}$ path PA36, the $37^{th}$ path PA37, the $38^{th}$ path PA38, and the $39^{th}$ path PA39 will be defined as a seventh sub-route SUB-ROUTE7, and the fourth route ROUTE4 may include the sixth sub-route SUB-ROUTE6 and the seventh sub-route SUB-ROUTE7.

Referring to FIG. 11, according to embodiments, a start coordinate (i.e., the $27^{th}$ coordinate P27) of the sixth sub-route SUB-ROUTE6 and an end coordinate (i.e., the $39^{th}$ coordinate P39) of the seventh sub-route SUB-ROUTE7 may be different from each other, and a start coordinate (i.e., the $33^{rd}$ coordinate P33) of the seventh sub-route SUB-ROUTE7 and the end coordinate (i.e., the $39^{th}$ coordinate P39) of the seventh sub-route SUB-ROUTE7 may be different from each other. In such embodiments, each of the sixth and seventh sub-routes SUB-ROUTE6 and SUB-ROUTE7 may have a substantially rectangular shape rotated about the zeroth coordinate P0 by a preset angle. In an embodiment, for example, a minor axis (e.g., corresponding to the $30^{th}$ path PA30 or the $32^{nd}$ path PA32) of the sixth sub-route SUB-ROUTE6 having the rectangular shape will be defined as a sixth width LW6, a major axis (e.g., corresponding to the $29^{th}$ and $33^{rd}$ paths PA29 and PA33, or the $31^{st}$ path PA31) of the sixth sub-route SUB-ROUTE6 having the rectangular shape will be defined as a sixth length LL6, a minor axis (e.g., corresponding to the $35^{th}$ path PA35 or the $37^{th}$ path PA37) of the seventh sub-route SUB-ROUTE7 having the rectangular shape will be defined as a seventh width LW7, and a major axis (e.g., corresponding to the $36^{th}$ path PA36) of the seventh sub-route SUB-ROUTE7 having the rectangular shape will be defined as a seventh length LL7. In such embodiments, the sixth width LW6 and the seventh width LW7 may be substantially equal to each other, and the sixth length LL6 and the seventh length LL7 may be substantially equal to each other. In such embodiments, the sixth sub-route SUB-ROUTE6 and the seventh sub-route SUB-ROUTE7 may be substantially symmetrical to each other based on the imaginary central vertical line CVL (or the imaginary central horizontal line CHL). In an embodiment, for example, an angle formed by each of the major axes of the sixth and seventh sub-routes SUB-ROUTE6 and SUB-ROUTE7 and the imaginary central vertical line CVL (or the imaginary central horizontal line CHL) passing through the zeroth coordinate P0 may be approximately 45 degrees (or 135 degrees). In such embodiments, total numbers of movements (i.e., 12 times) by which the reference point CP is shifted in the first to fourth areas 41, 42, 43, and 44 may be equal to each other (except for the $28^{th}$ path PA28).

In embodiments, as described above, (−1, 6) may be defined as the $29^{th}$ coordinate P29 in the shift area 40, but the configuration of embodiments of the disclosure is not limited thereto. In an alternative embodiment, for example, (6, 1), (−1, −6), or (6, −1) may be defined as the $29^{th}$ coordinate P29 in the shift area 40. In an embodiment where the $29^{th}$ coordinate P29 is changed as described above, the shape of each of the sixth and seventh sub-routes SUB-ROUTE6 and SUB-ROUTE7 may be partially changed, whereas a $39^{th}$ coordinate P39 may be identical to the $39^{th}$ coordinate P39 (e.g., (3, 0) in the shift area 40) shown in FIGS. 10 and 11.

Referring to FIGS. 12 and 13, when the display image is consistently output from the display panel 110 after the reference point CP is shifted to the $39^{th}$ coordinate P39, the controller 150 may shift the reference point CP in the upper left direction of the display panel 110 in the shift area 40 based on the fifth route ROUTE5 every preset time. In an embodiment, for example, the controller 150 may shift the reference point CP from the $39^{th}$ coordinate P39 to (2, 1), (1, 2), (0, 3), (−1, 4), (−2, 5), and (−3, 6) in the shift area 40 every preset time, and (−3, 6) that is a position to which the reference point CP is shifted will be defined as a $40^{th}$ coordinate P40. In this case, since the reference point CP is shifted from the $39^{th}$ coordinate P39 to the $40^{th}$ coordinate P40, the entire display image may be gradually shifted in the upper left direction. As shown in FIG. 13, a path from the $39^{th}$ coordinate P39 to the $40^{th}$ coordinate P40 will be defined as a $40^{th}$ path PA40.

When the display image is consistently output from the display panel 110 after the reference point CP is shifted to the $40^{th}$ coordinate P40, the controller 150 may shift the reference point CP in the lower left direction of the display panel 110 in the shift area 40 based on the fifth route ROUTE5 every preset time. In an embodiment, for example, the controller 150 may shift the reference point CP from the $40^{th}$ coordinate P40 to (−4, 5), (−5, 4), and (−6, 3) in the shift area 40 every preset time, and (−6, 3) that is a position to which the reference point CP is shifted will be defined as a $41^{st}$ coordinate P41. In this case, since the reference point CP is shifted from the $40^{th}$ coordinate P40 to the $41^{st}$ coordinate P41, the entire display image may be gradually shifted in the lower left direction. As shown in FIG. 13, a path from the $40^{th}$ coordinate P40 to the $41^{st}$ coordinate P41 will be defined as a $41^{st}$ path PA41.

When the display image is consistently output from the display panel 110 after the reference point CP is shifted to the $41^{st}$ coordinate P41, the controller 150 may shift the reference point CP in the lower right direction of the display panel 110 in the shift area 40 based on the fifth route ROUTE5 every preset time. In an embodiment, for example, the controller 150 may shift the reference point CP from the $41^{st}$ coordinate P41 to (−5, 2), (−4, 1), (−3, 0), (−2, −1), (−1, −2), (0, −3), (1, −4), (2, −5), and (3, −6) in the shift area 40 every preset time, and (3, −6) that is a position to which the reference point CP is shifted will be defined as a $42^{nd}$ coordinate P42. In this case, since the reference point CP is shifted from the $41^{st}$ coordinate P41 to the $42^{nd}$ coordinate P42, the entire display image may be gradually shifted in the lower right direction. As shown in FIG. 13, a path from the $41^{st}$ coordinate P41 to the $42^{nd}$ coordinate P42 will be defined as a $42^{nd}$ path PA42.

When the display image is consistently output from the display panel 110 after the reference point CP is shifted to the $42^{nd}$ coordinate P42, the controller 150 may shift the reference point CP in the upper right direction of the display panel 110 in the shift area 40 based on the fifth route ROUTE5 every preset time. In an embodiment, for example, the controller 150 may shift the reference point CP from the $42^{nd}$ coordinate P42 to (4, −5), (5, −4), and (6, −3) in the shift area 40 every preset time, and (6, −3) that is a position to which the reference point CP is shifted will be defined as a $43^{rd}$ coordinate P43. In this case, since the reference point CP is shifted from the $42^{nd}$ coordinate P42 to the $43^{rd}$ coordinate P43, the entire display image may be gradually shifted in the upper right direction. As shown in FIG. 13, a path from the $42^{nd}$ coordinate P42 to the $43^{rd}$ coordinate P43 will be defined as a $43^{rd}$ path PA43.

When the display image is consistently output from the display panel 110 after the reference point CP is shifted to the $43^{rd}$ coordinate P43, the controller 150 may shift the reference point CP in the upper left direction of the display panel 110 in the shift area 40 based on the fifth route ROUTE5 every preset time. In an embodiment, for example, the controller 150 may shift the reference point CP from the $43^{rd}$ coordinate P43 to (5, −2), (4, −1), and (3, 0) in the shift area 40 every preset time, (3, 0) that is a position to which the reference point CP is shifted will be defined as a $44^{th}$ coordinate P44, and the $39^{th}$ coordinate P39 and the $44^{th}$ coordinate P44 may be a same position as each other. In this case, since the reference point CP is shifted from the $43^{rd}$ coordinate P43 to the $44^{th}$ coordinate P44, the entire display image may be gradually shifted in the upper left direction. As shown in FIG. 13, a path from the $43^{rd}$ coordinate P43 to the $44^{th}$ coordinate P44 will be defined as a $44^{th}$ path PA44, and the $40^{th}$ path PA40, the $41^{st}$ path PA41, the $42^{nd}$ path PA42, the $43^{rd}$ path PA43, and the $44^{th}$ path PA44 will be defined as an eighth sub-route SUB-ROUTE5.

When the display image is consistently output from the display panel 110 after the reference point CP is shifted to the $44^{th}$ coordinate P44, the controller 150 may shift the reference point CP in the upper right direction of the display panel 110 in the shift area 40 based on the fifth route ROUTE5 every preset time. In an embodiment, for example, the controller 150 may shift the reference point CP from the $44^{th}$ coordinate P44 to (4, 1), (5, 2), and (6, 3) in the shift area 40 every preset time, and (6, 3) that is a position to which the reference point CP is shifted will be defined as a $45^{th}$ coordinate P45. In this case, since the reference point CP is shifted from the $44^{th}$ coordinate P44 to the $45^{th}$ coordinate P45, the entire display image may be gradually shifted in the upper right direction. As shown in FIG. 13, a path from the $44^{th}$ coordinate P44 to the $45^{th}$ coordinate P45 will be defined as a $45^{th}$ path PA45.

When the display image is consistently output from the display panel 110 after the reference point CP is shifted to the $45^{th}$ coordinate P45, the controller 150 may shift the reference point CP in the upper left direction of the display panel 110 in the shift area 40 based on the fifth route ROUTE5 every preset time. In an embodiment, for example, the controller 150 may shift the reference point CP from the $45^{th}$ coordinate P45 to (5, 4), (4, 5), and (3, 6) in the shift area 40 every preset time, and (3, 6) that is a position to which the reference point CP is shifted will be defined as a $46^{th}$ coordinate P46. In this case, since the reference point CP is shifted from the $45^{th}$ coordinate P45 to the $46^{th}$ coordinate P46, the entire display image may be gradually shifted in the upper left direction. As shown in FIG. 13, a path from the $45^{th}$ coordinate P45 to the $46^{th}$ coordinate P46 will be defined as a $46^{th}$ path PA46.

When the display image is consistently output from the display panel 110 after the reference point CP is shifted to the $46^{th}$ coordinate P46, the controller 150 may shift the reference point CP in the lower left direction of the display panel 110 in the shift area 40 based on the fifth route ROUTE5 every preset time. In an embodiment, for example, the controller 150 may shift the reference point CP from the $46^{th}$ coordinate P46 to (2, 5), (1, 4), (0, 3), (−1, 2), (−2, 1), (−3, 0), (−4, −1), (−5, −2), and (−6, −3) in the shift area 40 every preset time, and (−6, −3) that is a position to which the reference point CP is shifted will be defined as a $47^{th}$ coordinate P47. In this case, since the reference point CP is shifted from the $46^{th}$ coordinate P46 to the $47^{th}$ coordinate P47, the entire display image may be gradually shifted in the lower left direction. As shown in FIG. 13, a path from the $46^{th}$ coordinate P46 to the $47^{th}$ coordinate P47 will be defined as a $47^{th}$ path PA47.

When the display image is consistently output from the display panel 110 after the reference point CP is shifted to the $47^{th}$ coordinate P47, the controller 150 may shift the reference point CP in the lower right direction of the display panel 110 in the shift area 40 based on the fifth route ROUTE5 every preset time. In an embodiment, for example, the controller 150 may shift the reference point CP from the $47^{th}$ coordinate P47 to (−5, −4), (−4, −5), and (−3, −6) in the shift area 40 every preset time, and (−3, −6) that is a position to which the reference point CP is shifted will be defined as a $48^{th}$ coordinate P48. In this case, since the reference point CP is shifted from the $47^{th}$ coordinate P47 to the $48^{th}$ coordinate P48, the entire display image may be gradually shifted in the lower right direction. As shown in FIG. 13, a path from the $47^{th}$ coordinate P47 to the $48^{th}$ coordinate P48 will be defined as a $48^{th}$ path PA48.

When the display image is consistently output from the display panel 110 after the reference point CP is shifted to the $48^{th}$ coordinate P48, the controller 150 may shift the reference point CP in the upper right direction of the display panel 110 in the shift area 40 based on the fifth route ROUTE5 every preset time. In an embodiment, for example, the controller 150 may shift the reference point CP from the $48^{th}$ coordinate P48 to (−2, −5), (−1, −4), (0, −3), (1, −2), and (2, −1) in the shift area 40 every preset time, and (2, −1) that is a position to which the reference point CP is shifted will be defined as a $49^{th}$ coordinate P49. In this case, since the reference point CP is shifted from the $48^{th}$ coordinate P48 to the $49^{th}$ coordinate P49, the entire display image may be gradually shifted in the upper right direction. As shown in FIG. 13, a path from the $48^{th}$ coordinate P48 to the $49^{th}$ coordinate P49 will be defined as a $49^{th}$ path PA49.

When the display image is consistently output from the display panel 110 after the reference point CP is shifted to the $49^{th}$ coordinate P49, the controller 150 may shift the reference point CP from the $49^{th}$ coordinate P49 to (1, 0) in the shift area 40 based on the fifth route ROUTE5 after a preset time, and (1, 0) that is a position to which the reference point CP is shifted will be defined as a $50^{th}$ coordinate P50. In this case, since the reference point CP is shifted from the $49^{th}$ coordinate P49 to the $50^{th}$ coordinate P50, the display image may be entirely shifted in the upper left direction. As shown in FIG. 13, a path from the $49^{th}$ coordinate P49 to the $50^{th}$ coordinate P50 will be defined as a $50^{th}$ path PASO, the $45^{th}$ path PA45, the $46^{th}$ path PA46, the $47^{th}$ path PA47, the $48^{th}$ path PA48, the $49^{th}$ path PA49, and the $50^{th}$ path PASO will be defined as a ninth sub-route SUB-ROUTE5, and the fifth route ROUTE5 may include the eighth sub-route SUB-ROUTE8 and the ninth sub-route SUB-ROUTE5.

Referring to FIG. 13, according to embodiments, a start coordinate (i.e., the $39^{th}$ coordinate P39) of the eighth sub-route SUB-ROUTE8 and an end coordinate (i.e., the $50^{th}$ coordinate P50) of the ninth sub-route SUB-ROUTE5 may be different from each other, and a start coordinate (i.e., the $44^{th}$ coordinate P44) of the ninth sub-route SUB-ROUTE5 and the end coordinate (i.e., the $50^{th}$ coordinate P50) of the ninth sub-route SUB-ROUTE5 may be different from each other. In such embodiments, each of the eighth and ninth sub-routes SUB-ROUTE8 and SUB-ROUTE5 may have a substantially rectangular shape rotated about the zeroth coordinate P0 by a preset angle. In an embodiment, for example, a minor axis (e.g., corresponding to the $41^{st}$ path PA41 or the $43^{rd}$ path PA43) of the eighth sub-route SUB-ROUTE8 having the rectangular shape will be defined as an eighth width LW8, a major axis (e.g., corresponding to the $40^{th}$ and $44^{th}$ paths PA40 and PA44, or the $42^{nd}$ path PA42) of the eighth sub-route SUB-ROUTE8 having the rectangular shape will be defined as an eighth length LL8, a minor axis (e.g., corresponding to the $46^{th}$ path PA46 or the $48^{th}$ path PA48) of the ninth sub-route SUB-ROUTE5 having the rectangular shape will be defined as a ninth width LW9, and a major axis (e.g., corresponding to the $47^{th}$ path PA47) of the ninth sub-route SUB-ROUTE5 having the rectangular shape will be defined as a ninth length LL9. In such embodiments, the eighth width LW8 and the ninth width LW9 may be substantially equal to each other, and the eighth length LL8 and the ninth length LL9 may be substantially equal to each other. In such embodiments, the eighth sub-route SUB-ROUTE8 and the ninth sub-route SUB-ROUTE5 may be substantially symmetrical to each other based on the imaginary central vertical line CVL (or the imaginary central horizontal line CHL). In an embodiment, for example, an angle formed by each of the major axes of the eighth and ninth sub-routes SUB-ROUTE8 and SUB-ROUTE5 and the imaginary central vertical line CVL (or the imaginary central horizontal line CHL) passing through the zeroth coordinate P0 may be about 45 degrees (or about 135 degrees). In such embodiments, total numbers of movements (i.e., 12 times) by which the reference point CP is shifted in the first to fourth areas 41, 42, 43, and 44 may be equal to each other.

In embodiments, as described above, (−3, 6) may be defined as the $40^{th}$ coordinate P40 in the shift area 40, but the configuration of embodiments of the disclosure is not limited thereto. In an alternative embodiment, for example, (6, 3), (6, −3), or (−3, −6) may be defined as the $40^{th}$ coordinate P40 in the shift area 40. In such an embodiment where the $40^{th}$ coordinate P40 is changed as described above, the shape of each of the eighth and ninth sub-routes SUB-ROUTE8 and SUB-ROUTE5 may be partially changed, whereas a $50^{th}$ coordinate P50 may be identical to the $50^{th}$ coordinate P50 (e.g., (1, 0) in the shift area 40) shown in FIGS. 12 and 13.

Referring to FIGS. 14 and 15, when the display image is consistently output from the display panel 110 after the reference point CP is shifted to the $50^{th}$ coordinate P50, the controller 150 may shift the reference point CP in the upper left direction of the display panel 110 in the shift area 40 based on the sixth route ROUTE6 every preset time. In an embodiment, for example, the controller 150 may shift the reference point CP from the $50^{th}$ coordinate P50 to (0, 1), (−1, 2), (−2, 3), (−3, 4), (−4, 5), and (−5, 6) in the shift area 40 every preset time, and (−5, 6) that is a position to which the reference point CP is shifted will be defined as a $51^{st}$ coordinate P51. In this case, since the reference point CP is shifted from the $50^{th}$ coordinate P50 to the $51^{st}$ coordinate P51, the entire display image may be gradually shifted in the upper left direction. As shown in FIG. 15, a path from the $50^{th}$ coordinate P50 to the $51^{st}$ coordinate P51 will be defined as a $51^{st}$ path PA51.

When the display image is consistently output from the display panel 110 after the reference point CP is shifted to the $51^{st}$ coordinate P51, the controller 150 may shift the reference point CP from the $51^{st}$ coordinate P51 to (−6, 5) in the shift area 40 based on the sixth route ROUTE6 after a preset time, and (−6, 5) that is a position to which the reference point CP is shifted will be defined as a $52^{nd}$ coordinate P52. In this case, since the reference point CP is shifted from the $51^{st}$ coordinate P51 to the $52^{nd}$ coordinate P52, the display image may be entirely shifted in the lower left direction. As shown in FIG. 15, a path from the $51^{st}$ coordinate P51 to the $52^{nd}$ coordinate P52 will be defined as a $52^{nd}$ path PA52.

When the display image is consistently output from the display panel 110 after the reference point CP is shifted from the $52^{nd}$ coordinate P52 to the $52^{nd}$ coordinate P52, the controller 150 may shift the reference point CP in the lower right direction of the display panel 110 in the shift area 40 based on the sixth route ROUTE6 every preset time. In an embodiment, for example, the controller 150 may shift the reference point CP to (−5, 4), (−4, 3), (−3, 2), (−2, 1), (−1, 0), (0, −1), (1, −2), (2, −3), (3, −4), (4, −5), and (5, −6) in the shift area 40 every preset time, and (5, −6) that is a position to which the reference point CP is shifted will be defined as a $53^{rd}$ coordinate P53. In this case, since the reference point CP is shifted from the $52^{nd}$ coordinate P52 to the $53^{rd}$ coordinate P53, the entire display image may be gradually shifted in the lower right direction. As shown in FIG. 15, a path from the $52^{nd}$ coordinate P52 to the $53^{rd}$ coordinate P53 will be defined as a $53^{rd}$ path PA53.

When the display image is consistently output from the display panel 110 after the reference point CP is shifted to the $53^{rd}$ coordinate P53, the controller 150 may shift the reference point CP from the $53^{rd}$ coordinate P53 to (6, −5) in the shift area 40 based on the sixth route ROUTE6 after a preset time, and (6, −5) that is a position to which the reference point CP is shifted will be defined as a $54^{th}$ coordinate P54. In this case, since the reference point CP is shifted from the $53^{rd}$ coordinate P53 to the $54^{th}$ coordinate P54, the display image may be entirely shifted in the upper right direction. As shown in FIG. 15, a path from the $53^{rd}$ coordinate P53 to the $54^{th}$ coordinate P54 will be defined as a $54^{th}$ path PA54. When the display image is consistently output from the display panel 110 after the reference point CP is shifted to the $54^{th}$ coordinate P54, the controller 150 may shift the reference point CP in the upper left direction of the display panel 110 in the shift area 40 based on the sixth route ROUTE6 every preset time. In an embodiment, for example, the controller 150 may shift the reference point CP from the $54^{th}$ coordinate P54 to (5, −4), (4, −3), (3, −2), (2, −1), and (1, 0) in the shift area 40 every preset time, (1, 0) that is a position to which the reference point CP is shifted will be defined as a $55^{th}$ coordinate P55, and the $50^{th}$ coordinate P50 and the $55^{th}$ coordinate P55 may be a same position as each other. In this case, since the reference point CP is shifted from the $54^{th}$ coordinate P54 to the $55^{th}$ coordinate P55, the entire display image may be gradually shifted in the upper left direction. As shown in FIG. 15, a path from the $54^{th}$ coordinate P54 to the $55^{th}$ coordinate P55 will be defined as a $55^{th}$ path PASS, and the $51^{st}$ path PA51, the $52^{nd}$ path PA52, the $53^{rd}$ path PA53, the $54^{th}$ path PA54, and the $55^{th}$ path PASS will be defined as a $10^{th}$ sub-route SUB-ROUTE10.

When the display image is consistently output from the display panel 110 after the reference point CP is shifted to the $55^{th}$ coordinate P55, the controller 150 may shift the reference point CP in the upper right direction of the display panel 110 in the shift area 40 based on the sixth route ROUTE6 every preset time. In an embodiment, for example, the controller 150 may shift the reference point CP from the $55^{th}$ coordinate P55 to (2, 1), (3, 2), (4, 3), (5, 4), and (6, 5) in the shift area 40 every preset time, and (6, 5) that is a position to which the reference point CP is shifted will be defined as a $56^{th}$ coordinate P56. In this case, since the reference point CP is shifted from the $55^{th}$ coordinate P55 to the $56^{th}$ coordinate P56, the entire display image may be gradually shifted in the upper right direction. As shown in FIG. 15, a path from the $55^{th}$ coordinate P55 to the $56^{th}$ coordinate P56 will be defined as a $56^{th}$ path PA56.

When the display image is consistently output from the display panel 110 after the reference point CP is shifted to the $56^{th}$ coordinate P56, the controller 150 may shift the reference point CP from the $56^{th}$ coordinate P56 to (5, 6) in the shift area 40 based on the sixth route ROUTE6 after a preset time, and (5, 6) that is a position to which the reference point CP is shifted will be defined as a $57^{th}$ coordinate P57. In this case, since the reference point CP is shifted from the $56^{th}$ coordinate P56 to the $57^{th}$ coordinate P57, the display image may be entirely shifted in the upper left direction. As shown in FIG. 15, a path from the $56^{th}$ coordinate P56 to the $57^{th}$ coordinate P57 will be defined as a $57^{th}$ path PA57.

When the display image is consistently output from the display panel 110 after the reference point CP is shifted to the $57^{th}$ coordinate P57, the controller 150 may shift the reference point CP in the lower left direction of the display panel 110 in the shift area 40 based on the sixth route ROUTE6 every preset time. In an embodiment, for example, the controller 150 may shift the reference point CP from the $57^{th}$ coordinate P57 to (4, 5), (3, 4), (2, 3), (1, 2), (0, 1), (−1, 0), (−2, −1), (−3, −2), (−4, −3), (−5, −4), and (−6, −5) in the shift area 40 every preset time, and (−6, −5) that is a position to which the reference point CP is shifted will be defined as a $58^{th}$ coordinate P58. In this case, since the reference point CP is shifted from the $57^{th}$ coordinate P57 to the $58^{th}$ coordinate P58, the entire display image may be gradually shifted in the lower left direction. As shown in FIG. 15, a path from the $57^{th}$ coordinate P57 to the $58^{th}$ coordinate P58 will be defined as a $58^{th}$ path PA58.

When the display image is consistently output from the display panel 110 after the reference point CP is shifted to the $58^{th}$ coordinate P58, the controller 150 may shift the reference point CP from the $58^{th}$ coordinate P58 to (−5, −6) in the shift area 40 based on the sixth route ROUTE6 after a preset time, and (−5, −6) that is a position to which the reference point CP is shifted will be defined as a $59^{th}$ coordinate P59. In this case, since the reference point CP is shifted from the $58^{th}$ coordinate P58 to the $59^{th}$ coordinate P59, the display image may be entirely shifted in the lower right direction. As shown in FIG. 15, a path from the $58^{th}$ coordinate P58 to the $59^{th}$ coordinate P59 will be defined as a $59^{th}$ path PA59.

When the display image is consistently output from the display panel 110 after the reference point CP is shifted to the $59^{th}$ coordinate P59, the controller 150 may shift the reference point CP in the upper right direction of the display panel 110 in the shift area 40 based on the sixth route ROUTE6 every preset time. In an embodiment, for example, the controller 150 may shift the reference point CP from the $59^{th}$ coordinate P59 to (−4, 5), (−3, 4), (−2, 3), (−1, 2), and (0, −1) in the shift area 40 every preset time, and (0, −1) that is a position to which the reference point CP is shifted will be defined as a $60^{th}$ coordinate P60. In this case, since the reference point CP is shifted from the $59^{th}$ coordinate P59 to the $60^{th}$ coordinate P60, the entire display image may be gradually shifted in the upper right direction (e.g., a sixth direction D6). As shown in FIG. 15, a path from the $59^{th}$ coordinate P59 to the $60^{th}$ coordinate P60 will be defined as a $60^{th}$ path PA60.

When the display image is consistently output from the display panel 110 after the reference point CP is shifted to the $60^{th}$ coordinate P60, the controller 150 may shift the reference point CP to the zeroth coordinate P0 in the shift area 40 based on the sixth route ROUTE6 after a preset time. In this case, since the reference point CP is shifted from the $60^{th}$ coordinate P60 to the zeroth coordinate P0, the display image may be entirely shifted in an upper direction. As shown in FIG. 15, a path from the $60^{th}$ coordinate P60 to the zeroth coordinate P0 will be defined as a $61^{st}$ path PA61, the $56^{th}$ path PA56, the $57^{th}$ path PA57, the $58^{th}$ path PA58, the $59^{th}$ path PA59, the $60^{th}$ path PA60, and the $61^{st}$ path PA61 will be defined as an $11^{th}$ sub-route SUB-ROUTE11, and the sixth route ROUTE6 may include the $10^{th}$ sub-route SUB-ROUTE10 and the $11^{th}$ sub-route SUB-ROUTE11.

Referring to FIG. 15, according to embodiments, a start coordinate (i.e., the $50^{th}$ coordinate P50) of the $10^{th}$ sub-route SUB-ROUTE10 and an end coordinate (i.e., the zeroth coordinate P0) of the $11^{th}$ sub-route SUB-ROUTE11 may be different from each other, and a start coordinate (i.e., the $55^{th}$ coordinate P55) of the $11^{th}$ sub-route SUB-ROUTE11 and the end coordinate (i.e., the zeroth coordinate P0) of the $11^{th}$ sub-route SUB-ROUTE11 may be different from each other. In such embodiments, each of the $10^{th}$ and $11^{th}$ sub-routes SUB-ROUTE10 and SUB-ROUTE11 may have a substantially rectangular shape rotated about the zeroth coordinate P0 by a preset angle. In an embodiment, for example, a minor axis (e.g., corresponding to the $54^{th}$ path PA54 or the $52^{nd}$ path PA52) of the $10^{th}$ sub-route SUB-ROUTE10 having the rectangular shape will be defined as a $10^{th}$ width LW10, a major axis (e.g., corresponding to the $51^{st}$ and $55^{th}$ paths PA51 and PASS, or the $53^{rd}$ path PA53) of the $10^{th}$ sub-route SUB-ROUTE10 having the rectangular shape will be defined as a $10^{th}$ length LL10, a minor axis (e.g., corresponding to the $57^{th}$ path PA57 or the $59^{th}$ path PA59) of the $11^{th}$ sub-route SUB-ROUTE11 having the rectangular shape will be defined as an $11^{th}$ width LW11, and a major axis (e.g., corresponding to the $58^{th}$ path PA58) of the $11^{th}$ sub-route SUB-ROUTE11 having the rectangular shape will be defined as an $11^{th}$ length LL11. In such embodiments, the $10^{th}$ width LW10 and the $11^{th}$ width LW11 may be substantially equal to each other, and the $10^{th}$ length LL10 and the $11^{th}$ length LL11 may be substantially equal to each other. In such embodiments, the $10^{th}$ sub-route SUB-ROUTE10 and the $11^{th}$ sub-route SUB-ROUTE11 may be substantially symmetrical to each other based the imaginary central vertical line CVL (or the imaginary central horizontal line CHL). In an embodiment, for example, an angle formed by each of the major axes of the $10^{th}$ and $11^{th}$ sub-routes SUB-ROUTE10 and SUB-ROUTE11 and the imaginary central vertical line CVL (or the imaginary central horizontal line CHL) passing through the zeroth coordinate P0 may be about 45 degrees (or about 135 degrees). In such embodiments, total numbers of movements (i.e., 12 times) by which the reference point CP is shifted in the first to fourth areas 41, 42, 43, and 44 may be equal to each other.

In embodiments, as described above, (−5, 6) may be defined as the $51^{st}$ coordinate P51 in the shift area 40, but the configuration of embodiments of the disclosure is not limited thereto. In an alternative embodiment, for example, (6, 5), (6, −5), or (−5, −6) may be defined as the 51st coordinate P51 in the shift area 40. In an embodiment where the 51st coordinate P51 is changed as described above, the shape of each of the 10th and 11th sub-routes SUB-ROUTE10 and SUB-ROUTE11 may be partially changed, whereas a zeroth coordinate P0 may be identical to the zeroth coordinate P0 (e.g., (0, 0) in the shift area 40) shown in FIGS. 14 and 15.

In embodiments, as described above, the reference point CP starting from the zeroth coordinate P0 may return to the zeroth coordinate P0 through the first to sixth routes ROUTE1, ROUTE2, ROUTE3, ROUTE4, ROUTE5, and ROUTE6. Such a process will be defined as one cycle, and the display device 100 may repeatedly perform the process.

A conventional display device may disperse stress applied to a pixel by using a display image shift scheme for shifting an entire display image every preset time. In a conventional display device using an orbit driving scheme, for example, a display image may be shifted in a predetermined direction, and black data may be displayed in an outer peripheral portion where the display image is not displayed due to the shift of the display image. At this point, according to the orbit driving scheme, an origin of the display image (e.g., a center of the image) may be shifted in a clockwise or counterclockwise direction in the form of a rectangular helix. In this case, the origin of the display image may be shifted only in one direction as the origin of the display image moves from a center to an outer periphery of the rectangular helix, such that the stress may not be dispersed. In addition, a total amount of movements by which the display image is shifted may be relatively large so that there may be a difficulty in dispersing the stress. In such a conventional display device, a shift area may have a size of 32 rows and 26 columns, for example, and 832 pixels may be arranged in the shift area. In such a conventional display device, the preset time may be set as about 3 minutes, and a time used to move through an entire orbit having a rectangular helix shape may be relatively long.

According to embodiments of the display device 100 according to the disclosure, the shift area 40 may have a square shape corresponding to a matrix shape having 13 rows and 13 columns, first to 11th sub-routes SUB-ROUTE1, SUB-ROUTE2, SUB-ROUTE3, SUB-ROUTE4, SUB-ROUTE5, SUB-ROUTE6, SUB-ROUTE7, SUB-ROUTE5, SUB-ROUTE5, SUB-ROUTE10, and SUB-ROUTE11 included in the first to sixth routes ROUTE1, ROUTE2, ROUTE3, ROUTE4, ROUTE5, and ROUTE6 may have mutually different movement paths in the shift area 40, and the first to 11th sub-routes SUB-ROUTE1, SUB-ROUTE2, SUB-ROUTE3, SUB-ROUTE4, SUB-ROUTE5, SUB-ROUTE6, SUB-ROUTE7, SUB-ROUTE5, SUB-ROUTE5, SUB-ROUTE10, and SUB-ROUTE11 may have mutually different shapes. Accordingly, in such embodiments, the reference point CP may be entirely shifted (e.g., to substantially all the intersection points) in the shift area 40 such that the display device 100 may effectively disperse stress applied to the pixel P.

In such embodiments, each of the first to 11th sub-routes SUB-ROUTE1, SUB-ROUTE2, SUB-ROUTE3, SUB-ROUTE4, SUB-ROUTE5, SUB-ROUTE6, SUB-ROUTE7, SUB-ROUTE5, SUB-ROUTE5, SUB-ROUTE10, and SUB-ROUTE11 may have a rectangular or square shape rotated by a preset angle, so that the first to 11th sub-routes SUB-ROUTE1, SUB-ROUTE2, SUB-ROUTE3, SUB-ROUTE4, SUB-ROUTE5, SUB-ROUTE6, SUB-ROUTE7, SUB-ROUTE5, SUB-ROUTE5, SUB-ROUTE10, and SUB-ROUTE11 may shorten a time used to reach a maximum movement range (e.g., an outermost periphery of the shift area 40) through relatively few movement paths. Accordingly, in such embodiments, the display device 100 may disperse the stress applied to the pixel P in a relatively rapid manner.

Figure 16:
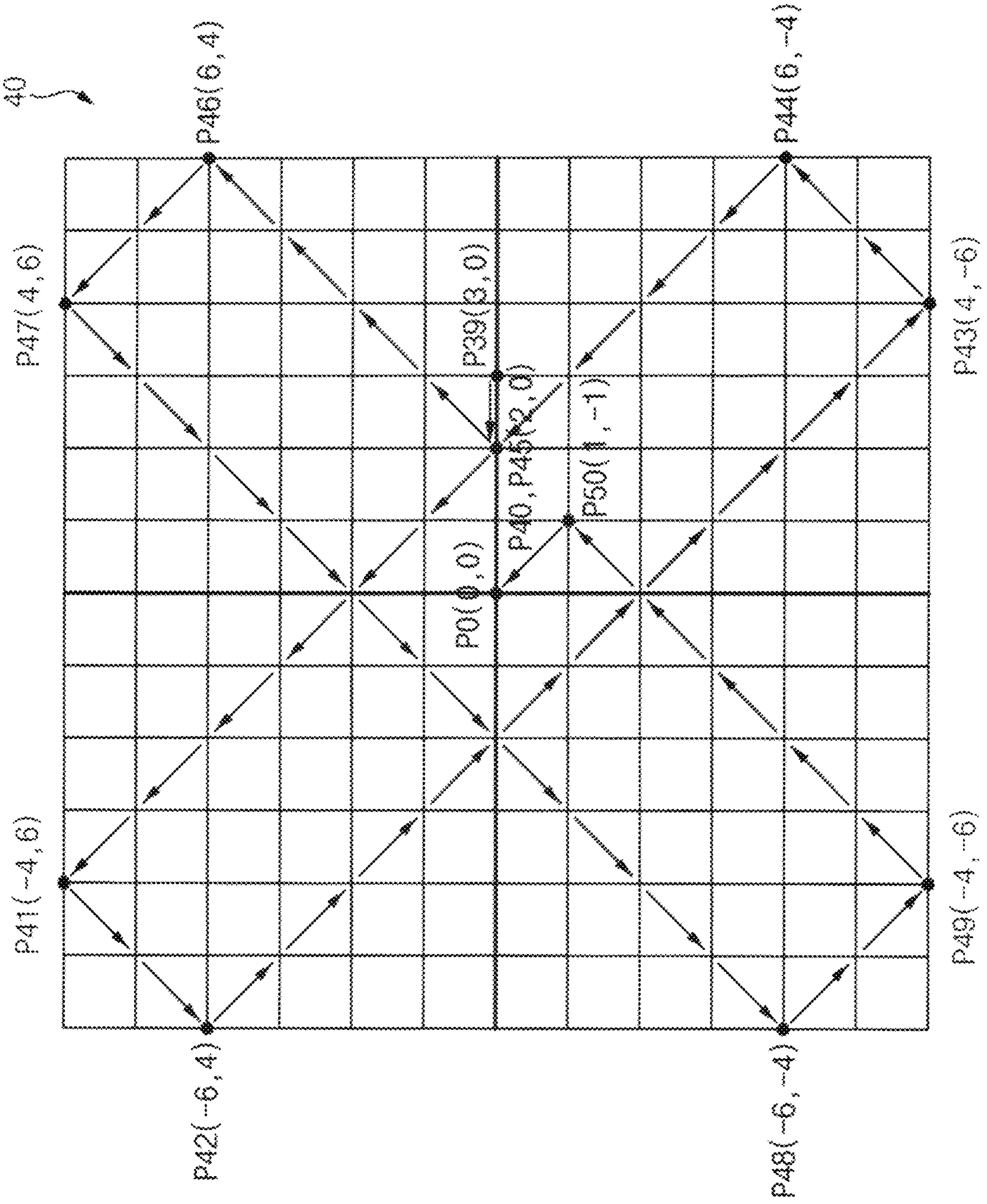
FIGS. 16 and 17 are plan views showing an alternative embodiment of the fifth route of FIG. 13.
Figure 17:
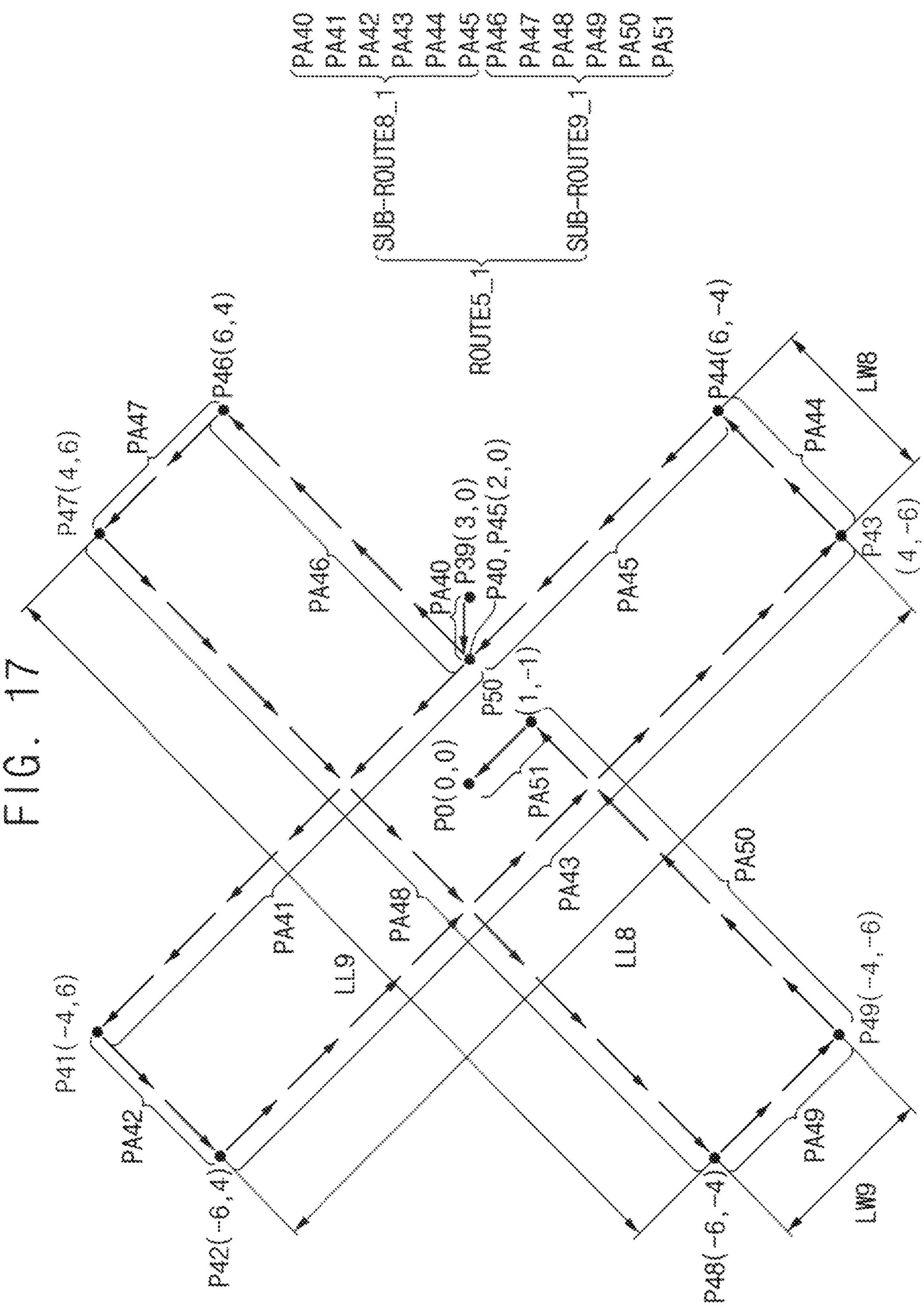

FIGS. 16 and 17 are plan views showing an alternative embodiment of the fifth route of FIG. 13.

Referring to FIGS. 1 to 11, the reference point CP may be shifted from the zeroth coordinate P0 to the 39th coordinate P39 through the first to fourth routes ROUTE1, ROUTE2, ROUTE3, and ROUTE4.

Referring to FIGS. 16 and 17, in an alternative embodiment, when the display image is consistently output from the display panel 110 after the reference point CP is shifted to the 39th coordinate P39, the controller 150 may shift the reference point CP from the 39th coordinate P39 to (2, 0) in the shift area 40 based on an alternative fifth route (hereinafter, will be referred to as 5_1th route) ROUTE5_1 after a preset time, and (2, 0) that is a position to which the reference point CP is shifted will be defined as a 40th coordinate P40. In such an embodiment, since the reference point CP is shifted from the 39th coordinate P39 to the 40th coordinate P40, the display image may be entirely shifted in the left direction. As shown in FIG. 17, a path from the 39th coordinate P39 to the 40th coordinate P40 will be defined as a 40th path PA40.

When the display image is consistently output from the display panel 110 after the reference point CP is shifted to the 40th coordinate P40, the controller 150 may shift the reference point CP in the upper left direction of the display panel 110 in the shift area 40 based on the 5_1th route ROUTE5_1 every preset time. In an embodiment, for example, the controller 150 may shift the reference point CP from the 40th coordinate P40 to (1, 1), (0, 2), (−1, 3), (−2, 4), (−3, 5), and (−4, 6) in the shift area 40 at every preset time, and (−4, 6) that is a position to which the reference point CP is shifted will be defined as a 41st coordinate P41. In this case, since the reference point CP is shifted from the 40th coordinate P40 to the 41st coordinate P41, the entire display image may be gradually shifted in the upper left direction. As shown in FIG. 17, a path from the 40th coordinate P40 to the 41st coordinate P41 will be defined as a 41st path PA41.

When the display image is consistently output from the display panel 110 after the reference point CP is shifted to the 41st coordinate P41, the controller 150 may shift the reference point CP in the lower left direction of the display panel 110 in the shift area 40 based on the 5_1th route ROUTE5_1 every preset time. In an embodiment, for example, the controller 150 may shift the reference point CP from the 41st coordinate P41 to (−5, 5) and (−6, 4) in the shift area 40 every preset time, and (−6, 4) that is a position to which the reference point CP is shifted will be defined as a 42nd coordinate P42. In this case, since the reference point CP is shifted from the 41st coordinate P41 to the 42nd coordinate P42, the entire display image may be gradually shifted in the lower left direction. As shown in FIG. 17, a path from the 41st coordinate P41 to the 42nd coordinate P42 will be defined as a 42nd path PA42.

When the display image is consistently output from the display panel 110 after the reference point CP is shifted to the 42nd coordinate P42, the controller 150 may shift the reference point CP in the lower right direction of the display panel 110 in the shift area 40 based on the 5_1th route ROUTE5_1 every preset time. In an embodiment, for example, the controller 150 may shift the reference point CP from the 42nd coordinate P42 to (−5, 3), (−4, 2), (−3, 1), (−2, 0), (−1, −1), (0, −2), (1, −3), (2, −4), (3, −5), and (4, −6) in the shift area 40 every preset time, and (4, −6) that is a position to which the reference point CP is shifted will be defined as a 43$^{rd}$ coordinate P43. In this case, since the reference point CP is shifted from the 42$^{nd}$ coordinate P42 to the 43$^{rd}$ coordinate P43, the entire display image may be gradually shifted in the lower right direction. As shown in FIG. 17, a path from the 42$^{nd}$ coordinate P42 to the 43$^{rd}$ coordinate P43 will be defined as a 43$^{rd}$ path PA43.

When the display image is consistently output from the display panel 110 after the reference point CP is shifted to the 43$^{rd}$ coordinate P43, the controller 150 may shift the reference point CP in the upper right direction of the display panel 110 in the shift area 40 based on the 5_1$^{th}$ route ROUTE5_1 every preset time. In an embodiment, for example, the controller 150 may shift the reference point CP from the 43$^{rd}$ coordinate P43 to (5, −5) and (6, −4) in the shift area 40 every preset time, and (6, −4) that is a position to which the reference point CP is shifted will be defined as a 44$^{th}$ coordinate P44. In this case, since the reference point CP is shifted from the 43$^{rd}$ coordinate P43 to the 44$^{th}$ coordinate P44, the entire display image may be gradually shifted in the upper right direction. As shown in FIG. 17, a path from the 43$^{rd}$ coordinate P43 to the 44$^{th}$ coordinate P44 will be defined as a 44$^{th}$ path PA44.

When the display image is consistently output from the display panel 110 after the reference point CP is shifted to the 44$^{th}$ coordinate P44, the controller 150 may shift the reference point CP in the upper left direction of the display panel 110 in the shift area 40 based on the 5_1$^{th}$ route ROUTE5_1 every preset time. In an embodiment, for example, the controller 150 may shift the reference point CP from the 44$^{th}$ coordinate P44 to (5, −3), (4, −2), (3, −1), and (2, 0) in the shift area 40 at every preset time, (2, 0) that is a position to which the reference point CP is shifted will be defined as a 45$^{th}$ coordinate P45, and the 40$^{th}$ coordinate P40 and the 45$^{th}$ coordinate P45 may be a same position as each other. In this case, since the reference point CP is shifted from the 44$^{th}$ coordinate P44 to the 45$^{th}$ coordinate P45, the entire display image may be gradually shifted in the upper left direction. As shown in FIG. 17, a path from the 44$^{th}$ coordinate P44 to the 45$^{th}$ coordinate P45 will be defined as a 45$^{th}$ path PA45, and the 40$^{th}$ path PA40, the 41$^{st}$ path PA41, the 42$^{nd}$ path PA42, the 43$^{rd}$ path PA43, the 44$^{th}$ path PA44, and the 45$^{th}$ path PA45 will be defined as an alternative eighth sub-route (hereinafter, will be referred to as 8_1$^{th}$ sub-route) SUB-ROUTE8_1.

When the display image is consistently output from the display panel 110 after the reference point CP is shifted to the 45$^{th}$ coordinate P45, the controller 150 may shift the reference point CP in the upper right direction of the display panel 110 in the shift area 40 based on the 5_1$^{th}$ route ROUTE5_1 every preset time. In an embodiment, for example, the controller 150 may shift the reference point CP from the 45$^{th}$ coordinate P45 to (3, 1), (4, 2), (5, 3), and (6, 4) in the shift area 40 every preset time, and (6, 4) that is a position to which the reference point CP is shifted will be defined as a 46$^{th}$ coordinate P46. In this case, since the reference point CP is shifted from the 45$^{th}$ coordinate P45 to the 46$^{th}$ coordinate P46, the entire display image may be gradually shifted in the upper right direction. As shown in FIG. 17, a path from the 45$^{th}$ coordinate P45 to the 46$^{th}$ coordinate P46 will be defined as a 46$^{th}$ path PA46.

When the display image is consistently output from the display panel 110 after the reference point CP is shifted to the 46$^{th}$ coordinate P46, the controller 150 may shift the reference point CP in the upper left direction of the display panel 110 in the shift area 40 based on the 5_1$^{th}$ route ROUTE5_1 every preset time. In an embodiment, for example, the controller 150 may shift the reference point CP from the 46$^{th}$ coordinate P46 to (5, 5) and (4, 6) in the shift area 40 every preset time, and (4, 6) that is a position to which the reference point CP is shifted will be defined as a 47$^{th}$ coordinate P47. In this case, since the reference point CP is shifted from the 46$^{th}$ coordinate P46 to the 47$^{th}$ coordinate P47, the entire display image may be gradually shifted in the upper left direction. As shown in FIG. 17, a path from the 46$^{th}$ coordinate P46 to the 47$^{th}$ coordinate P47 will be defined as a 47$^{th}$ path PA47.

When the display image is consistently output from the display panel 110 after the reference point CP is shifted to the 47$^{th}$ coordinate P47, the controller 150 may shift the reference point CP in the lower left direction of the display panel 110 in the shift area 40 based on the 5_1$^{th}$ route ROUTE5_1 every preset time. In an embodiment, for example, the controller 150 may shift the reference point CP from the 47$^{th}$ coordinate P47 to (3, 5), (2, 4), (1, 3), (0, 2), (−1, 1), (−2, 0), (−3, −1), (−4, −2), (−5, −3), and (−6, −4) in the shift area 40 every preset time, and (−6, −4) that is a position to which the reference point CP is shifted will be defined as a 40$^{th}$ coordinate P48. In this case, since the reference point CP is shifted from the 47$^{th}$ coordinate P47 to the 48$^{th}$ coordinate P48, the entire display image may be gradually shifted in the lower left direction. As shown in FIG. 17, a path from the 47$^{th}$ coordinate P47 to the 48$^{th}$ coordinate P48 will be defined as a 48$^{th}$ path PA48.

When the display image is consistently output from the display panel 110 after the reference point CP is shifted to the 48$^{th}$ coordinate P48, the controller 150 may shift the reference point CP in the lower right direction of the display panel 110 in the shift area 40 based on the 5_1$^{th}$ route ROUTE5_1 every preset time. In an embodiment, for example, the controller 150 may shift the reference point CP shifted from the 48$^{th}$ coordinate P48 to (−5, −5) and (−4, −6) in the shift area 40 every preset time, and (−4, −6) that is a position to which the reference point CP is shifted will be defined as a 49$^{th}$ coordinate P49. In this case, since the reference point CP is shifted from the 48$^{th}$ coordinate P48 to the 49$^{th}$ coordinate P49, the entire display image may be gradually shifted in the lower right direction. As shown in FIG. 17, a path from the 48$^{th}$ coordinate P48 to the 49$^{th}$ coordinate P49 will be defined as a 49$^{th}$ path PA49.

When the display image is consistently output from the display panel 110 after the reference point CP is shifted to the 49$^{th}$ coordinate P49, the controller 150 may shift the reference point CP in the upper right direction of the display panel 110 in the shift area 40 based on the 5_1$^{th}$ route ROUTE5_1 every preset time. In an embodiment, for example, the controller 150 may shift the reference point CP from the 49$^{th}$ coordinate P49 to (−3, −5), (−2, −4), (−1, −3), (0, −2), and (1, −1) in the shift area 40 every preset time, and (1, −1) that is a position to which the reference point CP is shifted will be defined as a 50$^{th}$ coordinate P50. In this case, since the reference point CP is shifted from the 49$^{th}$ coordinate P49 to the 50$^{th}$ coordinate P50, the entire display image may be gradually shifted in the upper right direction. As shown in FIG. 17, a path from the 49$^{th}$ coordinate P49 to the 50$^{th}$ coordinate P50 will be defined as a 50$^{th}$ path PASO.

When the display image is consistently output from the display panel 110 after the reference point CP is shifted to the 50$^{th}$ coordinate P50, the controller 150 may shift the reference point CP to the zeroth coordinate P0 in the shift area 40 based on the 5_1$^{th}$ route ROUTE5_1 after a preset time. In this case, since the reference point CP is shifted from the 50$^{th}$ coordinate P50 to the zeroth coordinate P0, the display image may be entirely shifted in the upper left direction. As shown in FIG. 17, a path from the 50$^{th}$ coordinate P50 to the zeroth coordinate P0 will be defined as a 51$^{st}$ path PA51, the 46$^{th}$ path PA46, the 47$^{th}$ path PA47, the 48$^{th}$ path PA48, the 49$^{th}$ path PA49, the 50$^{th}$ path PASO, and the 51$^{st}$ path PA51 will be defined as an alternative ninth sub-route (hereinafter, will be referred to as 9_1$^{th}$ sub-route) SUB-ROUTE9_1, and the 5_1$^{th}$ route ROUTE5_1 may include the 8_1$^{th}$ sub-route SUB-ROUTE8_1 and the 9_1$^{th}$ sub-route SUB-ROUTE5_1.

Referring to FIG. 17, according to embodiments, each of the 8_1$^{th}$ and 9_1$^{th}$ sub-routes SUB-ROUTE8_1 and SUB-ROUTE9_1 may have a substantially rectangular shape rotated about the zeroth coordinate P0 by a preset angle. In an embodiment, for example, a minor axis (e.g., corresponding to the 42$^{nd}$ path PA42 or the 44$^{th}$ path PA44) of the 8_1$^{th}$ sub-route SUB-ROUTE8_1 having the rectangular shape will be defined as an eighth width LW8, a major axis (e.g., corresponding to the 41$^{st}$ and 45$^{th}$ paths PA41 and PA45, or the 43$^{rd}$ path PA43) of the 8_1$^{th}$ sub-route SUB-ROUTE8_1 having the rectangular shape will be defined as an eighth length LL8, a minor axis (e.g., corresponding to the 47$^{th}$ path PA47 or the 49$^{th}$ path PA49) of the 9_1$^{th}$ sub-route SUB-ROUTE9_1 having the rectangular shape will be defined as a ninth width LW9, and a major axis (e.g., corresponding to the 48$^{th}$ path PA48) of the 9_1$^{th}$ sub-route SUB-ROUTE9_1 having the rectangular shape will be defined as a ninth length LL9. In such embodiments, the eighth width LW8 and the ninth width LW9 may be substantially equal to each other, and the eighth length LL8 and the ninth length LL9 may be substantially equal to each other. In such embodiments, the 8_1$^{th}$ sub-route SUB-ROUTE8_1 and the 9_1$^{th}$ sub-route SUB-ROUTE9_1 may be symmetrical to each other based on the imaginary central vertical line CVL (or the imaginary central horizontal line CHL). In an embodiment, for example, an angle formed by each of the major axes of the 8_1$^{th}$ and 9_1$^{th}$ sub-routes SUB-ROUTE8_1 and SUB-ROUTE9_1 and the imaginary central vertical line CVL (or the imaginary central horizontal line CHL) passing through the zeroth coordinate P0 may be about 45 degrees (or about 135 degrees). In such embodiments, total numbers of movements (i.e., 10 times) by which the reference point CP is shifted in the first to fourth areas 41, 42, 43, and 44 may be equal to each other (except for the 40$^{th}$ path PA40).

In embodiments, as described above, the reference point CP starting from the zeroth coordinate P0 may return to the zeroth coordinate P0 through the first, second, third, fourth, and 5_1$^{th}$ routes ROUTE1, ROUTE2, ROUTE3, ROUTE4, and ROUTE5_1. Such a process will be defined as one cycle, and the display device may repeatedly perform the process.

Figure 18:
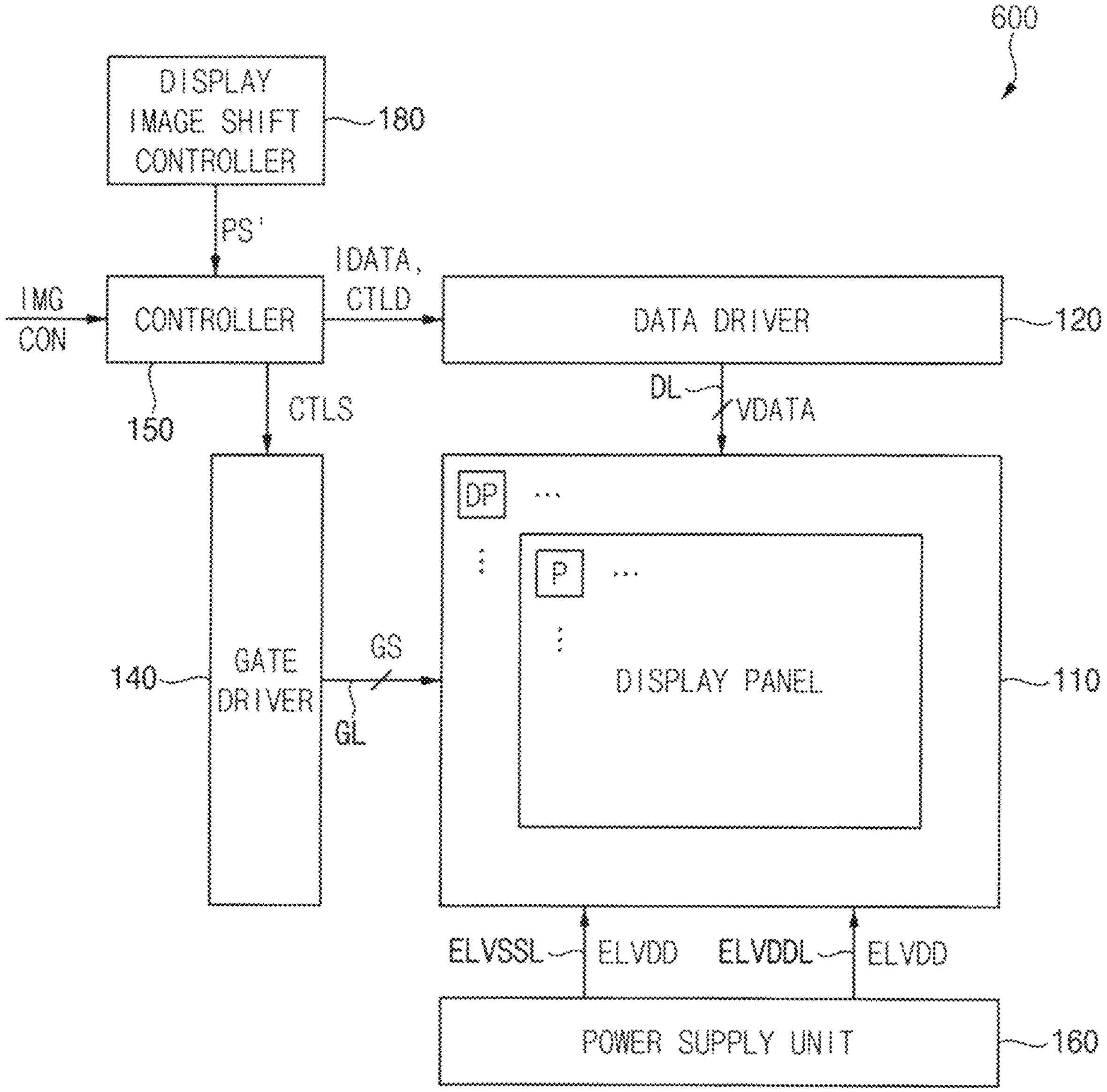
FIG. 18 is a block diagram showing a display device according to embodiments of the disclosure.
Figure 19:
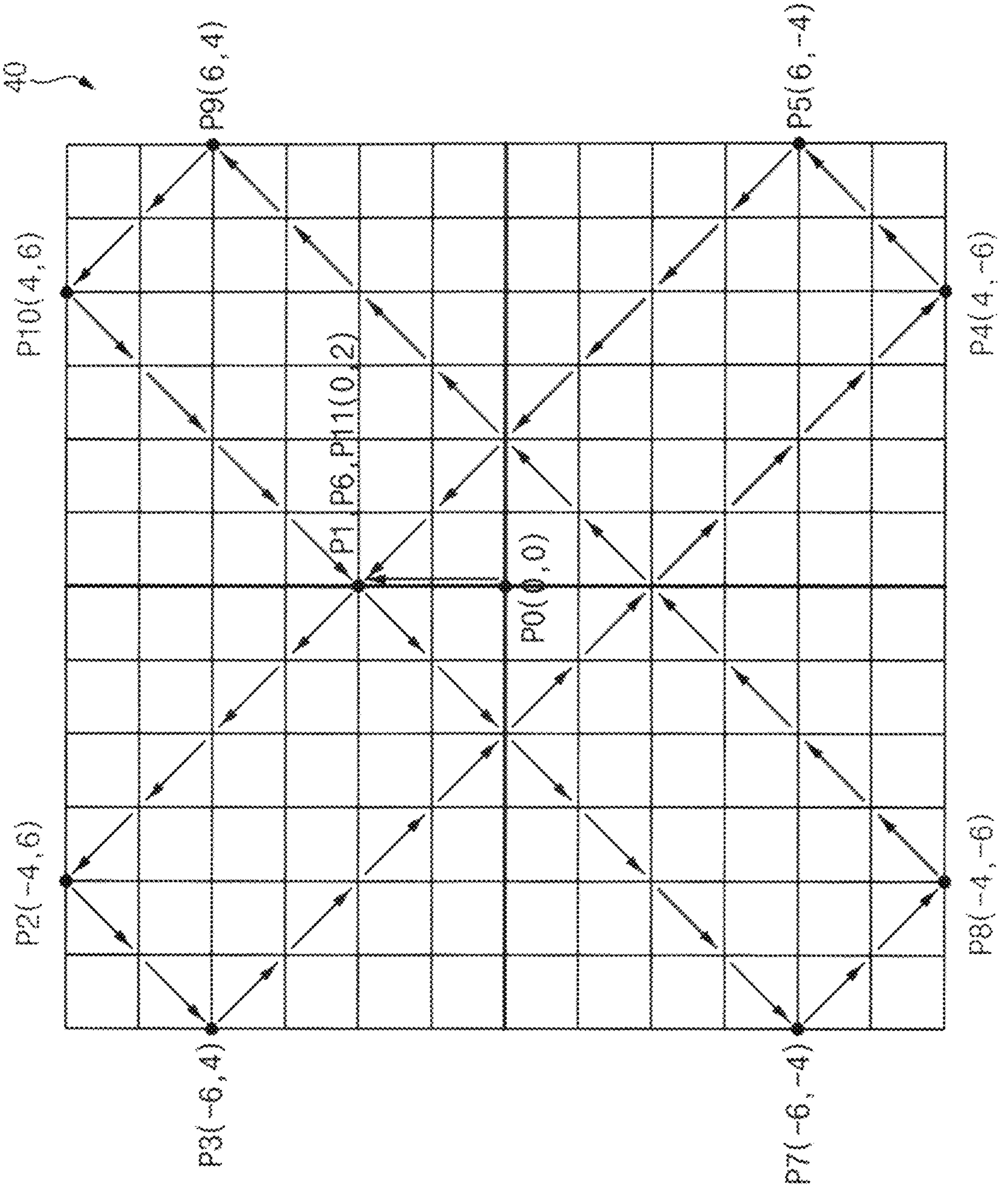
FIG. 19 is a plan view showing a first route in the shift area of FIG. 3A.
Figure 20:
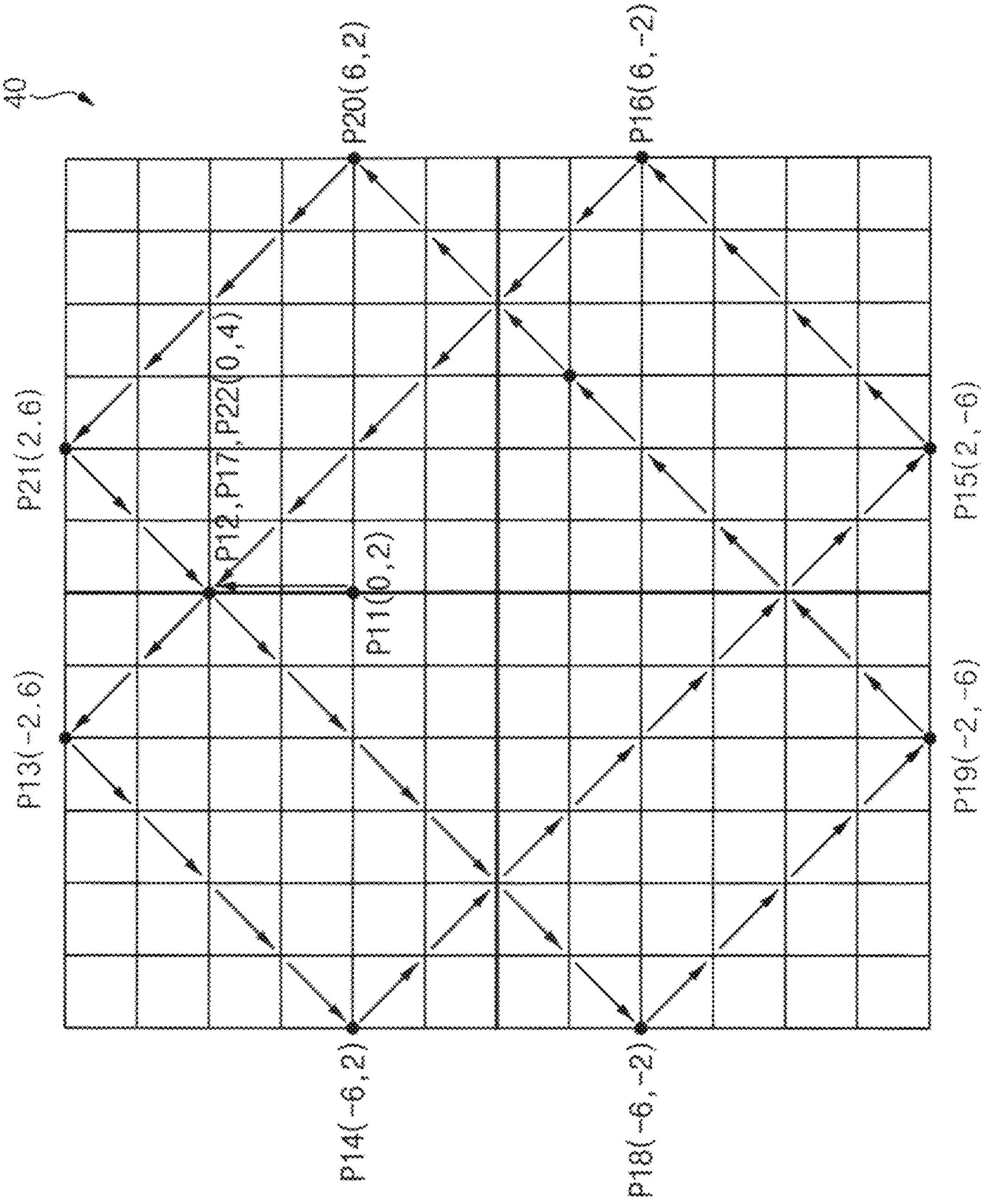
FIG. 20 is a plan view showing a second route in the shift area of FIG. 3A.
Figure 21:
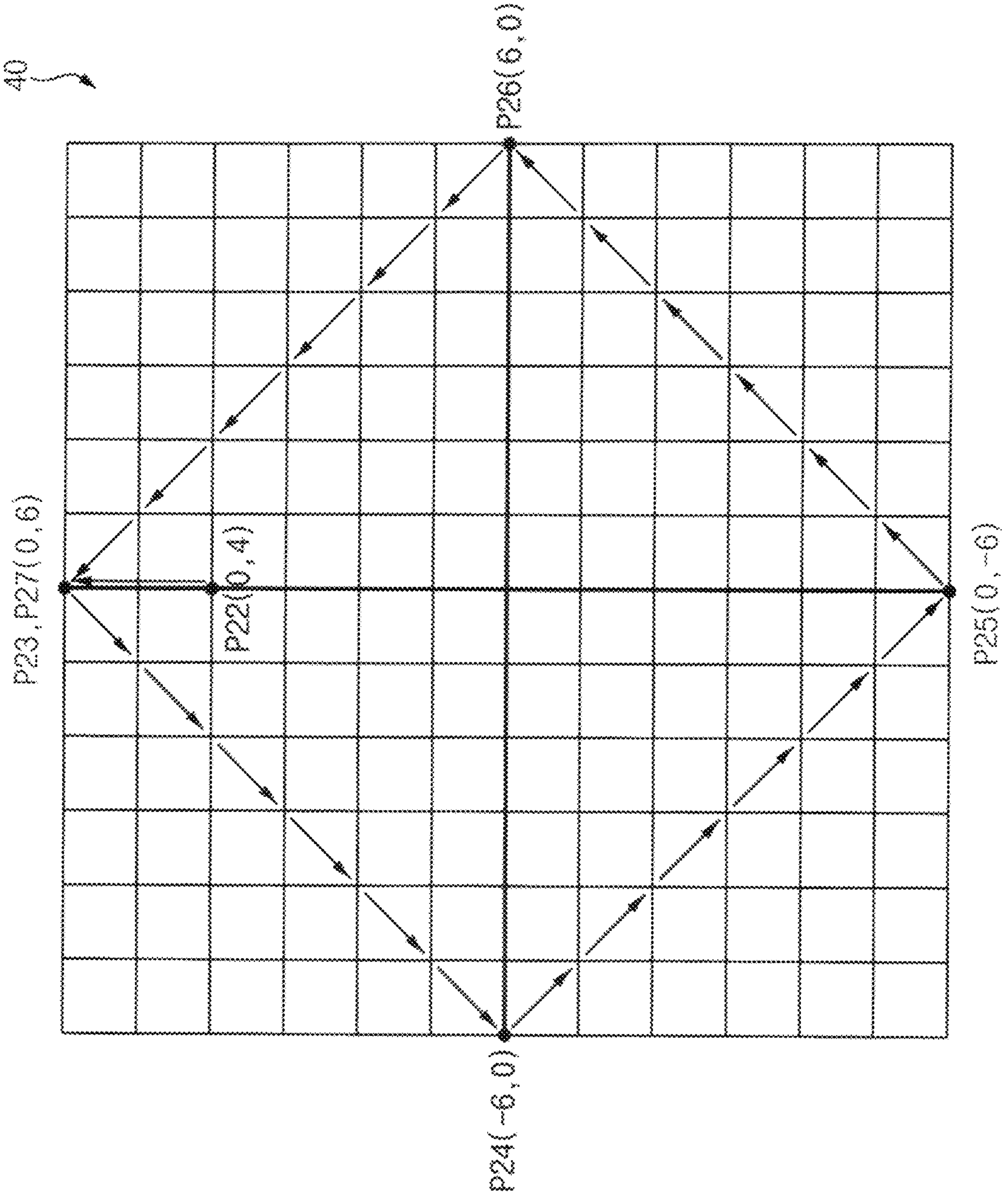
FIG. 21 is a plan view showing a third route in the shift area of FIG. 3A.
Figure 22:
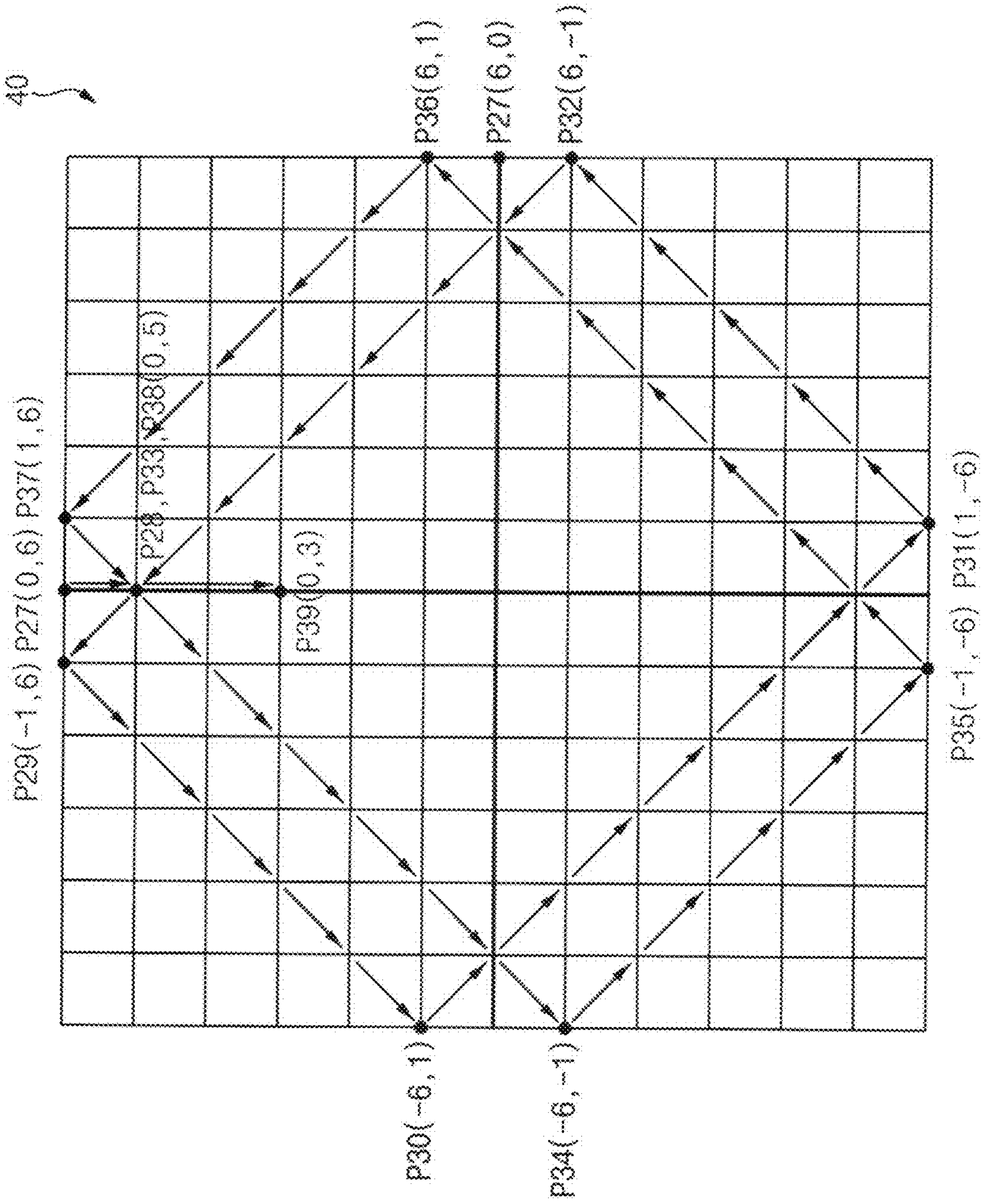
FIG. 22 is a plan view showing a fourth route in the shift area of FIG. 3A.
Figure 23:
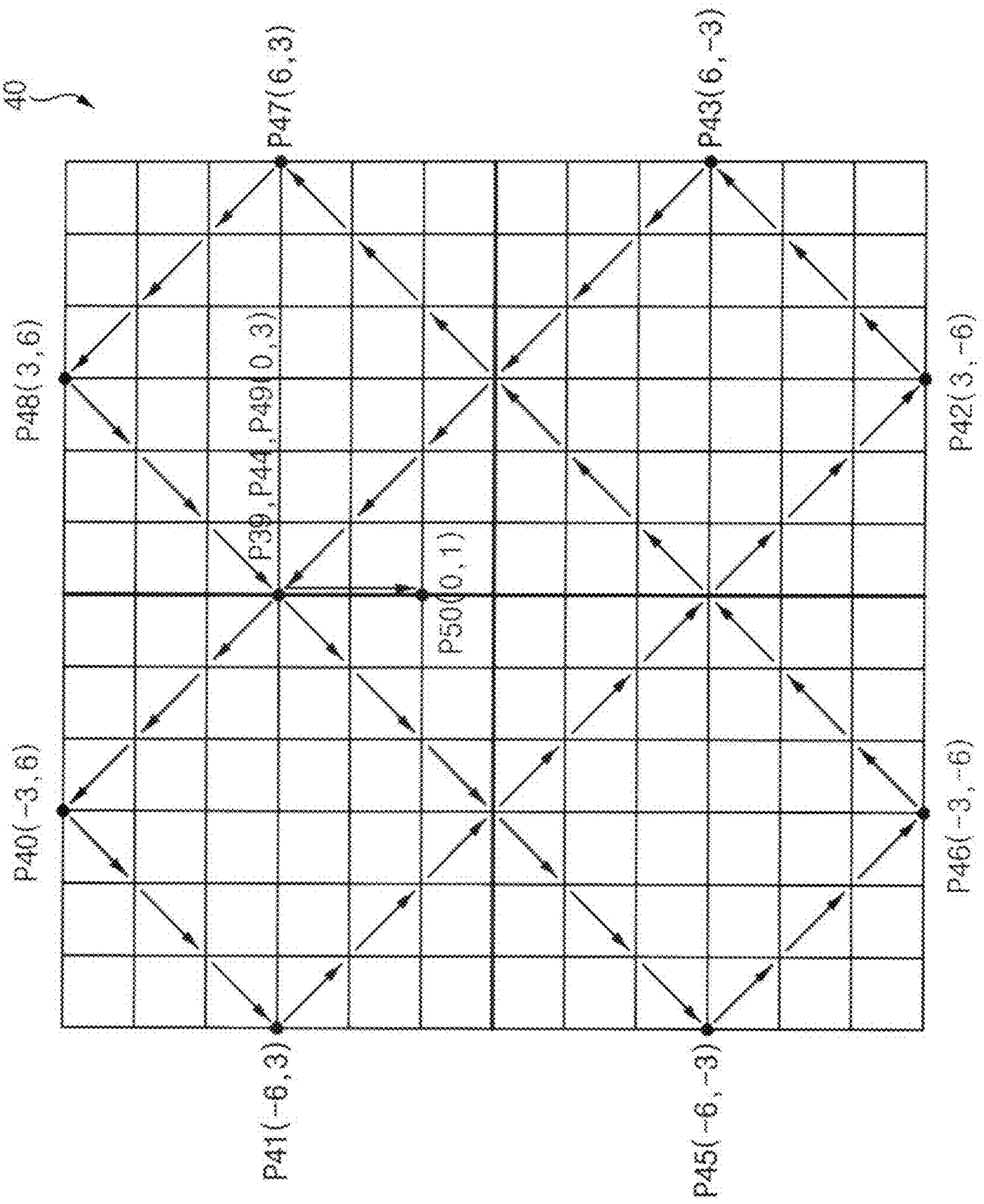
FIG. 23 is a plan view showing a fifth route in the shift area of FIG. 3A.
Figure 24:
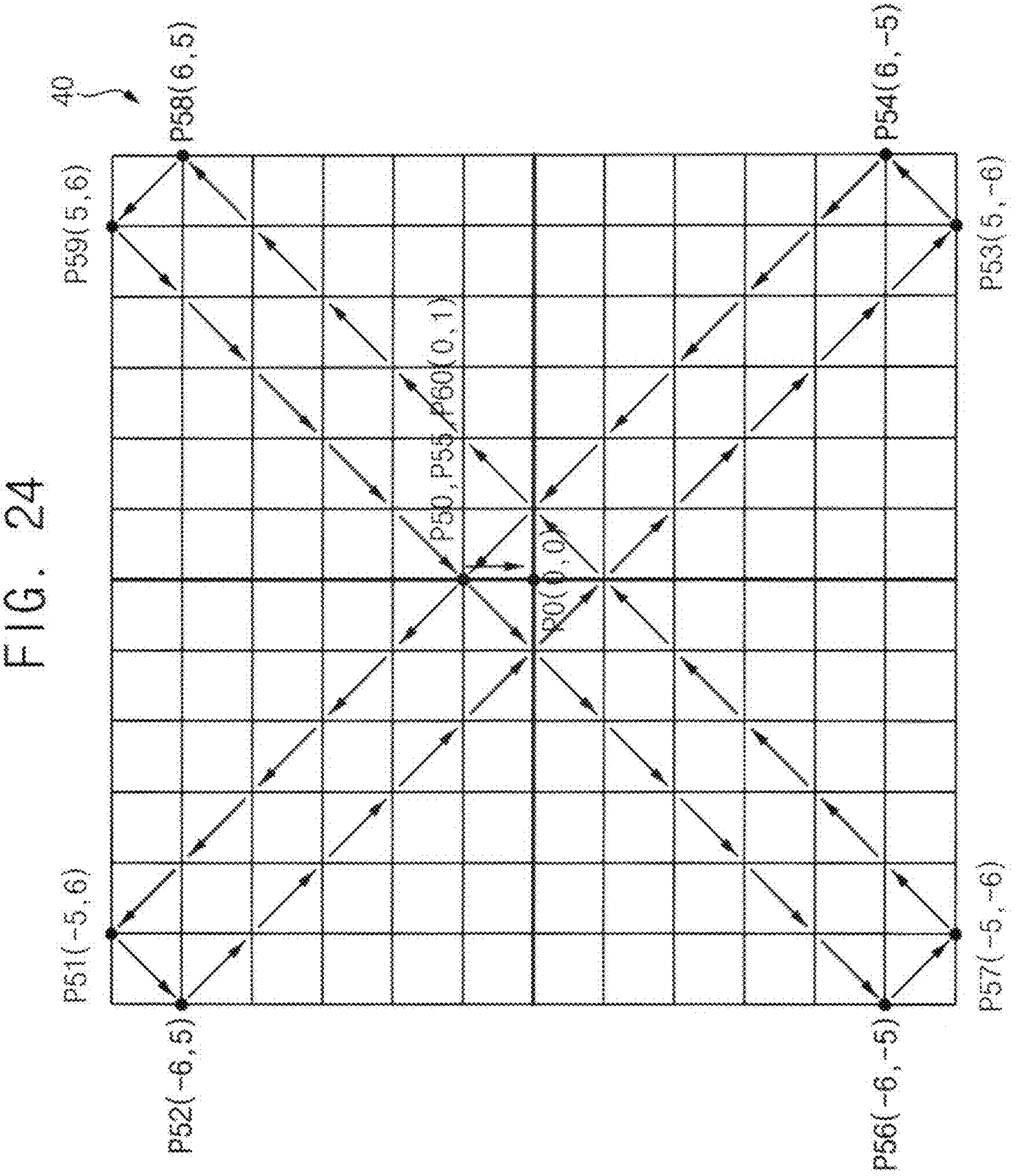
FIG. 24 is a plan view showing a sixth route in the shift area of FIG. 3A.

FIG. 18 is a block diagram showing a display device according to embodiments of the disclosure, FIG. 19 is a plan view showing a first route in the shift area of FIG. 3A, FIG. 20 is a plan view showing a second route in the shift area of FIG. 3A, FIG. 21 is a plan view showing a third route in the shift area of FIG. 3A, FIG. 22 is a plan view showing a fourth route in the shift area of FIG. 3A, FIG. 23 is a plan view showing a fifth route in the shift area of FIG. 3A, and FIG. 24 is a plan view showing a sixth route in the shift area of FIG. 3A. A display device 600 illustrated in FIGS. 18 to 24 may have a configuration that is substantially identical or similar to the configuration of embodiments of the display device 100 described with reference to FIGS. 1 to 15 except for a direction in which the reference point CP is shifted. In FIGS. 18 to 24, any repetitive detailed descriptions of the same or like components as the components described above with reference to FIGS. 1 to 15 will be omitted.

Referring to FIG. 18, a display device 600 may include a display panel 110 including a plurality of pixels P and a plurality of dummy pixels DP, a controller 150, a data driver 120, a gate driver 140, a power supply unit 160, a display image shift controller 180, and the like.

The display image shift controller 180 may generate a route shift signal PS', and may supply the route shift signal PS' to the controller 150. The route shift signal PS' may include information on a path through which a display image is shifted.

The route shift signal PS' generated by the display image shift controller 180 may include information on alternative first to fifth routes (hereinafter, will be referred to as 1_2$^{th}$, 2_2$^{th}$, 3_2$^{th}$, 4_2$^{th}$, 5_2$^{th}$, and 6_2$^{th}$ routes, respectively). The 1_2$^{th}$ to 6_2$^{th}$ routes may correspond to paths through which a reference point CP is shifted.

Referring to FIG. 19, the display panel 110 may initially display the display image only in a pixel area 10, the reference point CP may be initially located at (0, 0) in a shift area 40, and a position corresponding to (0, 0) will be defined as a zeroth coordinate P0. In an embodiment, the reference point CP may be located at a center of the display image.

When the display image is consistently output from the display panel 110, after a preset time, the data driver 120 may receive input image data IDATA to which the route shift signal PS' is applied from the controller 150. The data driver 120 may provide data voltages VDATA corresponding to the shifted display image to the display panel 110 based on the input image data IDATA to which the route shift signal PS' is applied. In such an embodiment, the controller 150 may shift the reference point CP from the zeroth coordinate P0 to (0, 2) in the shift area 40 based on the 1_2$^{th}$ route, and (0, 2) that is a position to which the reference point CP is shifted will be defined as a first coordinate P1. In this case, since the reference point CP is shifted from the zeroth coordinate P0 to the first coordinate P1, the display image may be entirely shifted in an upper direction.

When the display image is consistently output from the display panel 110 after the reference point CP is shifted to the first coordinate P1, the controller 150 may shift the reference point CP in an upper left direction, a lower left direction, a lower right direction, an upper right direction, the upper left direction, the lower left direction, the lower right direction, the upper right direction, the upper left direction, and the lower left direction of the display panel 110 in the shift area 40 based on the 1_2$^{th}$ route every preset time. In an embodiment, for example, the controller 150 may shift the reference point CP from the first coordinate P1 to (−1, 3), (−2, 4), (−3, 5), (−4, 6), (−5, 5), (−6, 4), (−5, 3), (−4, 2), (−3, 1), (−2, 0), (−1, −1), (0, −2), (1, −3), (2, −4), (3, −5), (4, −6), (5, −5), (6, −4), (5, −3), (4, −2), (3, −1), (2, 0), (1, 1), (0, 2), (−1, 1), (−2, 0), (−3, −1), (−4, −2), (−5, −3), (−6, −4), (−5, −5), (−4, −6), (−3, −5), (−2, −4), (−1, −3), (0, −2), (1, −1), (2, 0), (3, 1), (4, 2), (5, 3), (6, 4), (5, 5), (4, 6), (3, 5), (2, 4), (1, 3), and (0, 2) in the shift area 40 every preset time, (−4, 6) that is a position to which the reference point CP is shifted will be defined as a second coordinate P2, (−6, 4) that is a position to which the reference point CP is shifted will be defined as a third coordinate P3, (4, −6) that is a position to which the reference point CP is shifted will be defined as a fourth coordinate P4, (6, −4) that is a position to which the reference point CP is shifted will be defined as a fifth coordinate P5, (0, 2) that is a position to which the reference point CP is shifted will be defined as a sixth coordinate P6, (−6, −4) that is a position to which the reference point CP is shifted will be defined as a seventh coordinate P7, (−4, −6) that is a position to which the reference point CP is shifted will be defined as an eighth coordinate P8, (6, 4) that is a position to which the reference point CP is shifted will be defined as a ninth coordinate P9, (4, 6) that is a position to which the reference point CP is shifted will be defined as a $10^{th}$ coordinate P10, (0, 2) that is a position to which the reference point CP is shifted will be defined as an $11^{th}$ coordinate P11, and the first coordinate P1, the sixth coordinate P6, and the $11^{th}$ coordinate P11 may be a same position as each other. In this case, since the reference point CP is shifted from the first coordinate P1 to the $11^{th}$ coordinate P11, the entire display image may be gradually shifted in the upper left direction, the lower left direction, the lower right direction, the upper right direction, the upper left direction, the lower left direction, the lower right direction, the upper right direction, the upper left direction, and the lower left direction.

Total numbers of movements (i.e., 12 times) by which the reference point CP is shifted in first to fourth areas 41, 42, 43, and 44 may be equal to each other (except for the movement from the zeroth coordinate P0 to the first coordinate P1).

Referring to FIG. 20, when the display image is consistently output from the display panel 110 after the reference point CP is shifted to the $11^{th}$ coordinate P11, the controller 150 may shift the reference point CP to (0, 4) in the shift area 40 based on the 2_$2^{th}$ route, and (0, 4) that is a position to which the reference point CP is shifted will be defined as a $12^{th}$ coordinate P12. In this case, since the reference point CP is shifted from the $11^{th}$ coordinate P11 to the $12^{th}$ coordinate P12, the display image may be entirely shifted in the upper direction.

When the display image is consistently output from the display panel 110 after the reference point CP is shifted to the $12^{th}$ coordinate P12, the controller 150 may shift the reference point CP in the upper left direction, the lower left direction, the lower right direction, the upper right direction, the upper left direction, the lower left direction, the lower right direction, the upper right direction, the upper left direction, and the lower left direction of the display panel 110 in the shift area 40 based on the 2_$2^{th}$ route every preset time. In an embodiment, for example, the controller 150 may shift the reference point CP from the $12^{th}$ coordinate P12 to (−1, 5), (−2, 6), (−3, 5), (−4, 4), (−5, 3), (−6, 2), (−5, 1), (−4, 0), (−3, −1), (−2, −2), (−1, −3), (0, −4), (1, −5), (2, −6), (3, −5), (4, −4), (5, −3), (6, −2), (5, −1), (4, 0), (3, 1), (2, 2), (1, 3), (0, 4), (−1, 3), (−2, 2), (−3, 1), (−4, 0), (−5, −1), (−6, −2), (−5, −3), (−4, −4), (−3, −5), (−2, −6), (−1, −5), (0, −4), (1, −3), (2, −2), (3, −1), (4, 0), (5, 1), (6, 2), (5, 3), (4, 4), (3, 5), (2, 6), (1, 5), and (0, 4) in the shift area 40 every preset time, (−2, 6) that is a position to which the reference point CP is shifted will be defined as a $13^{th}$ coordinate P13, (−6, 2) that is a position to which the reference point CP is shifted will be defined as a $14^{th}$ coordinate P14, (2, −6) that is a position to which the reference point CP is shifted will be defined as a $15^{th}$ coordinate P15, (6, −2) that is a position to which the reference point CP is shifted will be defined as a $16^{th}$ coordinate P16, (0, 4) that is a position to which the reference point CP is shifted will be defined as a $17^{th}$ coordinate P17, (−6, −2) that is a position to which the reference point CP is shifted will be defined as a $18^{th}$ coordinate P18, (−2, −6) that is a position to which the reference point CP is shifted will be defined as a $19^{th}$ coordinate P19, (6, 2) that is a position to which the reference point CP is shifted will be defined as a $20^{th}$ coordinate P20, (2, 6) that is a position to which the reference point CP is shifted will be defined as a $21^{st}$ coordinate P21, (0, 4) that is a position to which the reference point CP is shifted will be defined as a $22^{nd}$ coordinate P22, and the $12^{th}$ coordinate P12, the $17^{th}$ coordinate P17, and the $22^{nd}$ coordinate P22 may be the same position. In this case, since the reference point CP is shifted from the $12^{th}$ coordinate P12 to the $22^{nd}$ coordinate P22, the entire display image may be gradually shifted in the upper left direction, the lower left direction, the lower right direction, the upper right direction, the upper left direction, the lower left direction, the lower right direction, the upper right direction, the upper left direction, and the lower left direction.

Total numbers of movements (i.e., 12 times) by which the reference point CP is shifted in the first to fourth areas 41, 42, 43, and 44 may be equal to each other (except for the movement from the $11^{th}$ coordinate P11 to the $12^{th}$ coordinate P12).

Referring to FIG. 21, when the display image is consistently output from the display panel 110 after the reference point CP is shifted to the $22^{nd}$ coordinate P22, the controller 150 may shift the reference point CP from the $22^{nd}$ coordinate P22 to (0, 6) in the shift area 40 based on the 2_$2^{th}$ route, and (0, 6) that is a position to which the reference point CP is shifted will be defined as a $23^{rd}$ coordinate P23. In this case, since the reference point CP is shifted from the $22^{nd}$ coordinate P22 to the $23^{rd}$ coordinate P23, the display image may be entirely shifted in the upper direction.

When the display image is consistently output from the display panel 110 after the reference point CP is shifted to the $23^{rd}$ coordinate P23, the controller 150 may shift the reference point CP in the lower left direction, the lower right direction, the upper right direction, and the upper left direction of the display panel 110 in the shift area 40 based on the 3_$2^{th}$ route every preset time. In an embodiment, for example, the controller 150 may shift the reference point CP from the $23^{rd}$ coordinate P23 to (−1, 5), (−2, 4), (−3, 3), (−4, 2), (−5, 1), (−6, 0), (−5, −1), (−4, −2), (−3, −3), (−2, −4), (−1, −5), (0, −6), (1, −5), (2, −4), (3, −3), (4, −2), (5, −1), (6, 0), (5, 1), (4, 2), (3, 3), (2, 4), (1, 5), and (0, 6) in the shift area 40 every preset time, (−6, 0) that is a position to which the reference point CP is shifted will be defined as a $24^{th}$ coordinate P24, (0, −6) that is a position to which the reference point CP is shifted will be defined as a $25^{th}$ coordinate P25, (6, 0) that is a position to which the reference point CP is shifted will be defined as a $26^{th}$ coordinate P26, (0, 6) that is a position to which the reference point CP is shifted will be defined as a $27^{th}$ coordinate P27, and the $23^{rd}$ coordinate P23 and the $27^{th}$ coordinate P27 may be a same position as each other. In this case, since the reference point CP is shifted from the $23^{rd}$ coordinate P23 to the $27^{th}$ coordinate P27, the entire display image may be gradually shifted in the lower left direction, the lower right direction, the upper right direction, and the upper left direction.

Total numbers of movements (i.e., 6 times) by which the reference point CP is shifted in the first to fourth areas 41, 42, 43, and 44 may be equal to each other (except for the movement from the $22^{nd}$ coordinate P22 to the $23^{rd}$ coordinate P23).

Referring to FIG. 22, when the display image is consistently output from the display panel 110 after the reference point CP is shifted to the $27^{th}$ coordinate P27, the controller 150 may shift the reference point CP to (0, 5) in the shift area 40 based on the 4_$2^{th}$ route, and (0, 5) that is a position to which the reference point CP is shifted will be defined as a $28^{th}$ coordinate P28. In this case, since the reference point CP is shifted from the $27^{th}$ coordinate P27 to the $28^{th}$ coordinate P28, the display image may be entirely shifted in a lower direction.

When the display image is consistently output from the display panel 110 after the reference point CP is shifted to the $28^{th}$ coordinate P28, the controller 150 may shift the reference point CP in the upper left direction, the lower left direction, the lower right direction, the upper right direction, the upper left direction, the lower left direction, the lower right direction, the upper right direction, the upper left direction, and the lower left direction of the display panel 110 in the shift area 40 based on the $4\_2^{th}$ route every preset time. In an embodiment, for example, the controller 150 may shift the reference point CP from the $28^{th}$ coordinate P28 to (−1, 6), (−2, 5), (−3, 4), (−4, 3), (−5, 2), (−6, 1), (−5, 0), (−4, 1), (−3, −2), (−2, −3), (−1, −4), (0, −5), (1, −6), (2, −5), (3, −4), (4, −3), (5, −2), (6, −1), (5, 0), (4, 1), (3, 2), (2, 3), (1, 4), (0, 5), (−1, 4), (−2, 3), (−3, 2), (−4, 1), (−5, 0), (−6, −1), (−5, −2), (−4, −3), (−3, −4), (−2, −5), (−1, −6), (0, −5), (1, −4), (2, −3), (3, −2), (4, −1), (5, 0), (6, 1), (5, 2), (4, 3), (3, 4), (2, 5), (1, 6), and (0, 5) in the shift area 40 every preset time, (−1, 6) that is a position to which the reference point CP is shifted will be defined as a $29^{th}$ coordinate P29, (−6, 1) that is a position to which the reference point CP is shifted will be defined as a $30^{th}$ coordinate P30, (1, −6) that is a position to which the reference point CP is shifted will be defined as a $31^{st}$ coordinate P31, (6, −1) that is a position to which the reference point CP is shifted will be defined as a $32^{nd}$ coordinate P32, (0, 5) that is a position to which the reference point CP is shifted will be defined as a $33^{rd}$ coordinate P33, (−6, −1) that is a position to which the reference point CP is shifted will be defined as a $34^{th}$ coordinate P34, (−1, −6) that is a position to which the reference point CP is shifted will be defined as a $35^{th}$ coordinate P35, (6, 1) that is a position to which the reference point CP is shifted will be defined as a $36^{th}$ coordinate P36, (1, 6) that is a position to which the reference point CP is shifted will be defined as a $37^{th}$ coordinate P37, (0, 5) that is a position to which the reference point CP is shifted will be defined as a $30^{th}$ coordinate P38, and the $28^{th}$ coordinate P28, the $33^{rd}$ coordinate P33, and the $38^{th}$ coordinate P38 may be a same position as each other. In this case, since the reference point CP is shifted from the $28^{th}$ coordinate P28 to the $38^{th}$ coordinate P38, the entire display image may be gradually shifted in the upper left direction, the lower left direction, the lower right direction, the upper right direction, the upper left direction, the lower left direction, the lower right direction, the upper right direction, the upper left direction, and the lower left direction.

When the display image is consistently output from the display panel 110 after the reference point CP is shifted to the $38^{th}$ coordinate P38, the controller 150 may shift the reference point CP shifted from the $38^{th}$ coordinate P38 to (0, 3) in the shift area 40 based on the $4\_2^{th}$ route, and (0, 3) that is a position to which the reference point CP is shifted will be defined as a $39^{th}$ coordinate P39. In this case, since the reference point CP is shifted from the $38^{th}$ coordinate P38 to the $39^{th}$ coordinate P39, the display image may be entirely shifted in the lower direction.

Total numbers of movements (i.e., 12 times) by which the reference point CP is shifted in the first to fourth areas 41, 42, 43, and 44 may be equal to each other (except for the movement from the $27^{th}$ coordinate P27 to the $28^{th}$ coordinate P28 and the movement from the $38^{th}$ coordinate P38 to the $39^{th}$ coordinate P39).

Referring to FIG. 23, when the display image is consistently output from the display panel 110 after the reference point CP is shifted to the $39^{th}$ coordinate P39, the controller 150 may shift the reference point CP in the upper left direction, the lower left direction, the lower right direction, the upper right direction, the upper left direction, the lower left direction, the lower right direction, the upper right direction, the upper left direction, and the lower left direction of the display panel 110 in the shift area 40 based on the $5\_2^{th}$ route every preset time. In an embodiment, for example, the controller 150 moves the reference point CP from the $39^{th}$ coordinate P39 to (−1, 4), (−2, 5), (−3, 6), (−4, 5), (−5, 4), (−6, 3), (−5, 2), (−4, 1), (−3, 0), (−2, −1), (−1, −2), (0, −3), (1, −4), (2, −5), (3, −6), (4, −5), (5, −4), (6, −3), (5, −2), (4, −1), (3, 0), (2, 1), (1, 2), (0, 3), (−1, 2), (−2, 1), (−3, 0), (−4, −1), (−5, −2), (−6, −3), (−5, −4), (−4, −5), (−3, −6), (−2, −5), (−1, −4), (0, −3), (1, −2), (2, −1), (3, 0), (4, 1), (5, 2), (6, 3), (5, 4), (4, 5), (3, 6), (2, 5), (1, 4), and (0, 3) in the shift area 40 every preset time, (−3, 6) that is a position to which the reference point CP is shifted will be defined as the $40^{th}$ coordinate P40, (−6, −3) that is a position to which the reference point CP is shifted will be defined as a $41^{st}$ coordinate P41, (3, −6) that is a position to which the reference point CP is shifted will be defined as a $42^{nd}$ coordinate P42, (6, −3) that is a position to which the reference point CP is shifted will be defined as a $43^{rd}$ coordinate P43, (0, 3) that is a position to which the reference point CP is shifted will be defined as a $44^{th}$ coordinate P44, (−6, −3) that is a position to which the reference point CP is shifted will be defined as a $45^{th}$ coordinate P45, (−3, −6) that is a position to which the reference point CP is shifted will be defined as a $46^{th}$ coordinate P46, (6, 3) that is a position to which the reference point CP is shifted will be defined as a $47^{th}$ coordinate P47, (3, 6) that is a position to which the reference point CP is shifted will be defined as a $48^{th}$ coordinate P48, (0, 3) that is a position to which the reference point CP is shifted will be defined as a $49^{th}$ coordinate P49, and the $39^{th}$ coordinate P39, the $44^{th}$ coordinate P44, and the $49^{th}$ coordinate P49 may be a same position as each other. In this case, since the reference point CP is shifted from the $39^{th}$ coordinate P39 to the $49^{th}$ coordinate P49, the entire display image may be gradually shifted in the upper left direction, the lower left direction, the lower right direction, the upper right direction, the upper left direction, the lower left direction, the lower right direction, the upper right direction, the upper left direction, and the lower left direction.

When the display image is consistently output from the display panel 110 after the reference point CP is shifted to the $49^{th}$ coordinate P49, the controller 150 may shift the reference point CP from the $49^{th}$ coordinate P49 to (0, 1) in the shift area 40 based on the $2^{th}$ route, and (0, 1) that is a position to which the reference point CP is shifted will be defined as a $50^{th}$ coordinate P50. In this case, since the reference point CP is shifted from the $49^{th}$ coordinate P49 to the $50^{th}$ coordinate P50, the display image may be entirely shifted in the lower direction.

Total numbers of movements (i.e., 12 times) by which the reference point CP is shifted in the first to fourth areas 41, 42, 43, and 44 may be equal to each other (except for the movement from the $49^{th}$ coordinate P49 to the $50^{th}$ coordinate P50).

Referring to FIG. 24, when the display image is consistently output from the display panel 110 after the reference point CP is shifted to the $50^{th}$ coordinate P50, the controller 150 may shift the reference point CP in the upper left direction, the lower left direction, the lower right direction, the upper right direction, the upper left direction, the lower left direction, the lower right direction, the upper right direction, the upper left direction, and the lower left direction of the display panel 110 in the shift area 40 based on the 6_2$^{th}$ route every preset time. In an embodiment, for example, the controller 150 may shift the reference point CP from the 50$^{th}$ coordinate P50 to (−1, 2), (−2, 3), (−3, 4), (−4, 5), (−5, 6), (−6, 5), (−5, 4), (−4, 3), (−3, 2), (−2, 1), (−1, 0), (0, −1), (1, −2), (2, −3), (3, −4), (4, −5), (5, −6), (6, −5), (5, −4), (4, −3), (3, −2), (2, −1), (1, 0), (0, 1), (−1, 0), (−2, −1), (−3, −2), (−4, −3), (−5, −4), (−6, −5), (−5, −6), (−4, −5), (−3, −4), (−2, −3), (−1, −2), (0, −1), (1, 0), (2, 1), (3, 2), (4, 3), (5, 4), (6, 5), (5, 6), (4, 5), (3, 4), (2, 3), (1, 2), and (0, 1) in the shift area 40 every preset time, (−5, 6) that is a position to which the reference point CP is shifted will be defined as a 51$^{st}$ coordinate P51, (−6, 5) that is a position to which the reference point CP is shifted will be defined as a 52$^{nd}$ coordinate P52, (5, −6) that is a position to which the reference point CP is shifted will be defined as a 53$^{rd}$ coordinate P53, (6, −5) that is a position to which the reference point CP is shifted will be defined as a 54$^{th}$ coordinate P54, (0, 1) that is a position to which the reference point CP is shifted will be defined as a 55$^{th}$ coordinate P55, (−6, −5) that is a position to which the reference point CP is shifted will be defined as a 56$^{th}$ coordinate P56, (−5, −6) that is a position to which the reference point CP is shifted will be defined as a 57$^{th}$ coordinate P57, (6, 5) that is a position to which the reference point CP is shifted will be defined as a Se coordinate P58, (5, 6) that is a position to which the reference point CP is shifted will be defined as a 59$^{th}$ coordinate P59, (0, 1) that is a position to which the reference point CP is shifted will be defined as a 60$^{th}$ coordinate P60, and the 50$^{th}$ coordinate P50, the 55$^{th}$ coordinate P55, and the 60$^{th}$ coordinate P60 may be a same position as each other. In this case, since the reference point CP is shifted from the 50$^{th}$ coordinate P50 to the 60$^{th}$ coordinate P60, the entire display image may be gradually shifted in the upper left direction, the lower left direction, the lower right direction, the upper right direction, the upper left direction, the lower left direction, the lower right direction, the upper right direction, the upper left direction, and the lower left direction.

When the display image is consistently output from the display panel 110 after the reference point CP is shifted to the 60$^{th}$ coordinate P60, the controller 150 may shift the reference point CP to the zeroth coordinate P0 in the shift area 40 based on the 6_2$^{th}$ route. In this case, since the reference point CP is shifted from the 60$^{th}$ coordinate P60 to the zeroth coordinate P0, the display image may be entirely shifted in the lower direction.

Total numbers of movements (i.e., 12 times) by which the reference point CP is shifted in the first to fourth areas 41, 42, 43, and 44 may be equal to each other (except for the movement from the 60$^{th}$ coordinate P60 to the zeroth coordinate P0).

As described above, in an embodiment, the reference point CP starting from the zeroth coordinate P0 may return to the zeroth coordinate P0 through the 1_2$^{th}$ to 6_2$^{th}$ routes. Such a process will be defined as one cycle, and the display device 600 may repeatedly perform the process.

According to embodiments of the display device 600, the shift area 40 may have a square shape corresponding to a matrix shape having 13 rows and 13 columns, the 1_2$^{th}$ to 6_2$^{th}$ routes may have mutually different movement paths in the shift area 40, and the 1_2$^{th}$ to 6_2$^{th}$ routes may have mutually different shapes. Accordingly, the reference point CP may be entirely shifted (e.g., to substantially all intersection points) in the shift area 40 such that the display device 600 may effectively disperse stress applied to the pixel P.

In addition, the 1_2$^{th}$ to 6_2$^{th}$ routes may shorten a time required to reach a maximum movement range (e.g., an outermost periphery of the shift area 40) through relatively few movement paths. Accordingly, the display device 600 may disperse the stress applied to the pixel P in a relatively rapid manner.

Figure 25:
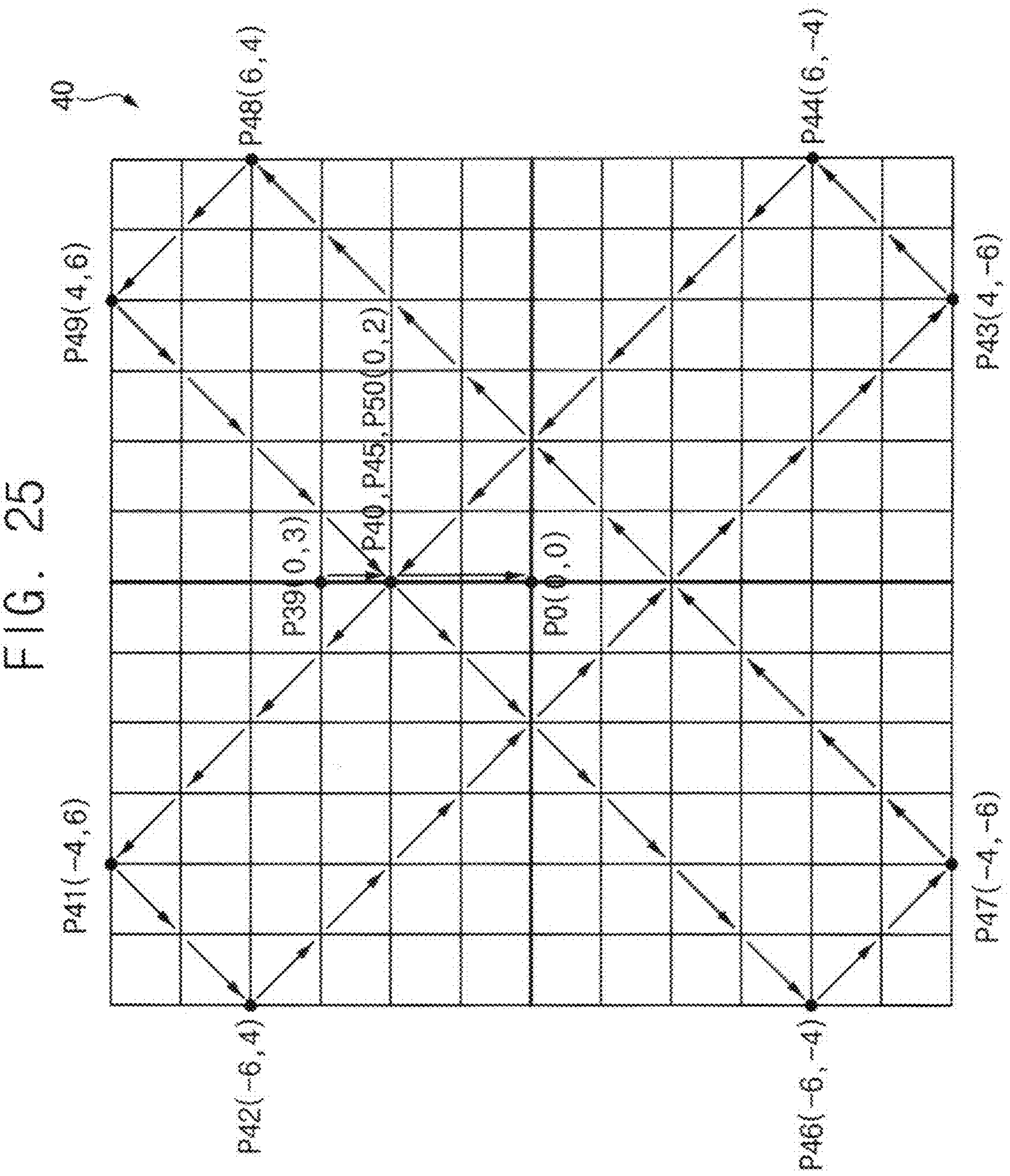
FIG. 25 is a plan view showing an alternative of the fifth route of FIG. 23.

FIG. 25 is a plan view showing an alternative embodiment of the fifth route of FIG. 23.

Referring to FIGS. 18 to 22, in an alternative embodiment, the reference point CP may be shifted from the zeroth coordinate P0 to the 39$^{th}$ coordinate P39 through the 1_2$^{th}$ to 4_2$^{th}$ routes.

Referring to FIG. 25, when the display image is consistently output from the display panel 110 after the reference point CP is shifted to the 39$^{th}$ coordinate P39, the controller 150 may shift the reference point CP from the 39$^{th}$ coordinate P39 to (0, 2) in the shift area 40 based on another alternative fifth route (hereinafter, will be referred to as 5_3$^{th}$ route), and (0, 2) that is a position to which the reference point CP is shifted will be defined as a 40$^{th}$ coordinate P40. In this case, since the reference point CP is shifted from the 39$^{th}$ coordinate P39 to the 40$^{th}$ coordinate P40, the display image may be entirely shifted in the lower direction.

When the display image is consistently output from the display panel 110 after the reference point CP is shifted to the 40$^{th}$ coordinate P40, the controller 150 may shift the reference point CP in the upper left direction, the lower left direction, the lower right direction, the upper right direction, the upper left direction, the lower left direction, the lower right direction, the upper right direction, the upper left direction, and the lower left direction of the display panel 110 in the shift area 40 based on the 5_3$^{th}$ route every preset time. In an embodiment, for example, the controller 150 may shift the reference point CP from the 40$^{th}$ coordinate P40 to (−1, 3), (−2, 4), (−3, 5), (−4, 6), (−5, 5), (−6, 4), (−5, 3), (−4, 2), (−3, 1), (−2, 0), (−1, −1), (0, −2), (1, −3), (2, −4), (3, −5), (4, −6), (5, −5), (6, −4), (5, −3), (4, −2), (3, −1), (2, 0), (1, 1), (0, 2), (−1, 1), (−2, 0), (−3, −1), (−4, −2), (−5, −3), (−6, −4), (−5, −5), (−4, −6), (−3, −5), (−2, −4), (−1, −3), (0, −2), (1, −1), (2, 0), (3, 1), (4, 2), (5, 3), (6, 4), (5, 5), (4, 6), (3, 5), (2, 4), (1, 3), and (0, 2) in the shift area 40 at every preset time, (−4, 6) that is a position to which the reference point CP is shifted will be defined as a 41$^{st}$ coordinate P41, (−6, 4) that is a position to which the reference point CP is shifted will be defined as a 42$^{nd}$ coordinate P42, (4, −6) that is a position to which the reference point CP is shifted will be defined as a 43$^{rd}$ coordinate P43, (6, −4) that is a position to which the reference point CP is shifted will be defined as a 44$^{th}$ coordinate P44, (0, 2) that is a position to which the reference point CP is shifted will be defined as a 45$^{th}$ coordinate P45, (−6, −4) that is a position to which the reference point CP is shifted will be defined as a 46$^{th}$ coordinate P46, (−4, −6) that is a position to which the reference point CP is shifted will be defined as a 47$^{th}$ coordinate P47, (6, 4) that is a position to which the reference point CP is shifted will be defined as a 48$^{th}$ coordinate P48, (4, 6) that is a position to which the reference point CP is shifted will be defined as a 49$^{th}$ coordinate P49, (0, 2) that is a position to which the reference point CP is shifted will be defined as a 50$^{th}$ coordinate P50, and the 40$^{th}$ coordinate P40, the 45$^{th}$ coordinate P45, and the 50$^{th}$ coordinate P50 may be a same position as each other. In this case, since the reference point CP is shifted from the 40$^{th}$ coordinate P40 to the 50$^{th}$ coordinate P50, the entire display image may be gradually shifted in the upper left direction, the lower left direction, the lower right direction, the upper right direction, the upper left direction, the lower left direction, the lower right direction, the upper right direction, the upper left direction, and the lower left direction.

When the display image is consistently output from the display panel 110 after the reference point CP is shifted to the 50$^{th}$ coordinate P50, the controller 150 may shift the reference point CP to the zeroth coordinate P0 in the shift area 40 based on the 5_3$^{th}$ route. In this case, since the reference point CP is shifted from the 50$^{th}$ coordinate P50 to the zeroth coordinate P0, the display image may be entirely shifted in the lower direction.

Total numbers of movements (i.e., 12 times) by which the reference point CP is shifted in the first to fourth areas 41, 42, 43, and 44 may be equal to each other (except for the movement from the 39$^{th}$ coordinate P39 to the 40$^{th}$ coordinate P40 and the movement from the 50$^{th}$ coordinate P50 to the zeroth coordinate P0).

In embodiments, as described above, the reference point CP starting from the zeroth coordinate P0 may return to the zeroth coordinate P0 through the 1_2$^{th}$ route, the 2_2$^{th}$ route, the 3_2$^{th}$ route, the 4_2$^{th}$ route, and the 5_3$^{th}$ route. Such a process will be defined as one cycle, and the display device may repeatedly perform the process.

Figure 26:
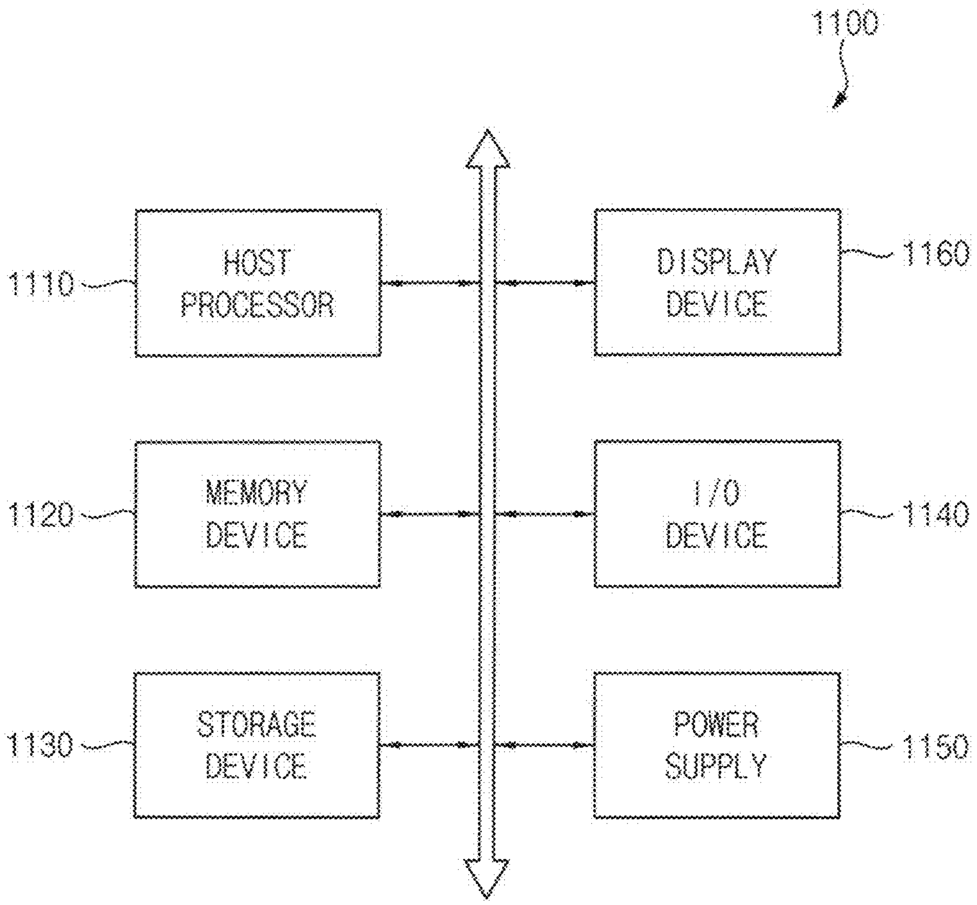
FIG. 26 is a block diagram illustrating an electronic device including a display device according to embodiments of the disclosure.

FIG. 26 is a block diagram illustrating an electronic device including a display device according to embodiments of the disclosure.

Referring to FIG. 26, embodiments of an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a micro processor, a central processing unit ("CPU"), etc. The processor 1110 may be coupled to other components via an address bus, a control bus, a data bus, etc. Further, in embodiments, the processor 1110 may be further coupled to an extended bus such as a peripheral component interconnection (PCI) bus.

The memory device 1120 may store data for operations of the electronic device 1100. In an embodiment, for example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 1130 may be a solid state drive ("SSD") device, a hard disk drive ("HDD") device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

The display device 1160 may include a display panel including a plurality of pixels and a plurality of dummy pixels, a controller, a data driver, a gate driver, a power supply unit, a display image shift controller, and the like. In embodiments, the display image shift controller may generate the route shift signal, and may supply the route shift signal to the controller. The route shift signal may include information on a path through which the display image is shifted, and the information on the path may include first, second, third, fourth, fifth, and sixth routes.

When the display image is output from the display panel for the preset time, the data driver may receive the input image data to which the route shift signal is applied from the controller so that the reference point may be shifted within the shift area. When the reference point is shifted, the display image may be entirely shifted. The shift area may be defined to entirely shift the display image, and the shift area may have a square shape corresponding to a matrix shape having 13 rows and 13 columns. The reference point of the display image may be shifted in the shift area based on the first to sixth routes. First to 11$^{th}$ sub-routes included in the first to sixth routes may have mutually different movement paths in the shift area. Accordingly, the display device 1160 may disperse the stress applied to the pixel in a relatively rapid manner.

According to embodiments, the electronic device 1100 may be any electronic device including the display device 1160 such as a smart phone, a wearable electronic device, a tablet computer, a mobile phone, a television ("TV"), a digital TV, a three-dimensional ("3D") TV, a personal computer, a home appliance, a laptop computer, a personal digital assistant, a portable multimedia player, a digital camera, a music player, a portable game console, a navigation device, or the like.

Embodiments of the disclosure may be applied to various electronic devices including a display device, for example, vehicle-display devices, ship-display devices, aircraft-display devices, portable communication devices, exhibition display devices, information transfer display devices, medical-display devices, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a display area in which a display image is displayed and a shift area located within the display area; and a display image shift controller which generates a route shift signal, wherein a reference point of the display image is shifted in the shift area based on the route shift signal, wherein the route shift signal includes first and second routes, each corresponding to a path through which the reference point of the display image is shifted, the first route includes a first sub-route and a second sub-route, wherein a path of the reference point corresponding to the first sub-route and a path of the reference point corresponding to the second sub-route cross each other, the second route includes a third sub-route and a fourth sub-route, and the first, second, third, and fourth sub-routes are different from each other.

2. The display device of claim 1, wherein, when the display image is continuously displayed on the display panel, the reference point is shifted based on the first route or the second route after a preset time in a way such that the display image is entirely shifted.

3. The display device of claim 1, wherein the shift area has a grid shape having 13 rows and 13 columns, in which 13 imaginary horizontal lines intersect 13 imaginary vertical lines, 169 intersection points in which the imaginary horizontal lines intersect the imaginary vertical lines are defined in the shift area, the reference point is located at one intersection point among the intersection points, and the reference point located at the one intersection point is shifted to one of eight intersection points adjacent to the one intersection point after a preset time.

4. The display device of claim 1, wherein the reference point is initially located at a center of the display image.

5. The display device of claim 1, wherein the reference point is shifted based on the first sub-route in an order of a first direction, a second direction, a third direction, a fourth direction, the first direction, and the second direction, and the reference point is shifted based on the second sub-route in an order of the first direction, the second direction, the third direction, the fourth direction, and the first direction.

6. The display device of claim 5, wherein the second sub-route starts after the first sub-route ends, a start coordinate of the first sub-route and an end coordinate of the second sub-route are different from each other, and a start coordinate of the second sub-route and the end coordinate of the second sub-route are identical to each other.

7. The display device of claim 5, wherein a center of the shift area is defined as a zeroth coordinate, and a start coordinate of the first sub-route corresponds to the zeroth coordinate.

8. The display device of claim 7, wherein each of the first and second sub-routes has a rectangular shape rotated about the zeroth coordinate by a preset angle, a first length of a minor axis of the first sub-route and a second length of a minor axis of the second sub-route are equal to each other, and a first length of a major axis of the first sub-route and a second length of a major axis of the second sub-route are equal to each other.

9. The display device of claim 1, wherein the reference point is shifted based on the third sub-route in an order of a first direction, a second direction, a third direction, a fourth direction, the first direction, and the second direction, and the reference point is shifted based on the fourth sub-route in an order of the first direction, the second direction, the third direction, the fourth direction, and the first direction.

10. The display device of claim 9, wherein the fourth sub-route starts after the third sub-route ends, a start coordinate of the third sub-route and an end coordinate of the fourth sub-route are different from each other, and a start coordinate of the fourth sub-route and the end coordinate of the fourth sub-route are identical to each other.

11. The display device of claim 9, wherein a center of the shift area is defined as a zeroth coordinate, each of the third and fourth sub-routes has a rectangular shape rotated about the zeroth coordinate by a preset angle, a third length of a minor axis of the third sub-route and a fourth length of a minor axis of the fourth sub-route are equal to each other, and a third length of a major axis of the third sub-route and a fourth length of a major axis of the fourth sub-route are equal to each other.

12. The display device of claim 1, wherein the route shift signal further includes a third route, the third route includes a fifth sub-route, and the first, second, third, fourth, and fifth sub-routes are different from each other.

13. The display device of claim 12, wherein the reference point is shifted based on the fifth sub-route in an order of a first direction, a second direction, a third direction, a fourth direction, and the first direction.

14. The display device of claim 12, wherein the fifth sub-route starts after the fourth sub-route ends, and a start coordinate of the fifth sub-route and an end coordinate of the fifth sub-route are different from each other.

15. The display device of claim 12, wherein a center of the shift area is defined as a zeroth coordinate, the fifth sub-route has a rectangular shape rotated about the zeroth coordinate by a preset angle, and a fifth length of a minor axis of the fifth sub-route and a fifth length of a major axis of the fifth sub-route are equal to each other.

16. The display device of claim 12, wherein the route shift signal further includes a fourth route, the fourth route includes a sixth sub-route and a seventh sub-route, and the first, second, third, fourth, fifth, sixth, and seventh sub-routes are different from each other.

17. The display device of claim 16, wherein the reference point is shifted based on the sixth sub-route in an order of a fifth direction, a second direction, a third direction, a fourth direction, a first direction, and the second direction, and the reference point is shifted based on the seventh sub-route in an order of the first direction, the second direction, the third direction, the fourth direction, the first direction, and the second direction.

18. The display device of claim 16, wherein the seventh sub-route starts after the sixth sub-route ends, a start coordinate of the sixth sub-route and an end coordinate of the seventh sub-route are different from each other, and a start coordinate of the seventh sub-route and the end coordinate of the seventh sub-route are different from each other.

19. The display device of claim 16, wherein a center of the shift area is defined as a zeroth coordinate, each of the sixth and seventh sub-routes has a rectangular shape rotated about the zeroth coordinate by a preset angle, a sixth length of a minor axis of the sixth sub-route and a seventh length of a minor axis of the seventh sub-route are equal to each other, and a sixth length of a major axis of the sixth sub-route and a seventh length of a major axis of the seventh sub-route are equal to each other.

20. The display device of claim 16, wherein the route shift signal further includes a fifth route, the fifth route includes an eighth sub-route and a ninth sub-route, and the first, second, third, fourth, fifth, sixth, seventh, eighth, and ninth sub-routes are different from each other.

21. The display device of claim 20, wherein the reference point is shifted based on the eighth sub-route in an order of a second direction, a third direction, a fourth direction, a first direction, and the second direction, and the reference point is shifted based on the ninth sub-route in an order of the first direction, the second direction, the third direction, the fourth direction, the first direction, and the second direction.

22. The display device of claim 20, wherein the ninth sub-route starts after the eighth sub-route ends, a start coordinate of the eighth sub-route and an end coordinate of the ninth sub-route are different from each other, and a start coordinate of the ninth sub-route and the end coordinate of the ninth sub-route are different from each other.

23. The display device of claim 20, wherein a center of the shift area is defined as a zeroth coordinate, each of the eighth and ninth sub-routes has a rectangular shape rotated about the zeroth coordinate by a preset angle, an eighth length of a minor axis of the eighth sub-route and a ninth length of a minor axis of the ninth sub-route are equal to each other, and an eighth length of a major axis of the eighth sub-route and a ninth length of a major axis of the ninth sub-route are equal to each other.

24. The display device of claim 20, wherein the route shift signal further includes a sixth route, the sixth route includes a $10^{th}$ sub-route and an $11^{th}$ sub-route, and the first, second, third, fourth, fifth, sixth, seventh, eighth, ninth, $10^{th}$, and $11^{th}$ sub-routes are different from each other.

25. The display device of claim 24, wherein the reference point is shifted based on the $10^{th}$ sub-route in an order of a second direction, a third direction, a fourth direction, a first direction, and the second direction, and the reference point is shifted based on the $11^{th}$ sub-route in an order of the first direction, the second direction, the third direction, the fourth direction, the first direction, and a sixth direction.

26. The display device of claim 24, wherein the $11^{th}$ sub-route starts after the $10^{th}$ sub-route ends, a start coordinate of the $10^{th}$ sub-route and an end coordinate of the $11^{th}$ sub-route are different from each other, and a start coordinate of the $11^{th}$ sub-route and the end coordinate of the $11^{th}$ sub-route are different from each other.

27. The display device of claim 24, wherein a center of the shift area is defined as a zeroth coordinate, each of the $10^{th}$ and $11^{th}$ sub-routes has a rectangular shape rotated about the zeroth coordinate by a preset angle, a $10^{th}$ length of a minor axis of the $10^{th}$ sub-route and an $11^{th}$ length of a minor axis of the $11^{th}$ sub-route are equal to each other, and a $10^{th}$ length of a major axis of the $10^{th}$ sub-route and an $11^{th}$ length of a major axis of the $11^{th}$ sub-route are equal to each other.

28. The display device of claim 27, wherein a start coordinate of the first sub-route and an end coordinate of the $11^{th}$ sub-route are identical to each other, and each of the start coordinate of the first sub-route and the end coordinate of the $11^{th}$ sub-route corresponds to the zeroth coordinate.

29. The display device of claim 1, further comprising:

a controller which receives the route shift signal from the display image shift controller, and generates input image data to which the route shift signal is applied;

a data driver which selectively receives the input image data to which the route shift signal is applied to generate data voltages corresponding to the display image which is shifted, and provides the data voltages to the display panel; and a gate driver which generates a gate signal, and provides the gate signal to the display panel.

30. The display device of claim 1, wherein the shift area has a grid shape having 13 rows and 13 columns, in which 13 imaginary horizontal lines intersect 13 imaginary vertical lines, 169 intersection points in which the imaginary horizontal lines intersect the imaginary vertical lines are defined in the shift area, and, based on an imaginary horizontal line located in middle among the imaginary horizontal lines or an imaginary vertical line located in middle among the imaginary vertical lines, the first sub-route and the second sub-route are symmetrical to each other, and the third sub-route and the fourth sub-route are symmetrical to each other.

31. The display device of claim 30, wherein the display panel includes a plurality of pixels disposed in the display area, and some of the pixels are arranged to correspond to the intersection points.

32. A display device comprising:

a display panel including a display area in which a display image is displayed and a shift area located within the display area; and a display image shift controller which generates a route shift signal, wherein a reference point of the display image is shifted in the shift area based on a preset route included in the route shift signal, wherein the preset route includes first to $n^{th}$ sub-routes, wherein n is an integer greater than or equal to 2, the first to $n^{th}$ sub-routes are different from each other, and a path of the reference point based on the first sub-route and a path of the reference point based on the second sub-route cross each other.

* * * * *